United States Patent [19]
Ishii et al.

[11] Patent Number: 5,592,220
[45] Date of Patent: Jan. 7, 1997

[54] CAMERA APPARATUS HAVING A SELF-TIMER FUNCTION

[75] Inventors: Satoshi Ishii, Kita-adachi-gun; Haruo Saitoh, Kuki, both of Japan

[73] Assignee: AIWA Co., Ltd., Tokyo, Japan

[21] Appl. No.: 390,802

[22] Filed: Feb. 14, 1995

Related U.S. Application Data

[63] Continuation of Ser. No. 300,066, Sep. 2, 1994, abandoned, which is a continuation of Ser. No. 932,872, Aug. 20, 1992, abandoned.

[30] Foreign Application Priority Data

| | | | |
|---|---|---|---|
| Aug. 30, 1991 | [JP] | Japan | 3-219748 |
| Sep. 26, 1991 | [JP] | Japan | 3-247786 |
| Mar. 24, 1992 | [JP] | Japan | 4-66357 |
| Mar. 24, 1992 | [JP] | Japan | 4-66358 |
| May 26, 1992 | [JP] | Japan | 4-133994 |
| Jun. 30, 1992 | [JP] | Japan | 4-173445 |

[51] Int. Cl.$^6$ ............................................. H04N 5/225
[52] U.S. Cl. ........................ 348/220; 348/367; 348/524; 396/264; 396/263
[58] Field of Search ............................ 348/207, 220, 348/296, 297, 367, 368, 524, 547, 548; 354/236, 237, 239, 267.1

[56] References Cited

U.S. PATENT DOCUMENTS

| | | | |
|---|---|---|---|
| 4,827,348 | 5/1989 | Ernest et al. | 358/228 |
| 4,869,237 | 9/1989 | Eino et al. | 128/6 |
| 4,918,533 | 4/1990 | Date et al. | 348/230 |
| 4,952,967 | 8/1990 | Kazumi et al. | 354/442 |
| 4,984,002 | 1/1991 | Kokubo | 358/213.13 |

FOREIGN PATENT DOCUMENTS

| | | | |
|---|---|---|---|
| 0179672 | 4/1986 | European Pat. Off. | G09G 1/16 |
| 2438935 | 9/1975 | Germany | G04H 1/00 |
| 3626532 | 2/1988 | Germany | H05G 1/64 |
| 57-2030 | 7/1982 | Japan | G03B 9/64 |
| 62-42132 | 2/1987 | Japan | G03B 9/10 |
| 62-289073 | 12/1987 | Japan | H04N 5/76 |
| 2221116 | 1/1990 | United Kingdom | H04N 5/262 |

OTHER PUBLICATIONS

Patent Abstracts of Japan, vol. 12, No. 184 (E–614) May 28, 1988 JP–A–62 289 073 (abstract).
Patent Abstracts of Japan, vol. 7, No. 127 (P–201) Jun. 3, 1983 JP–A–58 046 333.
Patent Abstracts of Japan, vol. 13, No. 110 (E–728) Mar. 16, 1989 JP–A–63 281 580 (abstract).
Patent Abstracts of Japan, vol. 14, No. 182 (E–916) Apr. 12, 1990 JP–A–02 032 691 (abstract).
Patent Abstracts of Japan, vol. 12, No. 322 (E–652) Aug. 31, 1988, JP–A–63 086 681 (Abstract) Apr. 18, 1988.
Patent Abstracts of Japan, vol. 14, No. 71 (M–933) Feb. 9, 1990, JP–A–01 290 450 (Abstract) Nov. 22, 1989.

*Primary Examiner*—Leo Boudreau
*Assistant Examiner*—Bipin Shalwala
*Attorney, Agent, or Firm*—Dellett and Walters

[57] ABSTRACT

A camera apparatus in which a video camera and a photographic camera are integrally combined or which has a self-timer function, and an aspect conversion circuit for converting the orientation of an image are provided. A normal mode and a self-timer mode are provided, and in either mode, a shutter pulse synchronized with a vertical synchronizing signal is obtained from an output signal of a frequency divider, while in the self-timer mode, a timer is driven by the output signal of the frequency divider, whereby the frequency divider is used in both modes. Alternatively, a still mode and a video mode is provided, and in the still mode, a shutter pulse and a record pulse are output in response to an operation of a shutter switch, while in the video mode, the record pulse is output in response to an operation of a record switch and the shutter pulse is output in response to an operation of the shutter switch. Furthermore, a field memory or a frame memory is arranged in the aspect conversion circuit, and a write direction with respect to the memory is made different from a read direction, to thereby obtain an aspect-converted video signal.

12 Claims, 55 Drawing Sheets

|  | a | b | c | d | e |
|---|---|---|---|---|---|
| A1 | Cy+G | Ye+Mg | Cy+G | Ye+Mg | Cy+G |
| B1 | G+Cy | Mg+Ye | G+Cy | Mg+Ye | G+Cy |
| A2 | Cy+Mg | Ye+G | Cy+Mg | Ye+G | Cy+Mg |
| B2 | Mg+Cy | G+Ye | Mg+Cy | G+Ye | Mg+Cy |

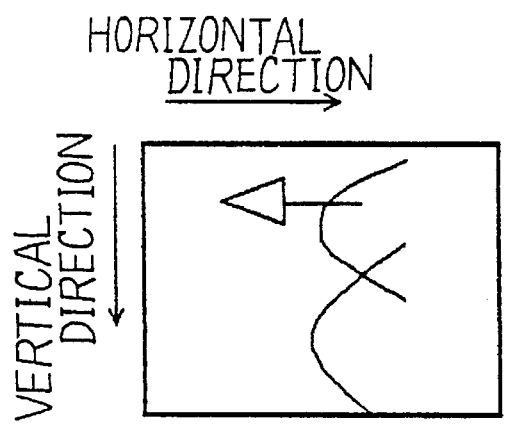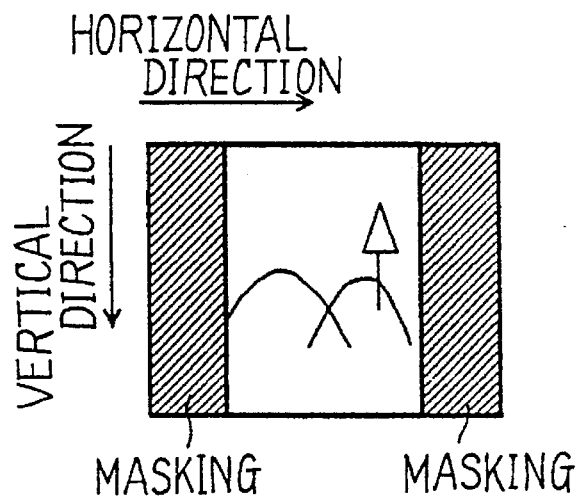
BEFORE CONVERSION
FIG.15A
AFTER CONVERSION
FIG.15B

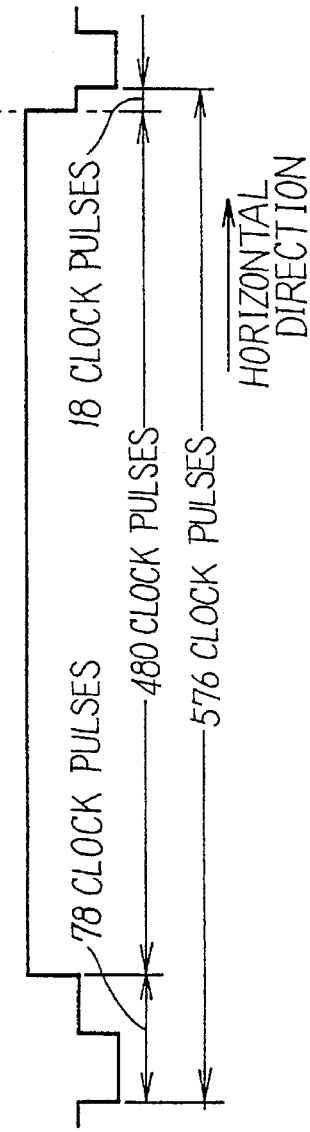
FIG. 16
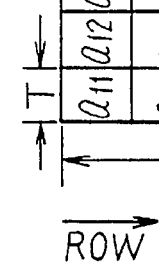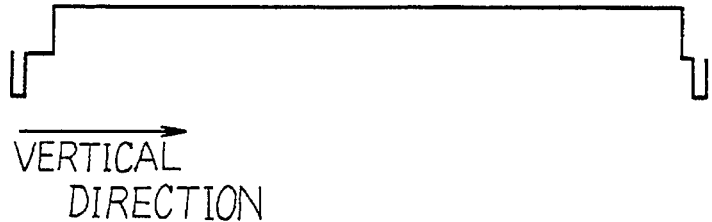

6 CLOCK PULSES
6 T

| $a_{11}$ | $a_{12}$ | $a_{13}$ | $a_{14}$ | $a_{15}$ | $a_{16}$ |
|---|---|---|---|---|---|
| $a_{21}$ | $a_{22}$ | $a_{23}$ | $a_{24}$ | $a_{25}$ | $a_{26}$ |
| $a_{31}$ | $a_{32}$ | $a_{33}$ | $a_{34}$ | $a_{35}$ | $a_{36}$ |
| $a_{41}$ | $a_{42}$ | $a_{43}$ | $a_{44}$ | $a_{45}$ | $a_{46}$ |

4 LINES

BLOCK BEFORE CONVERSION

FIG. 17A

4 CLOCK PULSES
9/2 T

| $a_{41}$ | $a_{31}$ | $a_{21}$ | $a_{11}$ |
|---|---|---|---|
| $a_{43}$ | $a_{33}$ | $a_{23}$ | $a_{13}$ |
| $a_{45}$ | $a_{35}$ | $a_{25}$ | $a_{15}$ |

3 LINES

BLOCK AFTER CONVERSION

FIG. 17B

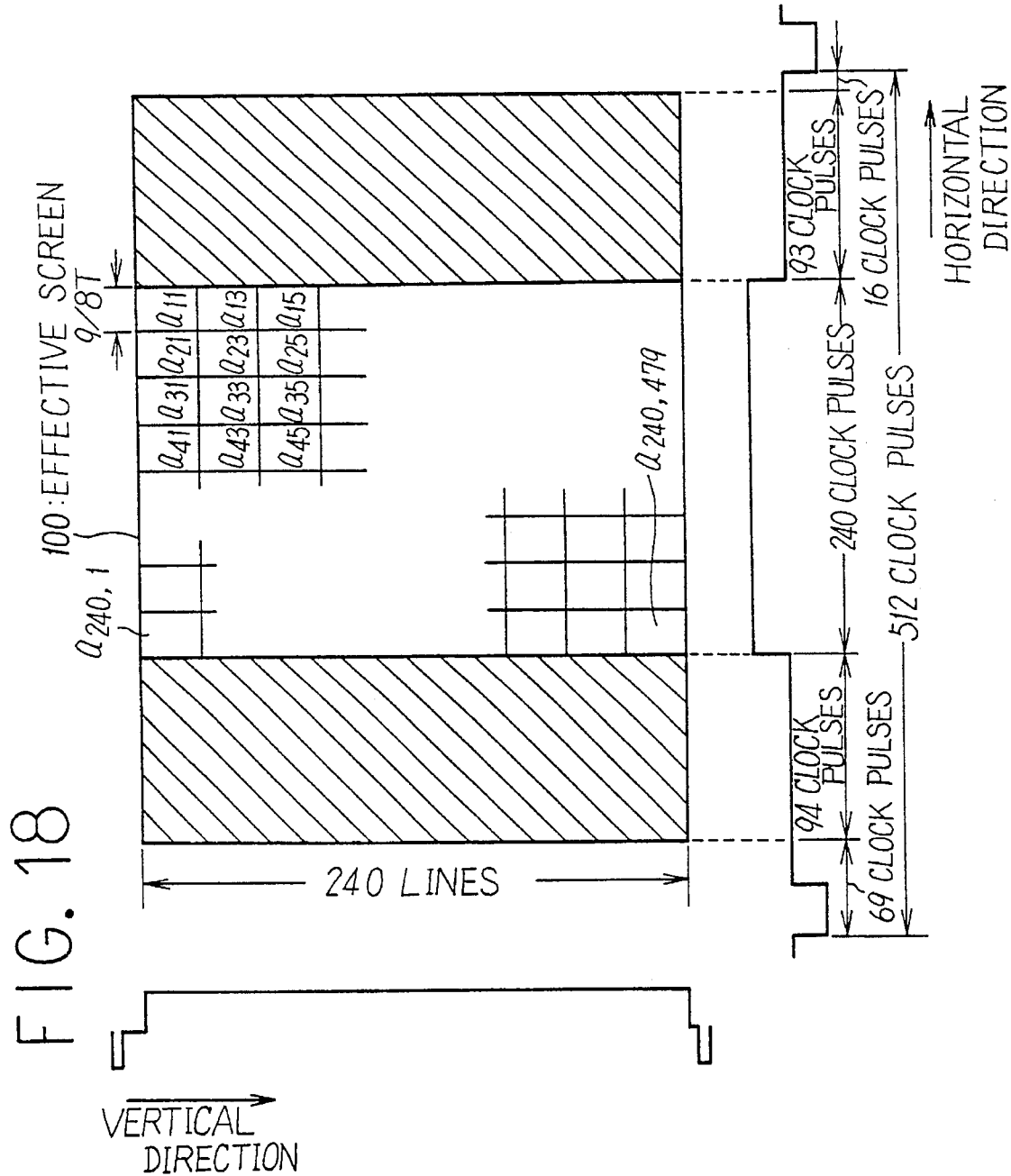

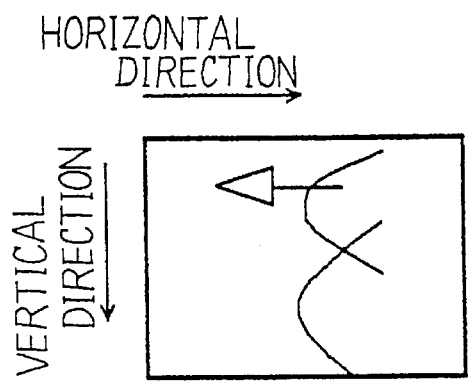
BEFORE CONVERSION
FIG.23A
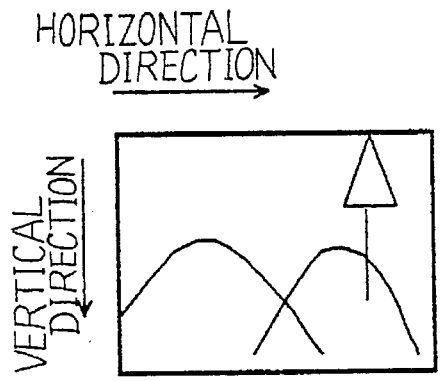
AFTER CONVERSION
FIG.23B
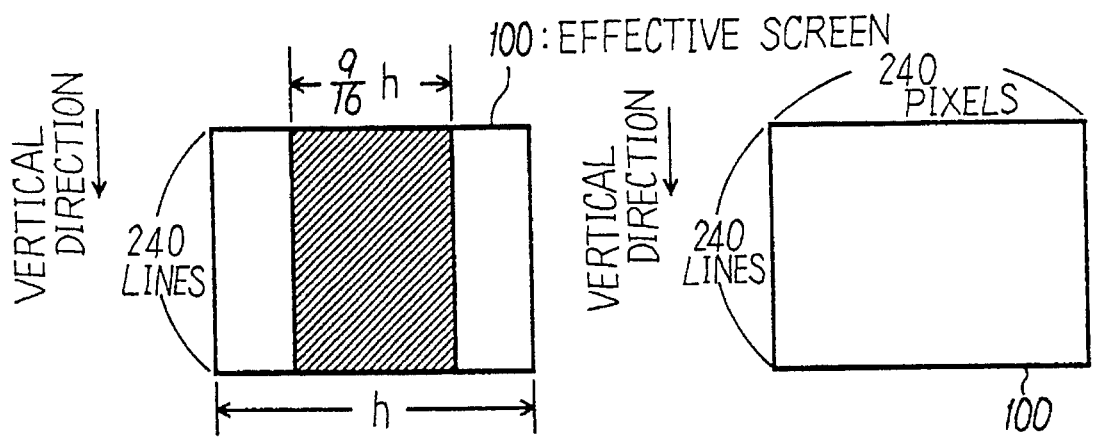
BEFORE CONVERSION
FIG.24A
AFTER CONVERSION
FIG.24B

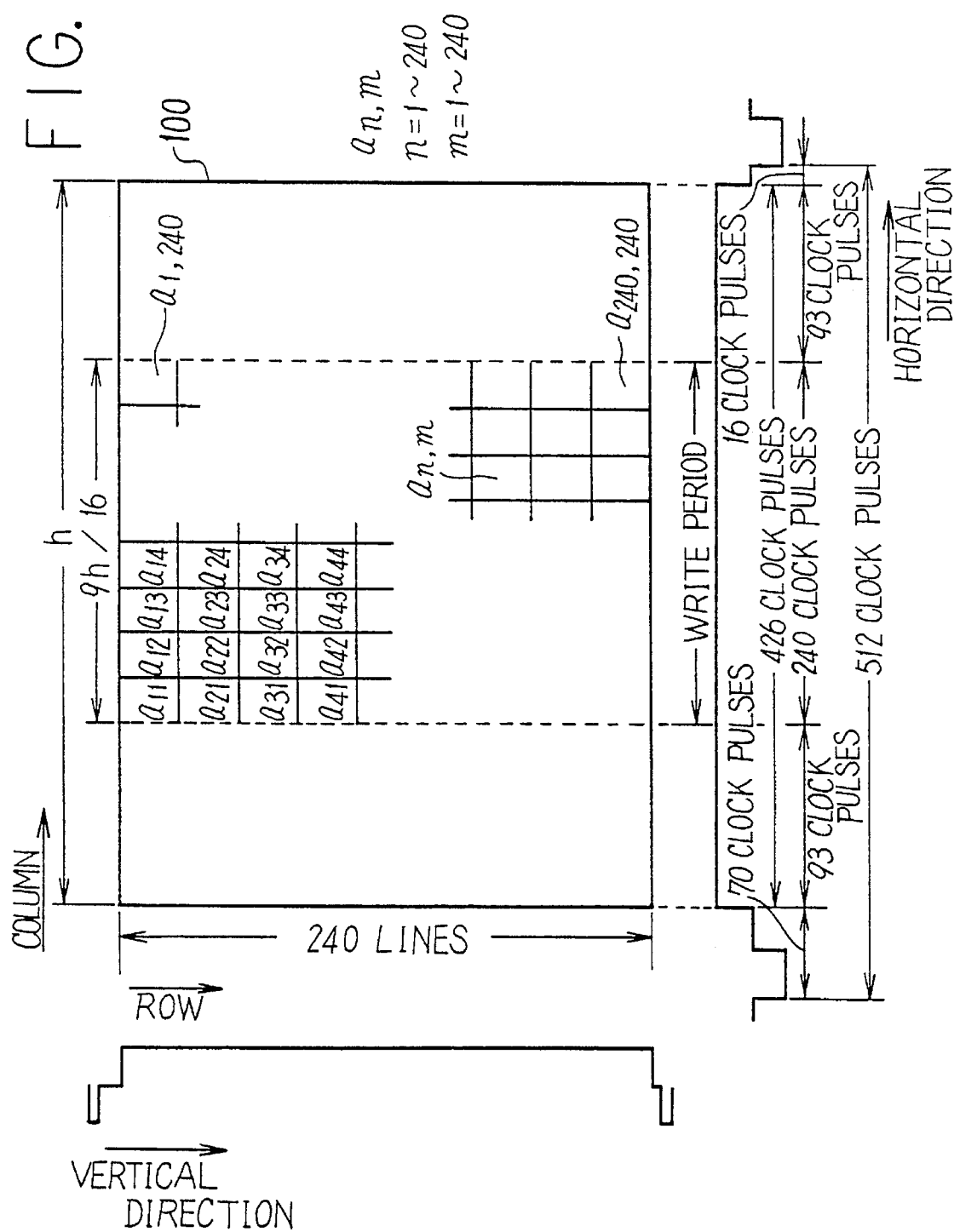

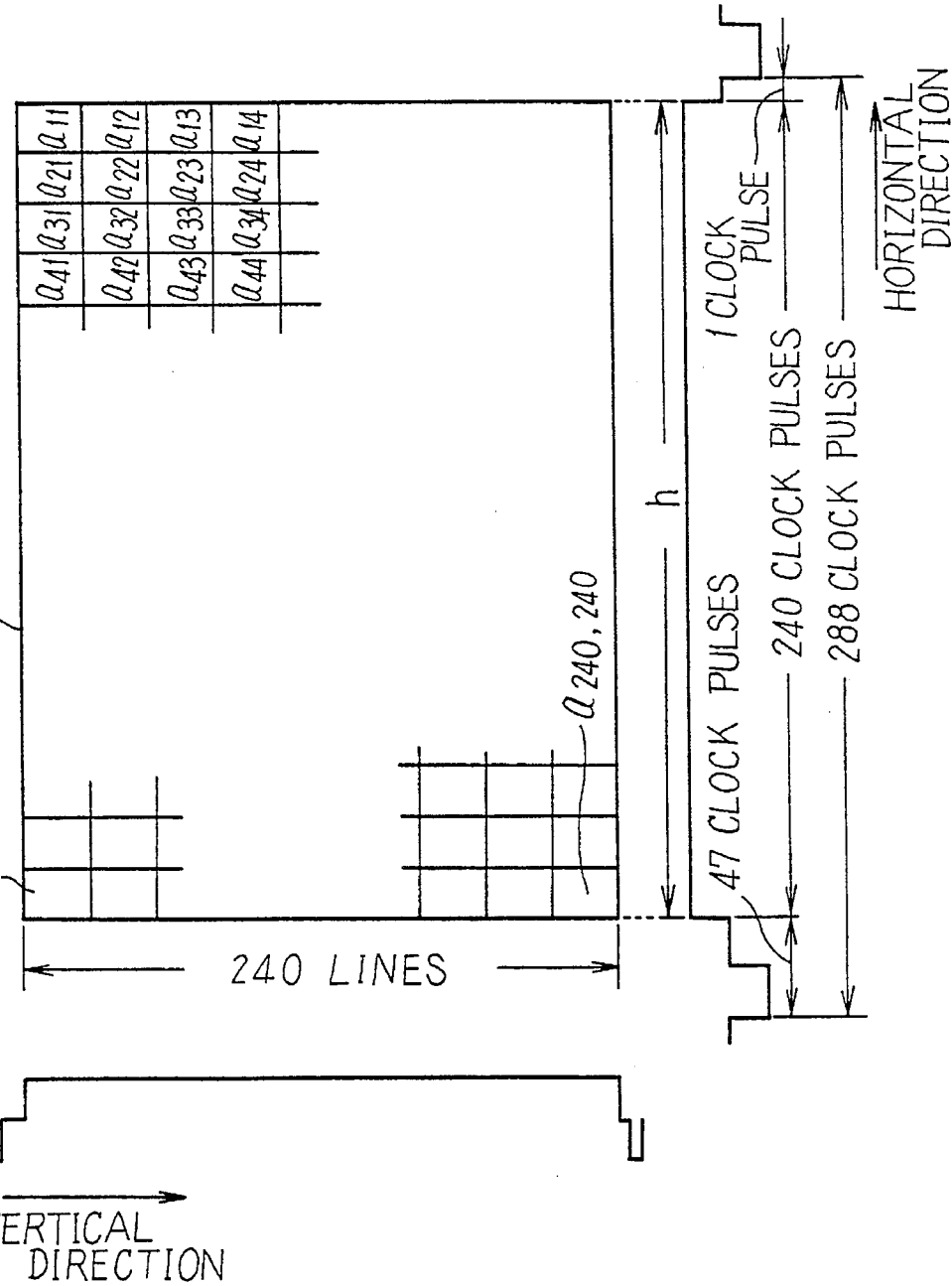

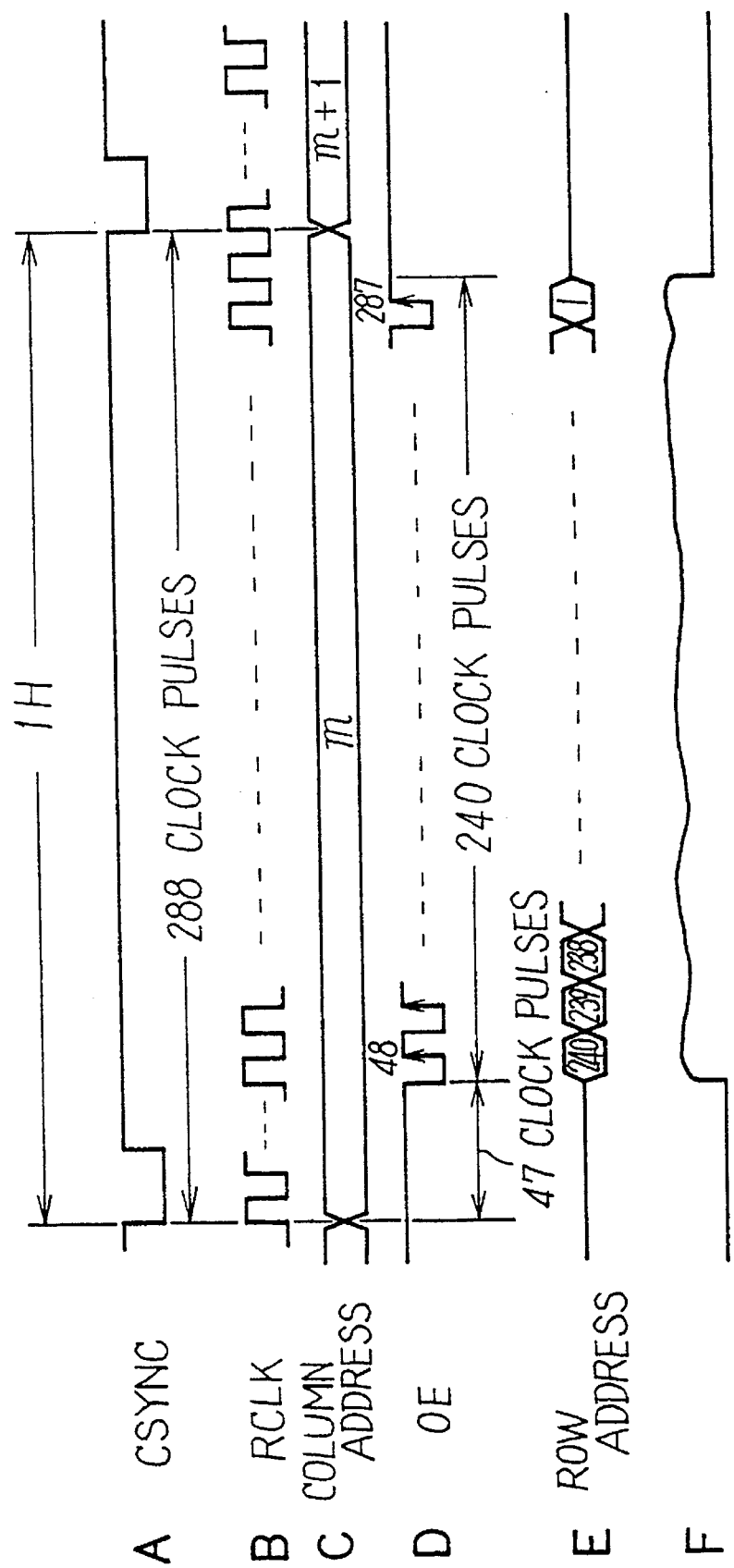

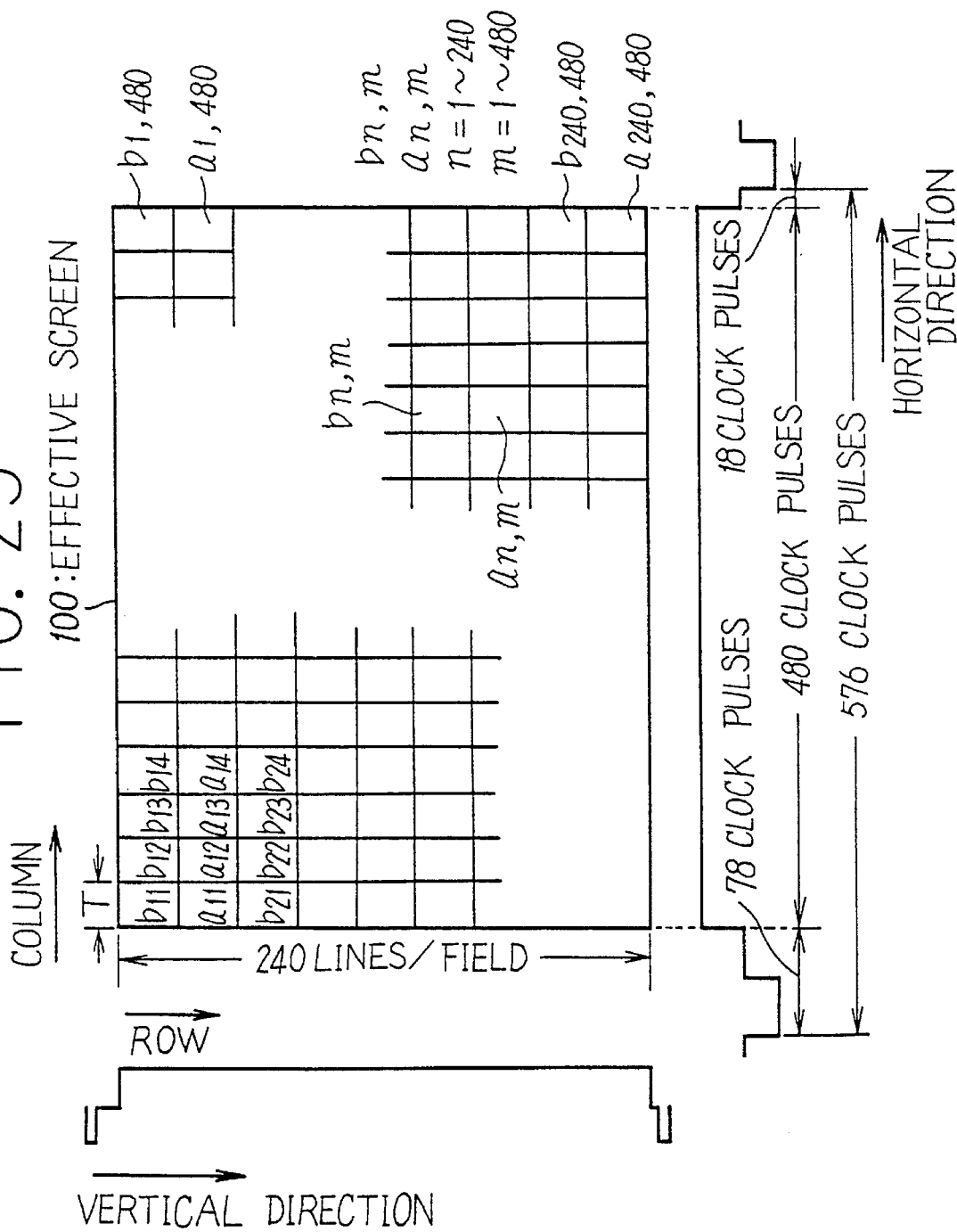

6 CLOCK PULSES (6T)

4 LINES/FIELD

| b11 | b12 | b13 | b14 | b15 | b16 | EVEN |
| --- | --- | --- | --- | --- | --- | --- |
| a11 | a12 | a13 | a14 | a15 | a16 | ODD |
| b21 | b22 | b23 | b24 | b25 | b26 | EVEN |
| a21 | a22 | a23 | a24 | a25 | a26 | ODD |
| b31 | b32 | b33 | b34 | b35 | b36 | EVEN |
| a31 | a32 | a33 | a34 | a35 | a36 | ODD |
| b41 | b42 | b43 | b44 | b45 | b46 | EVEN |
| a41 | a42 | a43 | a44 | a45 | a46 | ODD |

BLOCK BEFORE CONVERSION

FIG. 30A

8 CLOCK PULSES (9T/2)

3 LINES FIELD

| a41 | b41 | a31 | b31 | a21 | b21 | a11 | b11 | EVEN |
| --- | --- | --- | --- | --- | --- | --- | --- | --- |
| a42 | b42 | a32 | b32 | a22 | b22 | a12 | b12 | ODD |
| a43 | b43 | a33 | b33 | a23 | b23 | a13 | b13 | EVEN |
| a44 | b44 | a34 | b34 | a24 | b24 | a14 | b14 | ODD |
| a45 | b45 | a35 | b35 | a25 | b25 | a15 | b15 | EVEN |
| a46 | b46 | a36 | b36 | a26 | b26 | a16 | b16 | ODD |

BLOCK AFTER CONVERSION

FIG. 30B 171, 172 : FRAME MEMORY SECTION

BLOCK BEFORE
CONVERSION

BLOCK AFTER
CONVERSION

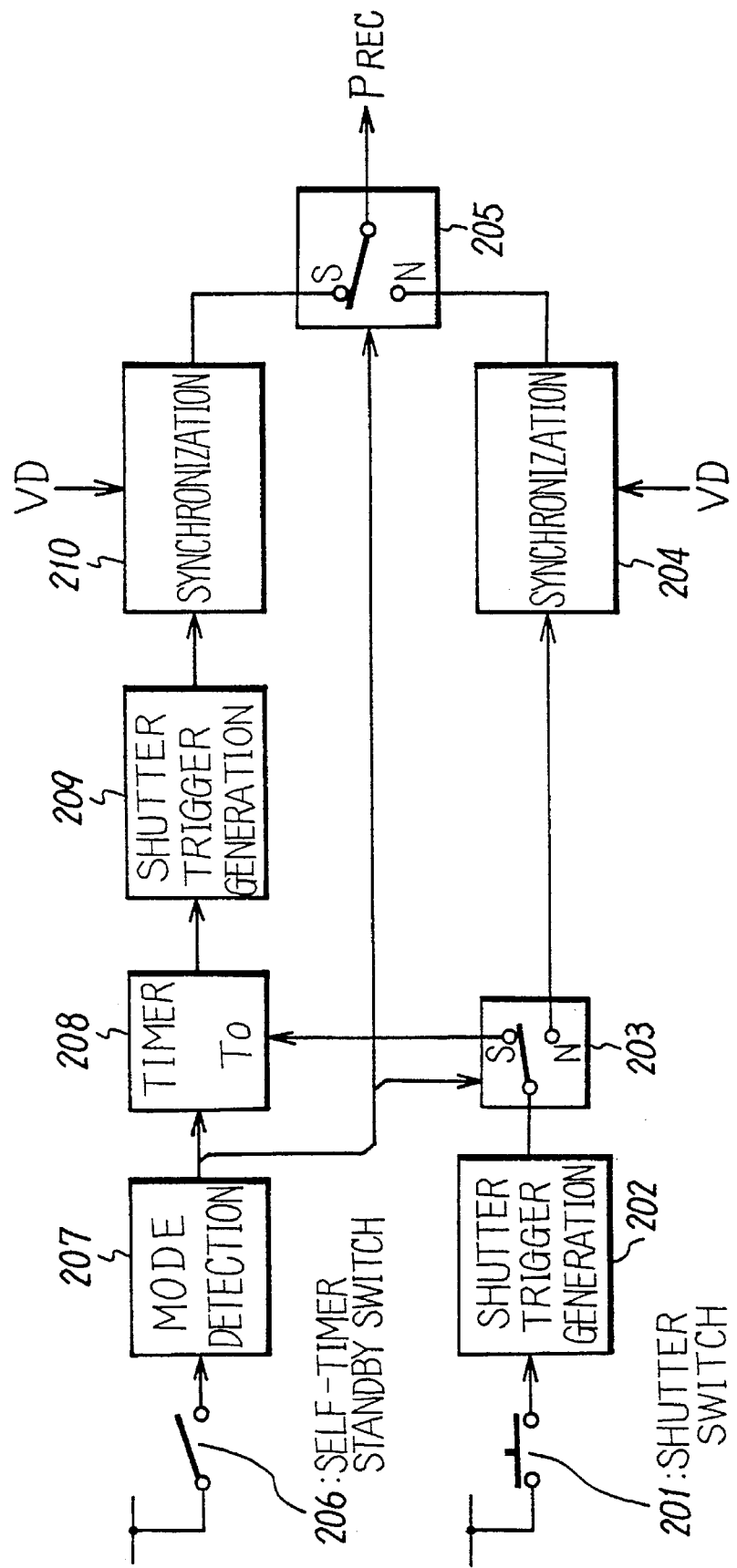

VIEWFINDER

VIEWFINDER

TELEVISION MONITOR

TELEVISION MONITOR

PHOTOGRAPH

PHOTOGRAPH

CAMERA APPARATUS HAVING A SELF-TIMER FUNCTION

This is a continuation of U.S. patent application Ser. No. 08/300,066 filed Sep. 2, 1994, now abandoned, which is a continuation of U.S. patent application Ser. No. 07/932,872 filed Aug. 20, 1992, now abandoned.

BACKGROUND OF THE INVENTION

The present invention relates to a camera apparatus in which a video camera and a photographic camera are integrally combined or which has a self-timer function, and an aspect conversion circuit for converting the aspect or orientation of an image.

FIG. 58 shows an example of an arrangement of a shutter system for a conventional still video camera. As shown in the figure, a shutter switch 201 is connected to a shutter trigger generating circuit 202, and when the shutter switch 201 is turned on, the trigger generating circuit 202 outputs a shutter trigger signal.

The shutter trigger signal is supplied to a synchronous circuit 204 via a fixed terminal N of a changeover switch 203. The synchronous circuit 204 is also supplied with a vertical synchronizing signal VD, and after being supplied with the shutter trigger signal, it outputs a record pulse PREC in synchronism with the synchronizing signal VD, the record pulse PREC being supplied to a fixed terminal N of a changeover switch 205.

A self-timer standby switch 206 is connected to a mode detection circuit 207. When the standby switch 206 is in an off state, a normal shutter mode (normal mode) is detected, and when the standby switch 206 is in an on state, a self-timer mode (self mode) is detected.

When the normal mode is detected, the changeover switches 203 and 205 are connected to the respective terminals N, and when the self mode is detected, the switches 203 and 205 are connected to the respective terminals S and a timer 208 is set in an operative state.

The shutter trigger signal output from the trigger generating circuit 202 is supplied to the timer 208 as a timer start signal through the fixed terminal S of the changeover switch 203.

The timer 208 generates a pulse signal upon lapse of a predetermined period T0 after the shutter trigger signal is supplied thereto, the pulse signal being supplied to a shutter trigger generating circuit 209. The trigger generating circuit 209 then outputs a shutter trigger signal to a synchronous circuit 210.

The synchronous circuit 210 is supplied with the vertical synchronizing signal VD, and after being supplied with the shutter trigger signal, it outputs a record pulse PREC in synchronism with the synchronizing signal VD, the record pulse PREC being supplied to the fixed terminal S of the changeover switch 205.

With the above-described arrangement, while in the normal mode in which the standby switch 206 is off, if the shutter switch 201 is turned on, the shutter trigger signal generated by the trigger generating circuit 202 is supplied to the synchronous circuit 204 through the fixed terminal N of the changeover switch 203. Therefore, the record pulse PREC generated by the synchronous circuit 204 is output through the fixed terminal N of the changeover switch 205.

On the other hand, while in the self mode in which the standby switch 206 is on, if the shutter switch 201 is turned on, the shutter trigger signal generated by the trigger generating circuit 202 is supplied to the timer 208 through the fixed terminal S of the changeover switch 203. In response to the pulse signal output from the timer 208 upon lapse of the predetermined period T0, the trigger generating circuit 209 outputs a shutter trigger signal to the synchronous circuit 210. Thus, the record pulse PREC generated by the synchronous circuit 210 is output through the fixed terminal S of the changeover switch 205.

The above-described shutter system is applied to a still video camera, but it is equally applicable to a photographic (film) camera. Namely, the record pulse PREC can be used as a drive pulse (shutter pulse) for the shutter mechanism.

In the arrangement of FIG. 58, the circuitry for the normal mode is separate from that for the self mode. Specifically, the arrangement includes two shutter trigger generating circuits 202 and 209, two synchronous circuits 204 and 210, and two changeover switches 203 and 205, thus making the circuit configuration of the shutter system complicated.

In the meantime, when the video camera is used, a still image, in addition to a dynamic image, can be acquired. The resolution of video cameras, however, is poorer than that of photographic cameras, and there is a demand for a combined use of a video camera and a photographic camera. For example, a photographic camera may be fixed to a video camera so that an image can be photographed by the photographic camera while a dynamic image is acquired by the video camera.

Such a camera apparatus including a video camera and a photographic camera may be designed to operate in a still mode for obtaining a still image and in a video mode for obtaining a dynamic image. In this case, a still image can be acquired by both the video camera and the photographic camera, and therefore, in the still mode, the record pulse and the shutter pulse may be generated in response to an operation of the shutter switch.

On the other hand, a dynamic image can be acquired by the video camera, and thus, in the video mode, the record pulse may be generated in response to an operation of the record switch. Further, there may be a situation where an image is photographed by the photographic camera while a dynamic image is acquired by the video camera, and therefore, the shutter pulse may be generated in response to an operation of the shutter switch.

In the case of using the photographic camera fixed to the video camera, when an image is photographed widthwise (FIG. 59C), the image displayed at the viewfinder is oriented widthwise (FIG. 59A), and the image displayed at a television monitor to which a television signal is supplied from the video camera is also oriented widthwise (FIG. 59B).

On the other hand, when an image is photographed lengthwise (FIG. 60C), the image displayed at the viewfinder is oriented lengthwise (FIG. 60A), but the image displayed at the television monitor lies with the top thereof oriented horizontally (FIG. 60B), which makes the visual recognition difficult.

An object of the present invention is to provide a camera apparatus in which the circuit arrangement of a shutter system is simplified.

Another object of the present invention is to provide a camera apparatus which has a still mode and a video mode and in which a shutter pulse and a record pulse can be suitably output in both modes.

Still another object of the present invention is to provide an aspect conversion circuit by which, even when an image is acquired with a video camera held vertically, the image displayed at a television monitor can be prevented from being laid with the top thereof oriented horizontally.

SUMMARY OF THE INVENTION

According to one aspect of the present invention, a camera apparatus having a self-timer function comprises a frequency divider for carrying out a frequency division with respect to a vertical synchronizing signal, wherein an output signal of the frequency divider is used to drive a timer associated with the self-timer function and to obtain a shutter pulse.

According to another aspect of the present invention, a camera apparatus comprises mode changeover means for switching between a still mode for acquiring a still image and a video mode for acquiring a dynamic image, a shutter switch, a record switch, and control means for outputting a shutter pulse for driving a shutter of a photographic camera and a record pulse for controlling a recording operation of a recorder in response to an operation of the shutter switch when the still mode is set by the mode changeover means, and for outputting the shutter pulse in response to an operation of the shutter switch and outputting the record pulse in response to an operation of the record switch when the video mode is set by the mode changeover means.

According to still another aspect of the present invention, an aspect conversion circuit comprises a memory for storing a video signal on a screen-by-screen basis, and control means for controlling a write direction and a read direction with respect to the memory, to thereby convert an orientation of an image.

According to a further aspect of the present invention, an aspect conversion circuit comprises a memory for storing a video signal of an odd-numbered field and a video signal of an even-numbered field, and control means for controlling a write direction and a read direction with respect to the memory, to thereby convert an orientation of an image, wherein pixel signals of the odd- and even-numbered fields constituting one frame are used to obtain aspect-converted video signals of odd- and even-numbered fields.

According to another aspect of the present invention, an aspect conversion circuit comprises a memory for storing a video signal of an odd-numbered field and a video signal of an even-numbered field, and control means for controlling a write direction and a read direction with respect to the memory, to thereby convert an orientation of an image, wherein, among pixel signals of individual lines of the odd- and even-numbered fields, those which are in an offset relationship are used to obtain aspect-converted video signals.

According to a still another aspect of the present invention, an aspect conversion circuit comprises a memory for storing a video signal on a screen-by-screen basis, and control means for controlling a write direction and a read direction with respect to the memory, to thereby convert an orientation of an image, wherein the memory includes a plurality of memory sections, and the video signal is written in one memory section while at the same time the video signal is read out from another memory section.

According to the present invention, in both the normal shutter mode and the self-timer mode, a shutter pulse synchronized with the vertical synchronizing signal can be obtained based on the output signal of the frequency divider. Further, in the self-timer mode, the timer is driven by the output signal of the frequency divider. Thus, the single frequency divider is used in both modes, and therefore, the circuit configuration of the shutter system is simplified.

Further, in the still mode, the shutter pulse and the record pulse are output in response to an operation of the shutter switch, and therefore, a still image can be acquired by both the photographic camera and the video camera. In the video mode, the record pulse is output in response to an operation of the record switch, whereby a dynamic image can be obtained by the video camera. In the video mode, furthermore, since the shutter pulse is output in response to an operation of the shutter switch, a still image can be obtained by the photographic camera.

The video signal read from the memory provides an image whose aspect or orientation is converted. Accordingly, by arranging the aspect conversion circuit at the output side of the video camera, for example, it is possible to prevent the image displayed at a television monitor from being laid with the top thereof oriented horizontally, even in the case wherein the image was recorded with the camera held vertically.

According to the present invention, the pixel signals of the odd- and even-numbered fields constituting one frame are used to form aspect-converted video signals of the odd- and even-numbered fields. Since the pixel signals of both the odd- and even-numbered fields are used, the number of the pixel signals of individual lines after the conversion doubles, and the aspect-converted image has an excellent resolution. Further, since the pixel signals of the odd- and even-numbered fields constituting one frame are used to form aspect-converted pixel signals of the odd- and even-numbered fields, no image deviation is caused by the conversion even if the control of the timing for writing and reading the individual fields is simplified.

Further, according to the present invention, among the pixel signals of the individual lines of the odd- and even-numbered fields, those which are in the offset relationship are used to form aspect-converted video signal. Therefore, the offset relationship can be made agreeable to the line-to-line relationship of the odd- and even-numbered fields after the conversion, and an image deviation of the odd-numbered field from the even-numbered field after the aspect conversion can be prevented.

Furthermore, the memory comprises a plurality of memory sections, and a video signal is written in one memory section while at the same time a video signal is read from another memory section, whereby a memory capacity equivalent to one screen (one field or one frame) suffices, and the aspect conversion can be carried out with a small memory capacity.

The objects, advantages, and novel features of the present invention will be apparent from the following detailed description when read in conjunction with the appended claims and attached drawings.

BRIEF DESCRIPTION OF THE DRAWINGS

FIGS. 15A and 15B are diagrams showing an example of an aspect conversion;

FIG. 16 is a diagram illustrating an aspect conversion process (write operation);

FIGS. 17A and 17B are diagrams also illustrating the aspect conversion process;

FIG. 18 is a diagram illustrating the aspect conversion process (read operation);

FIGS. 23A and 23B are diagrams showing another example of the aspect conversion;

FIGS. 24A and 24B are diagrams illustrating a process executed for the example of the conversion of FIG. 23;

FIG. 25 is a diagram illustrating an aspect conversion process (write operation);

FIG. 26 is a diagram illustrating the aspect conversion process (read operation);

FIG. 28 is a timing chart showing a read operation in the horizontal direction;

FIG. 29 is a diagram illustrating an aspect conversion process (write operation);

FIGS. 30A and 30B are diagrams illustrating the aspect conversion process;

FIG. 58 is a block diagram showing an example of the arrangement of a shutter system for a still video camera;

DETAILED DESCRIPTION OF THE INVENTION

One embodiment of the present invention will be described with reference to the drawings. In this embodiment, a video camera and a photographic camera are integrally combined.

Figure 1:
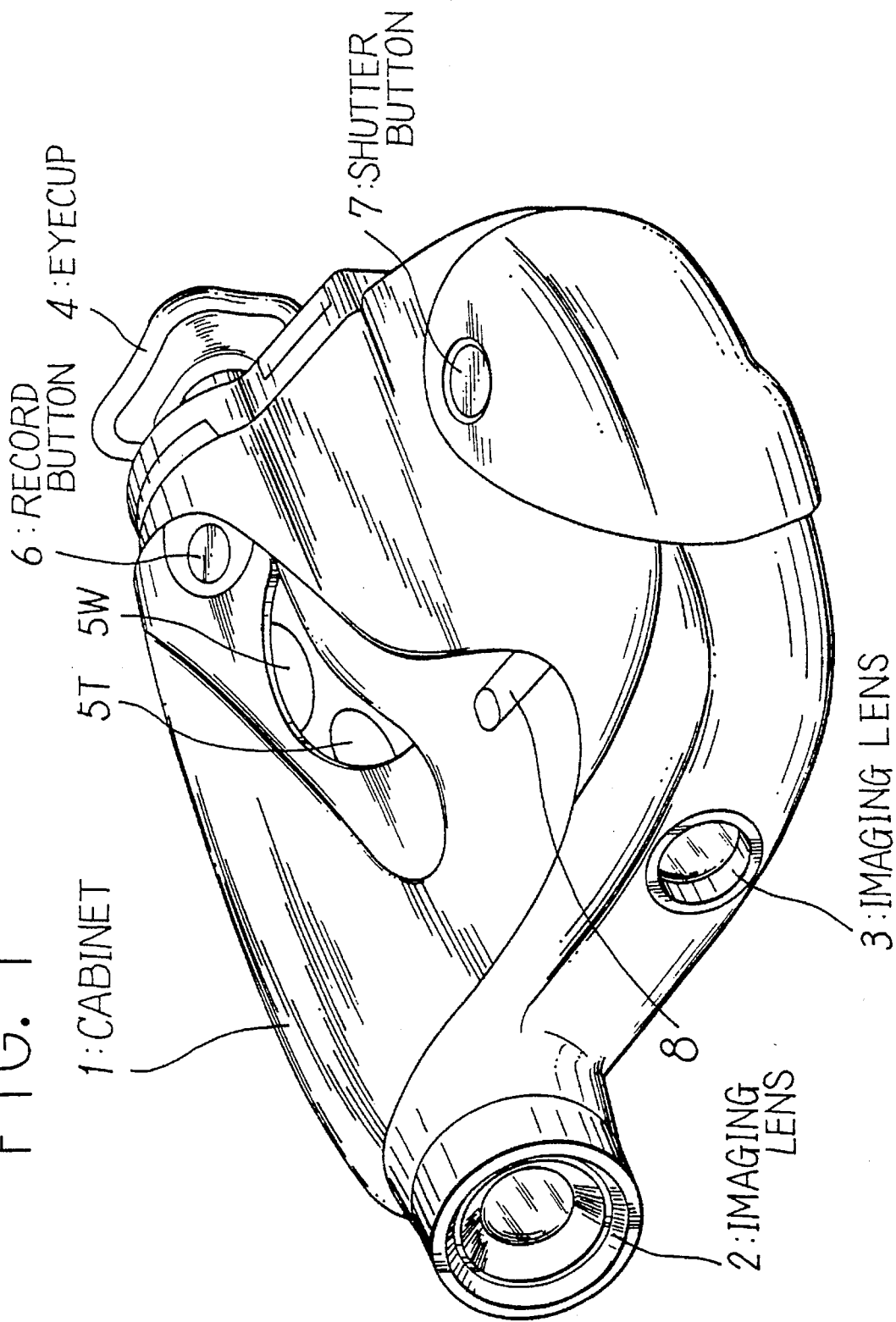
FIG. 1 is a perspective view showing an external appearance of an embodiment of the present invention.

FIG. 1 is a perspective view showing an external appearance of the embodiment, wherein reference numeral 1 denotes a cabinet which has a built-in video camera section including an imaging device, a signal processing circuit, etc., and a built-in photographic camera section including a film loading mechanism, a film drive mechanism, etc., none of which are shown.

Reference numeral 2 denotes an imaging lens of the video camera section, and 3 denotes an imaging lens of the photographic camera section. Namely, an optical system for the video camera section is separate from that for the photographic camera section. A 6-power zoom lens having a focal length f of 7 to 42 mm is used for the imaging lens 2, and a fixed-focus lens having a focal length f of 55 mm is used for the imaging lens 3.

In this embodiment, an electronic viewfinder comprising a small-sized CRT is arranged in the cabinet 1, for displaying on the CRT an image picked up by the video camera section through the imaging lens 2. Reference numeral 4 represents an eyecup. There is provided no finder permitting a direct observation of an image to be photographed by the photographic camera section through the imaging lens 3.

Further, 5T and 5W denote zoom buttons for a zooming operation in a TELE direction and a WIDE direction, respectively, 6 denotes a record button for recording a video signal output from the video camera section in a VTR, 7 denotes a shutter button, and 8 denotes a film rewind button.

Figure 2:
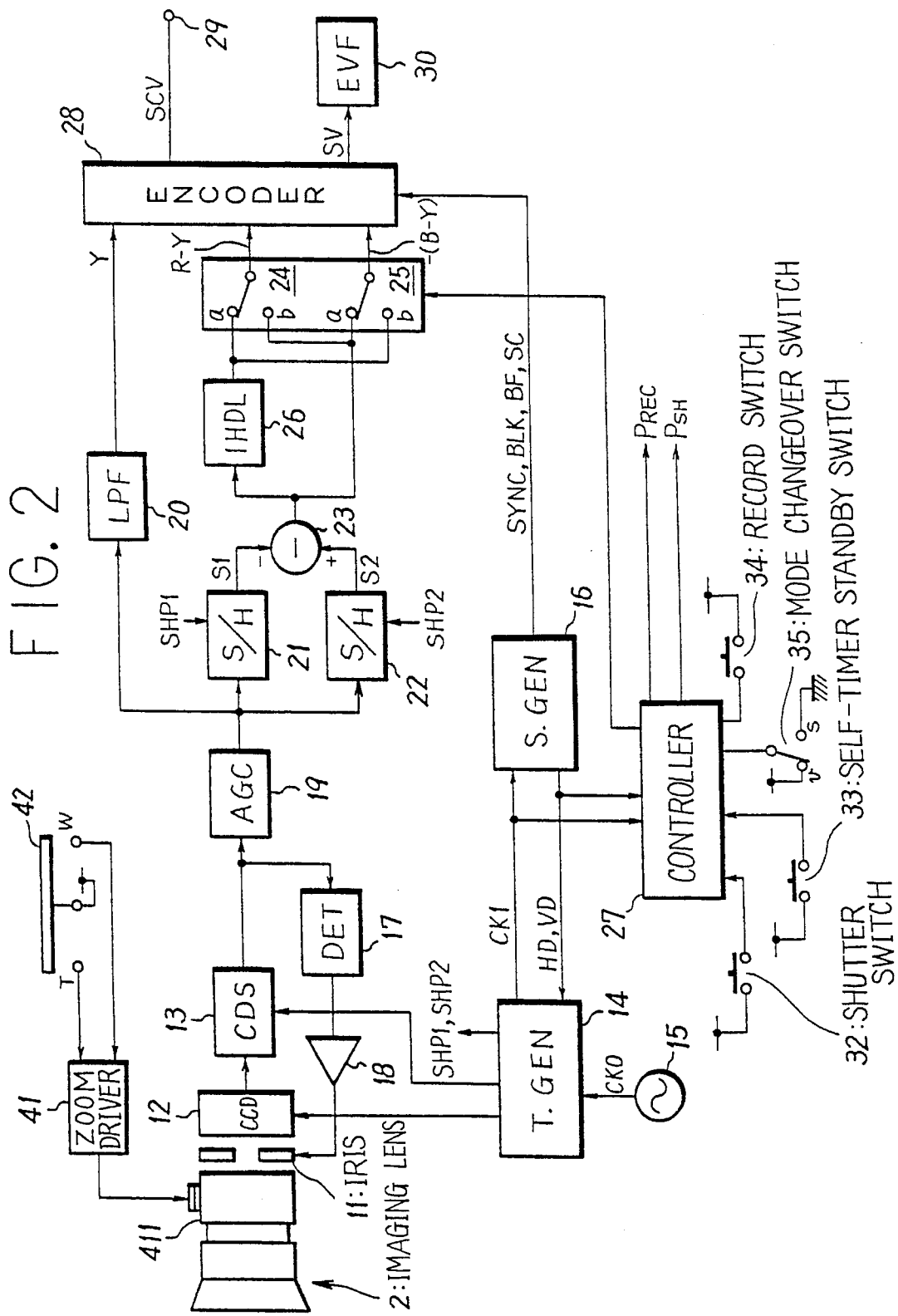
FIG. 2 is a block diagram showing the arrangement of a video camera section.

FIG. 2 shows the arrangement of the video camera section. An image light from an object enters through the imaging lens 2 and an iris 11 and falls upon a single-plate CCD solid-state imaging device 12 having a complementary checkered color filter.

Figure 3:
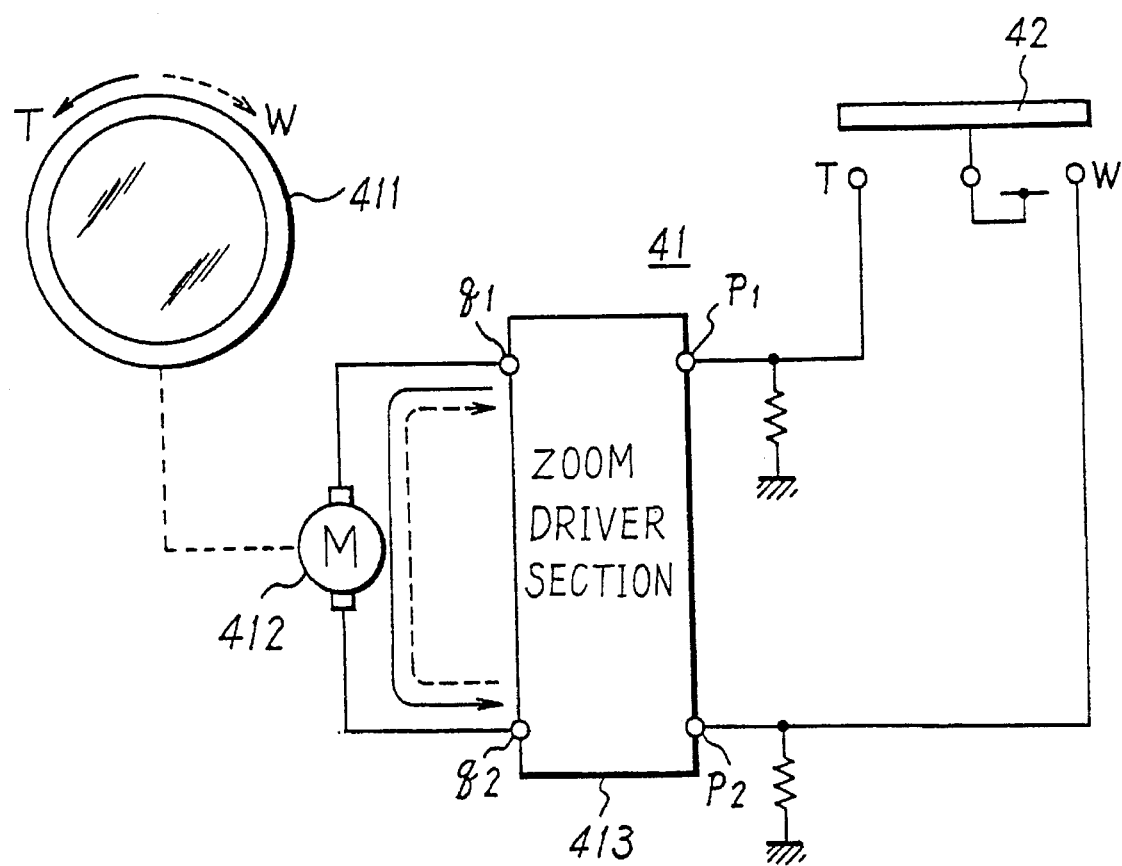
FIG. 3 is a schematic diagram showing the arrangement of a zoom driver.

The zooming power of the imaging lens 2 is adjusted by a zoom driver 41. FIG. 3 shows in detail the arrangement of the zoom driver 41, wherein reference numeral 411 denotes a lens forming the imaging lens 2 for adjusting the zooming power. The lens 411 can be moved back and forth when rotated, whereby the zooming power is adjusted. For example, if the lens 411 is rotated in a direction T, the zooming power changes in the TELE direction; if the lens is rotated in a direction W, the zooming power changes in the WIDE direction.

The lens 411 is rotated by a DC motor 412, which has both ends connected to output terminals q1 and q2 of a zoom driver unit 413, respectively. Input terminals p1 and p2 of the zoom driver unit 413 are respectively connected to fixed terminals T and W of a zoom switch 42.

In this arrangement, when a high-level "H" signal is supplied to the terminal p1, a current flows through the motor 412 from the terminal q1 to the terminal q2 (as indicated by the solid line), and the lens 411 is rotated in the direction T. On the other hand, when a high-level "H" signal is supplied to the terminal p2, a current flows through the motor 412 from the terminal q2 to the terminal q1 (as indicated by the dashed line), and the lens 411 is rotated in the direction W. When neither the terminal p1 nor the terminal p2 is supplied with a high-level "H" signal, no current flows through the motor 412, and accordingly, the lens 411 is not rotated in either direction and the position thereof is maintained.

A movable terminal of the zoom switch 42 is connected to a power supply terminal. When the operating button 5T or 5W of the aforementioned carbinet 1 is pressed, the zoom switch 42 is connected to the terminal T or W, and a high-level "H" signal is supplied to the terminal p1 or p2 of the zoom driver unit 413, whereby the zooming power is adjusted in the TELE or WIDE direction.

Figures 4, 5:
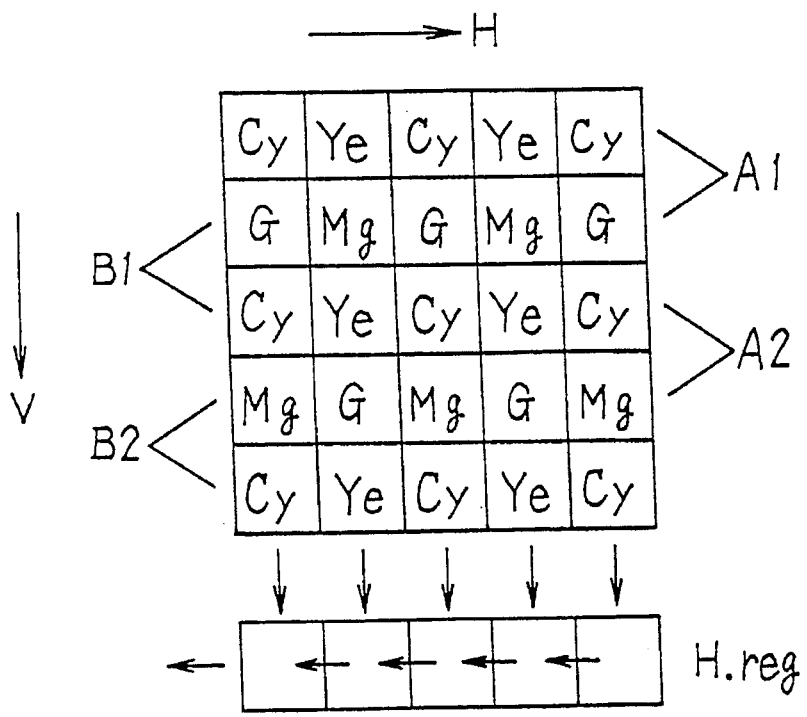
FIG. 4 is a diagram showing color coding of an imaging device.
FIG. 5 is a diagram showing an output of a horizontal output register of the imaging device.

FIG. 4 is a schematic diagram showing color coding of the imaging device 12, and as illustrated, a field readout is carried out. In A field, charges are mixed in pairs, such as a pair of A1 and A2, and in B field, charges are mixed in pairs, such as a pair of B1 and B2. For the A field, charges are output in order of A1, A2, . . . , and for the B field in order of B1, B2, . . . , from a horizontal shift register Hreg.

As shown in FIG. 4, the order of charges a, b, . . . , is (Cy+G), (Ye+Mg), . . . , in A1 line, (Cy+Mg), (Ye+G), . . . in A2 line, (G+Cy), (Mg+Ye), . . . in B1 line, and (MK+Cy), (G+Ye), . . . in B2 line.

The output signal of the imaging device 12 is supplied to a CDS circuit (correlation double sampling circuit) 13 and is extracted thereby as an image signal. By using the CDS circuit 13, it is possible to reduce reset noise, as is known in the art.

Timing pulses needed by the imaging device 12 and the CDS circuit 13 are produced by a timing generator 14. The timing generator 14 is supplied with reference clock pulses CK0 at 8 fsc (fsc represents the color subcarrier frequency) from an oscillator 15, as well as horizontal and vertical synchronizing signals HD and VD from a synchronizing generator 16. The synchronizing generator 16 is supplied with clock pulses CK1 at 4 fsc from the timing generator 14.

An image signal output from the CDS circuit 13 is supplied to a level detecting circuit 17, which outputs a signal to an iris driver 18. The iris driver 18 automatically controls the aperture of the iris 11.

A process for obtaining a luminance signal Y and a chroma signal (color differential signal) from the image signal output from the CDS circuit 13 will be explained.

The luminance signal Y is obtained by adding adjacent signals together. Namely, referring to FIG. 5, summation signals are derived in sequence of a+b, b+c, c+d, d+e, . . .

For example, the A1 line can be approximated as shown in the following equation:

$$Y = \{(Cy+G) + (Ye+Mg)\} \times 1/2$$
$$= (2B + 3G + 2R) \times 1/2$$

where Cy=B+G, Ye=R+G, and Mg=B+R.

The A2 line can be approximated as follows:

$$Y = \{(Cy+Mg) + (Ye+G)\} \times 1/2$$
$$= (2B + 3G + 2R) \times 1/2$$

The other lines in the A filed and the lines in the B field can be approximated in a similar manner.

The chroma signal is obtained by subjecting adjacent signals to a subtraction.

For example, the A1 line can be approximated as shown in the following equation:

$$R - Y = (Ye+Mg) - (Cy+G)$$
$$= (2R - G)$$

The A2 line can be approximated as follows:

$$-(B-Y) = (Ye+G) - (Cy+Mg)$$
$$= -(2B - G)$$

Similarly, for the other lines in the A field and the lines in the B field, a red differential signal R−Y and a blue differential signal −(B−Y) are alternately derived in a line sequential manner.

Referring again to FIG. 2, the image signal output from the CDS circuit 13 is supplied to a low-pass filter 20 constituting a luminance processing unit through an AGC circuit 19. The low-pass filter 20 carries out an addition (averaging) of adjacent signals, and accordingly, a luminance signal Y is output therefrom.

Figure 6:
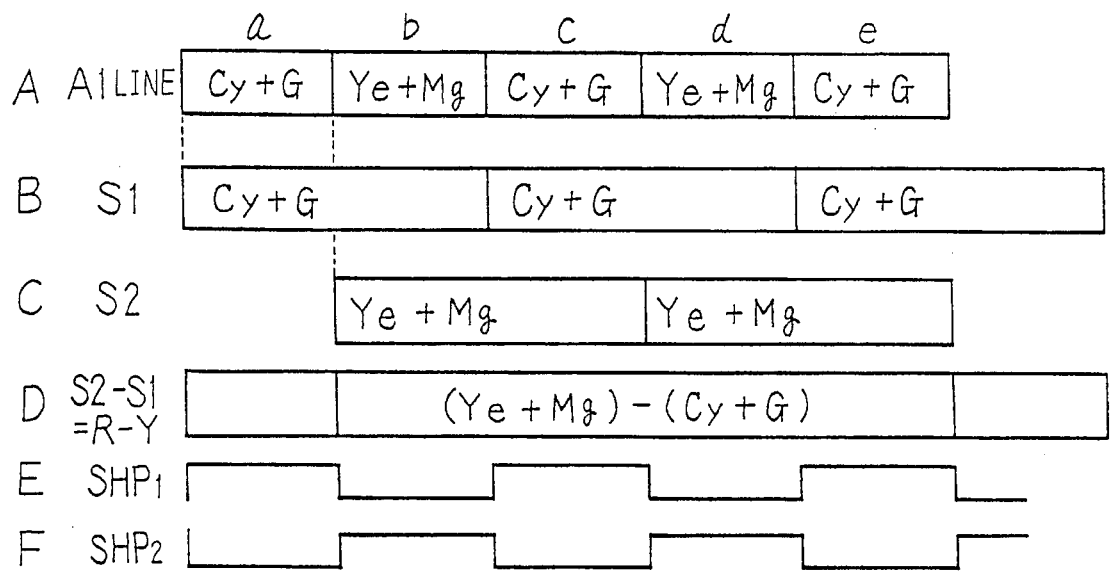
FIG. 6 is a diagram illustrating a chrominance signal processing.

The image signal output from the AGC circuit 19 is supplied to sample holding circuits 21 and 22 forming a chroma processing unit. The sample holding circuits 21 and 22 are supplied with sampling pulses SHP1 and SHP2 (indicated at E and F in FIGS. 6 and 7), respectively, from the timing generator 14. In FIG. 6, A shows the signal of the A1 line, and in FIG. 7, A shows the signal of the A2 line.

Figure 7:
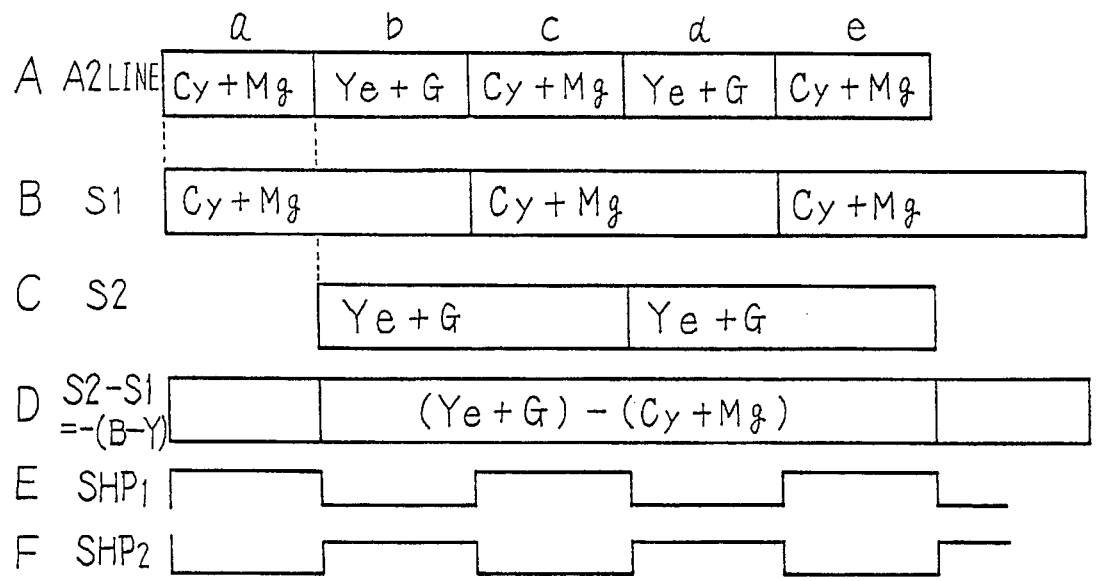
FIG. 7 is a diagram also illustrating the chrominance signal processing.

The sample holding circuit 21 outputs a continuous signal S1 of (Cy+G) or (Cy+Mg) to a subtracter 23 (see B in FIGS. 6 and 7), and the sample holding circuit 22 outputs a continuous signal S2 of (Ye+Mg) or (Ye+G) to the subtracter 23 (see C in FIGS. 6 and 7).

The subtracter 23 subtracts the signal S1 from the signal S2, whereby a red differential signal R–Y and a blue differential signal –(B–Y) are alternately output therefrom in a line sequential manner (as indicated at D in FIGS. 6 and 7).

The color differential signals output from the subtracter 23 are supplied directly to a fixed terminal b of a changeover switch 24 and a fixed terminal a of a changeover switch 25, and also supplied to a fixed terminal a of the changeover switch 24 and a fixed terminal b of the changeover switch 25 via a delay circuit 26 having a delay time corresponding to one horizontal period.

The switching operation of the changeover switches 24 and 25 is controlled by a controller 27. Specifically, the switches are connected to the respective terminals b during a horizontal period in which the red differential signal R–Y is output from the subtracter 23, and connected to the respective terminals a during a horizontal period in which the blue differential signal –(B–Y) is output. The controller 27 is supplied with the synchronizing signals HD and VD as reference synchronizing signals from the synchronizing generator 16, and the clock pulses CK1 from the timing generator 14.

Since the changeover switches 24 and 25 are operated in the above-described manner, a red differential signal R–Y is output from the changeover switch 24 in each horizontal period and a blue differential signal –(B–Y) is output from the changeover switch 25 in each horizontal period.

The luminance signal Y output from the low-pass filter 20 and the color differential signals (R–Y) and –(B–Y) output from the changeover switches 24 and 25 are supplied to an encoder 28. The encoder 28 is further supplied with a composite synchronizing signal SYNC, a blanking signal BLK, a burst flag signal BF, and a color subcarrier signal SC from the synchronizing generator 16.

In the encoder 28, as is conventionally known, the luminance signal Y is combined with the synchronizing signal SYNC, and the color differential signals are subjected to quadrature two-phase modulation to form a carrier chrominance signal C and further combined with a color burst signal. The luminance signal Y and the carrier chrominance signal C are added together to form a color video signal SCV according to, e.g., the NTSC system.

The color video signal SCV thus generated by the encoder 28 appears at an output terminal 29. The encoder 28 also generates a monochromatic video signal SV (i.e., the luminance signal Y combined with the synchronizing signal SYNC), which is supplied to an electronic viewfinder 30, and thus the acquired image is displayed at the small-sized CRT.

The controller 27 is connected to a shutter switch 32 which turns on when the shutter button 7 is pressed, a record switch 34 which turns on when the record button 6 is pressed, a self-timer standby switch 33, and a mode changeover switch 35 for switching between a still mode for acquiring a still image and a video mode for acquiring a dynamic image. The still mode is set when the mode changeover switch 35 is connected to a terminal s, and the video mode is set when the switch 35 is connected to a terminal v.

While in the still mode, if the shutter switch 32 is turned on when the standby switch 33 is off, the controller 27 immediately outputs a shutter pulse PSH and a record pulse PREC. On the other hand, while in the still mode, if the shutter switch 32 is turned on after the standby switch 33 is turned on, the controller 27 outputs a shutter pulse PSH and a record pulse PREC upon lapse of a predetermined time, whereby a self-timer function is achieved.

The shutter pulse PSH is used to actuate the mechanical shutter of the photographic camera section (not shown), and the record pulse PREC is used to transfer a still image video signal to a still image recorder (not shown). For the still image recorder, a recorder using a DAT, which the applicant proposed before (Unexamined Japanese Patent Publication No. 2-161661), may be used.

While in the video mode, if the record switch 34 is turned on, the controller 27 immediately outputs a record pulse PREC. This record pulse PREC is used to control the recording operation of a recorder such as a VTR. Further, when the shutter switch 32 is turned on in the video mode, the controller 27 immediately outputs a shutter pulse PSH. This shutter pulse PSH is used to actuate the mechanical shutter of the photographic camera section, as in the still mode described above.

Figure 8:
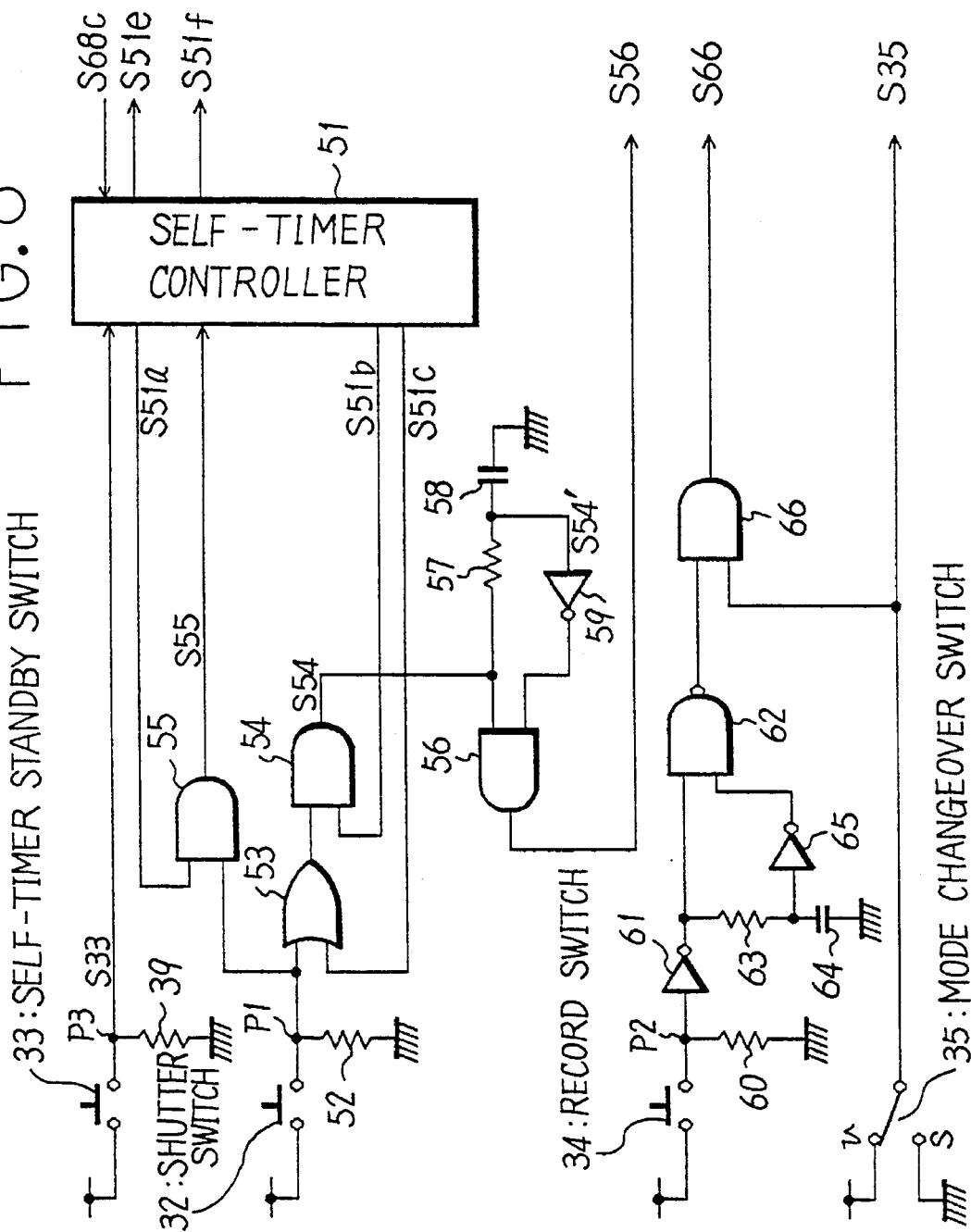
FIG. 8 is a wiring diagram showing the arrangement of a shutter system.
Figure 9:
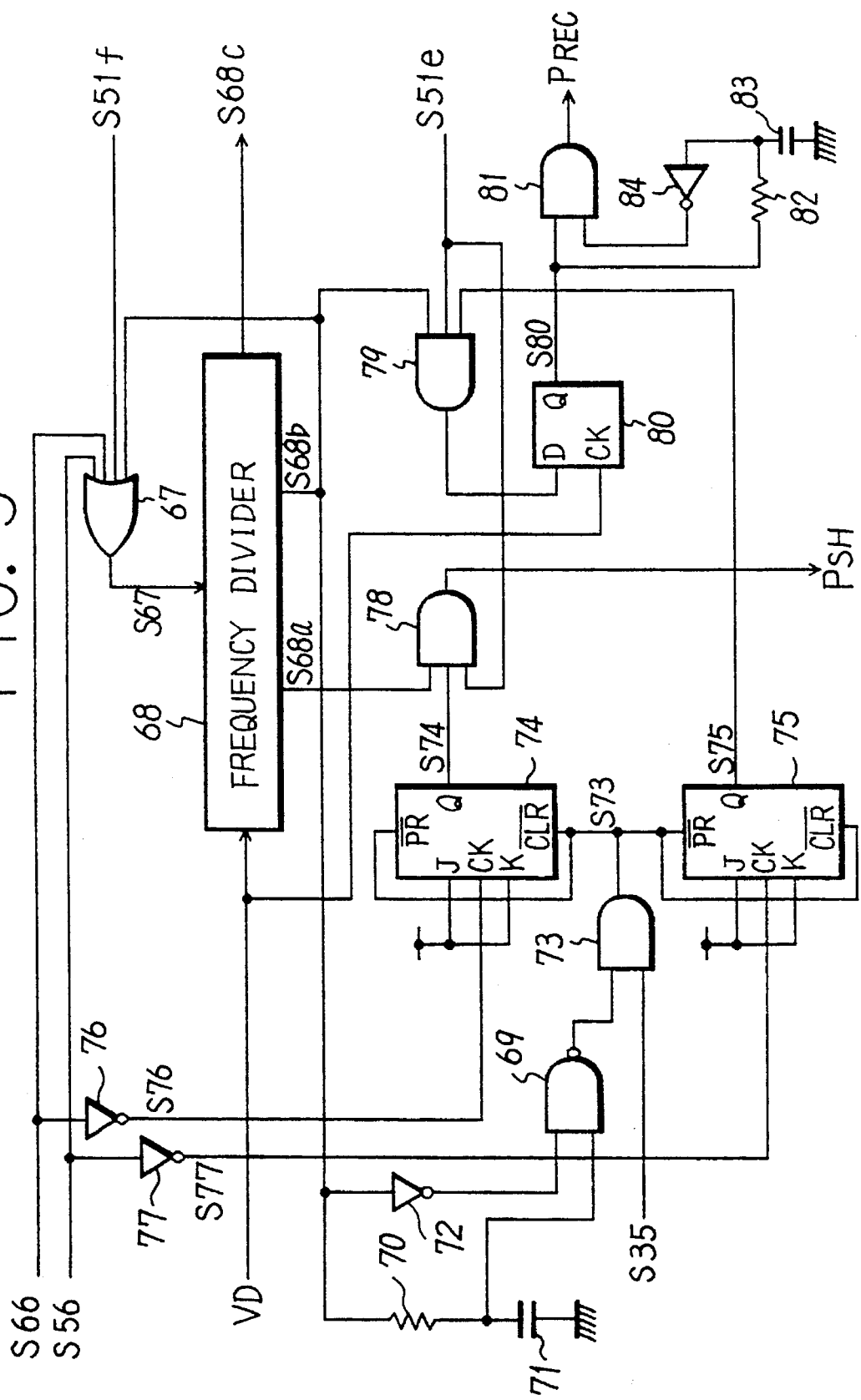
FIG. 9 is a wiring diagram also showing the arrangement of the shutter system.

FIGS. 8 and 9 show the arrangement of a shutter system (shutter pulse generating unit) of the controller 27.

As shown in FIG. 8, a series circuit composed of the self-timer standby switch 33 and a resistor 39 has one end connected to a power supply and the other end grounded, and a signal S33 obtained at the node P3 between the standby switch 33 and the resistor 39 is supplied to a self-timer controller 51. In this arrangement, a self-timer mode is established when the standby switch 33 is turned on during a normal shutter mode, and the normal shutter mode is established when the standby switch 33 is turned on during the self-timer mode.

The controller 51 outputs a signal S51a which is low-level "L" in the normal shutter mode and is high-level "H" in the self-timer mode, and also outputs signals S51b and S51e which are high-level "H" in the normal shutter mode and low-level "L" in the self-timer mode.

When the shutter switch 32 is turned on in the self-timer mode, a count mode is set for a timer count period, and upon lapse of the timer count period, the normal shutter mode is automatically restored, as described later. The controller 51 further outputs a signal S51f which is high-level "H" during the timer count period and is low-level "L" during a period other than the timer count period, and a signal S51c which is set to high level "H" for a predetermined period subsequent to the timer count period.

The controller 51 is supplied with a signal S68c, which is obtained by subjecting the vertical synchronizing signal VD (frequency: fv) to a frequency division of 1/128 at a frequency divider 68, mentioned later, as reference clock pulses for the timer.

A series circuit composed of the shutter switch 32 and a resistor 52 is connected at one end to the power supply and grounded at the other end, and the node P1 between the shutter switch 32 and the resistor 52 is connected to one input terminal of an OR circuit 53. To the other input terminal of the OR circuit 53 is supplied the signal S51c output from the controller 51.

The output signal of the OR circuit 53 is supplied to one input terminal of an AND circuit 54, and the signal S51b output from the controller 51 is supplied to the other input terminal of the AND circuit 54. The node P1 is connected to one input terminal of an AND circuit 55, the other input terminal of which is supplied with the signal S51a output from the controller 51. The output signal S55 of the AND circuit 55 is supplied to the controller 51.

The output signal S54 of the AND circuit 54 is supplied to one input terminal of an AND circuit 56 and also to an integrating circuit composed of a resistor 57 and a capacitor 58. The output signal S54' of the integrating circuit is supplied to the other input terminal of the AND circuit 56 through an inverter 59, and the AND circuit 56 outputs a shutter signal S56.

Another series circuit composed of the record switch 34 and a resistor 60 is connected at one end to the power supply and grounded at the other end, and the node P2 between the record switch 34 and the resistor 60 is connected to one input terminal of a NAND circuit 62 through an inverter 61. The output signal of the inverter 61 is supplied to an integrating circuit composed of a resistor 63 and a capacitor 64, and the output signal of the integrating circuit is supplied to the other input terminal Of the NAND circuit 62 through an inverter 65. The output signal of the NAND circuit 62 is supplied to one input terminal of an AND circuit 66.

The fixed terminal v of the mode changeover switch 35 is connected to the power supply, while the fixed terminal s of the same switch is grounded, and a signal S35 output from the movable terminal of the switch 35 is supplied to the other input terminal of the AND circuit 66. The AND circuit 66 outputs a record signal S66.

As shown in FIG. 9, the shutter signal S56 and the record signal S66, output respectively from the AND circuits 56 and 66, are supplied to an OR circuit 67, which then outputs a signal S67 to the aforesaid frequency divider 68. The frequency divider 68 is also supplied with the vertical synchronizing signal VD as a frequency-divided signal. The frequency divider 68 outputs a signal S68a obtained through a frequency division of ½, a signal S68b obtained through a frequency division of 1/64, and the aforesaid signal S68c obtained through a frequency division of 1/128. The signal S68c is supplied to the controller 51 as the reference clock pulses for the timer, as mentioned above. The frequency divider 68 is designed to carry out the frequency division when the output signal S67 of the OR circuit 67 is high-level "H" and not to carry out the frequency division when the signal S67 is low-level "L."

The OR circuit 67 is supplied with the signals S51f and S68b output from the controller 51 and the frequency divider 68, respectively, in addition to the aforesaid signals S56 and S66.

The signal S68b output from the frequency divider 68 is supplied to an integrating circuit formed by a series circuit including a resistor 70 and a capacitor 71 and, through an inverter 72 to one input terminal of a NAND circuit 69. The output signal of the integrating circuit is supplied to the other input terminal of the NAND circuit 69.

The output signal of the NAND circuit 69 is supplied to one input terminal of an AND circuit 73, the other input terminal of which is supplied with the output signal S35 of the mode changeover switch 35. The output signal S73 of the AND circuit 73 is supplied to the clear terminal (CLR bar) and preset terminal (PR bar) of each of J-K flip-flops 74 and 75.

The J and K terminals of each of the flip-flops 74 and 75 are connected to the power supply, and the clock terminals CK of the flip-flops 74 and 75 are supplied with the signals S66 and S56 through inverters 76 and 77, respectively.

A signal S74 output from the noninverting output terminal Q of the flip-flop 74 is supplied to an AND circuit 78. The AND circuit 78 is also supplied with the signals S68a and S51e output from the frequency divider 68 and the controller 51, respectively. The AND circuit 78 outputs the shutter pulse PSH, as described later.

A signal S75 output from the noninverting output terminal Q of the flip-flop 75 is supplied to an AND circuit 79, which is also supplied with the signals S68b and S51e output from the frequency divider 68 and the controller 51, respectively. The output signal of the AND circuit 79 is supplied to the D terminal of a D flip-flop 80. The clock terminal CK of the flip-flop 80 is supplied with the vertical synchronizing signal VD.

A signal output from the noninverting output terminal Q of the flip-flop 80 is supplied to one input terminal of an AND circuit 81, and also to an integrating circuit formed by a series circuit including a resistor 82 and a capacitor 83. The output signal of the integrating circuit is supplied to the other input terminal of the AND circuit 81 via inverter 84. The AND circuit 81 outputs the record pulse PREC, as described later.

In the above-described arrangement, when the normal shutter mode is set during the still mode in which the mode changeover switch 35 is connected to the terminal s, the output signal S35 of the mode changeover switch 35 turns low "L" (shown in FIG. 10B) while the signal S51e output from the controller 51 is high-level "H" (shown in FIG. 10A).

While in this state, if the shutter switch 32 is turned on, the output signal S54 of the AND circuit 54 becomes high-level "H" during the "on" period for which the switch 32 remains in an on state (see FIG. 10C). In this case, the integrating circuit composed of the resistor 57 and the capacitor 58 outputs a signal S54' having a waveform as indicated by the dashed line in FIG. 10C, and accordingly, when the shutter switch 32 is turned on, the shutter signal S56 becomes high-level "H" (FIG. 10E) and the inverter 77 outputs a signal S77 as shown in FIG. 10M.

Figure 10:
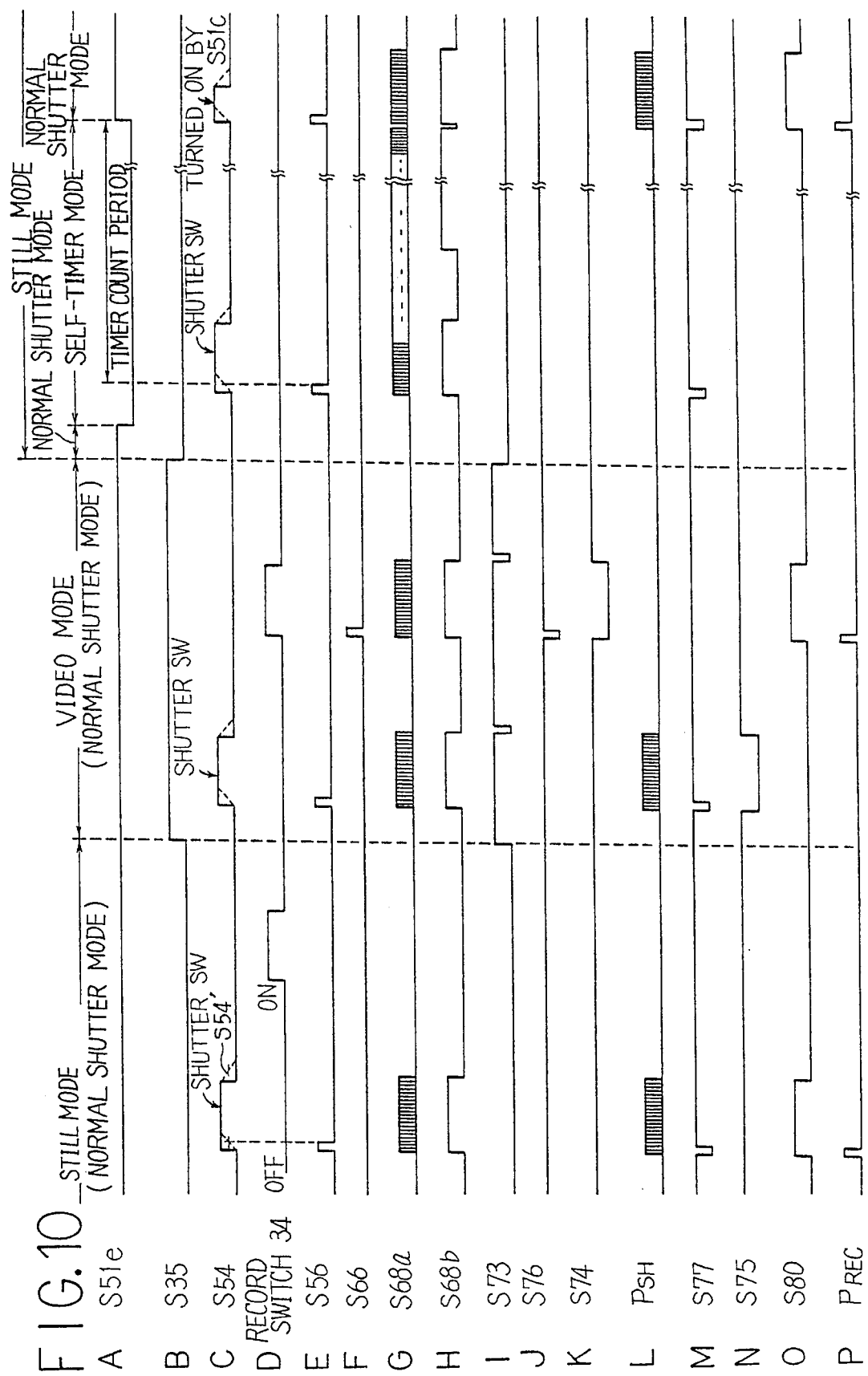
FIG. 10 is a timing chart showing an operation of the shutter system.

In response to the rise to high level "H" of the shutter signal S56, the output signal of the OR circuit 67 becomes high-level "H," and accordingly, the frequency divider 68 starts counting and outputs the signals S68a and S68b (indicated at G and H in FIG. 10).

Since, in the still mode, the output signal S35 of the mode changeover switch 35 is low-level "L," the output signal S73 of the AND circuit 73 is low-level "L" (FIG. 10I). The signals S74 and S75 output from the noninverting output terminals Q of the respective flip-flops 74 and 75 are both high-level "H" (indicated at K and N in FIG. 10).

Therefore, the AND circuit 78 outputs a high-level "H" shutter pulse PSH (FIG. 10L) immediately after the shutter switch 32 is turned on. The noninverting output terminal Q of the flip-flop 80 outputs a signal S80 as shown in FIG. 10, and therefore, the AND circuit 81 outputs a high-level "H" record pulse PREC (FIG. 10P) immediately after the shutter switch 32 is turned on.

Since, in the still mode, the output signal S35 of the mode changeover switch 35 is low-level "L," the record signal S66 does not turn to high level "H" (FIG. 10F) even when the record switch 34 is turned on (FIG. 10D). Accordingly, even if the record switch 34 is turned on, neither the shutter pulse PSH nor the record pulse PREC is output.

When the self-timer mode is set during the still mode in which the mode changeover switch 35 is connected to the terminal s, the output signal S35 of the mode changeover switch 35 is low-level "L" (FIG. 10B) and the signal S51e output from the controller 51 becomes low-level "L" (FIG. 10A).

While in this state, if the shutter switch 32 is turned on, the output signal S54 of the AND circuit 54 becomes high-level "H" during the "on" period for which the switch 32 remains on (shown in FIG. 10C). In this case, the integrating circuit composed of the resistor 57 and the capacitor 58 outputs a signal S54' having a waveform as indicated by the dashed line in FIG. 10C, and accordingly, when the shutter switch 32 is turned on, the shutter signal S56 becomes high-level "H" (FIG. 10E) and the inverter 77 outputs a signal S77 as shown in FIG. 10M.

In response to the rise to high level "H" of the shutter signal S56, the output signal of the OR circuit 67 becomes high-level "H," and accordingly, the frequency divider 68 starts counting. Since the signal S51f output from the controller 51 remains high-level "H" during the timer count period, the signals S68a and S68b are output from the frequency divider 68 over the timer count period (indicated at G and H in FIG. 10).

Since, in the still mode, the output signal S35 of the mode changeover switch 35 is low-level "L," the output signal S73 of the AND circuit 73 is low-level "L" (shown in FIG. 10I). The signals S74 and S75 output from the noninverting output terminals Q of the respective flip-flops 74 and 75 are both high-level "H" (indicated at K and N in FIG. 10). However, since in the self-timer mode, the signal S51e output from the controller 51 is low-level "L" (FIG. 10A), the shutter pulse PSH and the record pulse PREC are not immediately output if the shutter switch 32 is turned on, unlike the normal shutter mode described above.

When the timer count period has passed, the self-timer mode switches to the normal shutter mode. Immediately after the timer count period ends, the signal S51c output from the controller 51 turns to high-level "H" for a predetermined period, whereby the output signal S54 of the AND circuit 54 becomes high-level "H" (see FIG. 10C). Accordingly, the shutter signal S56 becomes high-level "H" (FIG. 10E) upon lapse of the timer count period.

In response to the rise to high level "H" of the shutter signal S56, the output signal of the OR circuit 67 becomes high-level "H," and accordingly, the frequency divider 68 starts counting and outputs the signals S68a and S68b (indicated at G and H in FIG. 10).

Since, in the still mode, the output signal S35 of the mode changeover switch 35 is low-level "L," the output signal S73 of the AND circuit 73 is low-level "L" (FIG. 10I), and the signals S74 and S75 output from the noninverting output terminals Q of the respective flip-flops 74 and 75 are both high-level "H" (indicated at K and N in FIG. 10). Further, in the normal shutter mode, the signal S51e output from the controller 51 is high-level "H" (FIG. 10A). Therefore, immediately after the timer count period has passed, a high-level "H" shutter pulse PSH is output from the AND circuit 78 (FIG. 10L) and a high-level "H" record pulse PREC is output from the AND circuit 81 (FIG. 10P).

In the video mode in which the mode changeover switch 35 is connected to the terminal v, the output signal S35 of the mode changeover switch 35 is high-level "H" (FIG. 10B), and in the normal shutter mode, the signal S51e output from the controller 51 is high-level "H" (FIG. 10A).

While in this state, if the shutter switch 32 is turned on, the output signal S54 of the AND circuit 54 becomes high-level "H" during the "on" period for which the switch 32 remains on (shown in FIG. 10C). In this case, the integrating circuit composed of the resistor 57 and the capacitor 58 outputs a signal S54' having a waveform as indicated by the dashed line in FIG. 10C, and accordingly, when the shutter switch 32 is turned on, the shutter signal S56 becomes high-level "H" (FIG. 10E) and the inverter 77 outputs a signal S77 as shown in FIG. 10M.

In response to the rise to high level "H" of the shutter signal S56, the output signal of the OR circuit 67 becomes high-level "H," and accordingly, the frequency divider 68 starts counting and outputs the signals S68a and S68b (indicated at G and H in FIG. 10).

Since, in the video mode, the output signal S35 of the mode changeover switch 35 is high-level "H," when the shutter signal S56 becomes high level "H", the output signal S73 of the AND circuit 73 has a state of high level "H" (as shown in FIG. 10I). In this case, since the record signal. S66 remains low-level "L" and thus the output signal S76 of the inverter 76 remains high-level "H" (shown in FIG. 10J), the output signal S74 from the noninverting output terminal Q of the flip-flop 74 remains-high-level "H" (see FIG. 10K). Therefore, a high-level "H" shutter pulse PSH is output from the AND circuit 78 (FIG. 10L) immediately after the shutter switch 32 is turned on.

In response to the rise to high level "H" of the shutter signal S56, the output signal S77 of the inverter 77 becomes low-level "L" (FIG. 10M) and the output signal S75 from the noninverting output terminal Q of the flip-flop 75 becomes low-level "L" (FIG. 10N). Accordingly, even if the shutter switch 32 is turned on, the AND circuit 81 does not output a high-level "H" record pulse PREC (shown in FIG. 10P).

When the record switch 34 is turned on (see FIG. 10D) in the video mode, the record signal S66 output from the AND circuit 66 becomes high-level "H" (FIG. 10F) because the output signal S35 of the mode changeover switch 35 is high-level "H" (FIG. 10B), and therefore, the inverter 76 outputs a signal S76 as shown in FIG. 10J.

In response to the rise to high level "H" of the record signal S66, the output signal of the OR circuit 67 becomes high-level "H," and accordingly, the frequency divider 68 starts counting and outputs the signals S68a and S68b (indicated at G and H in FIG. 10).

Since, in the video mode, the output signal S35 of the mode changeover switch 35 is high-level "H," the output signal S73 of the AND circuit 73 becomes high-level "H" (shown in FIG. 10I) corresponding to the rise to high level "H" of the record signal S66. In this case, since the shutter signal S56 remains low-level "L" and thus the output signal. S77 of the inverter 77 remains high-level "H" (see FIG. 10M), the output signal S75 from the noninverting output terminal Q of the flip-flop 75 remains high-level "H" (see FIG. 10N). Therefore, a high-level "H" record pulse PREC is output from the AND circuit 81 (FIG. 10P) immediately after the record switch 34 is turned on.

In response to the rise to high level "H" of the record signal S66, the output signal S76 of the inverter 76 becomes low-level "L" (see FIG. 10J) and the output signal S74 from the noninverting output terminal Q of the flip-flop 74 becomes low-level "L" (FIG. 10K). Accordingly, even if the record switch 34 is turned on, the AND circuit 78 does not output a high-level "H" shutter pulse PSH (FIG. 10L).

Although not described in detail, the self-timer mode can be set also in the video mode, by operating the standby switch 88. In this ease, if the shutter switch 32 is turned on, the AND circuit 78 outputs a high-level "H" shutter pulse PSH upon lapse of the timer count period.

Figure 11:
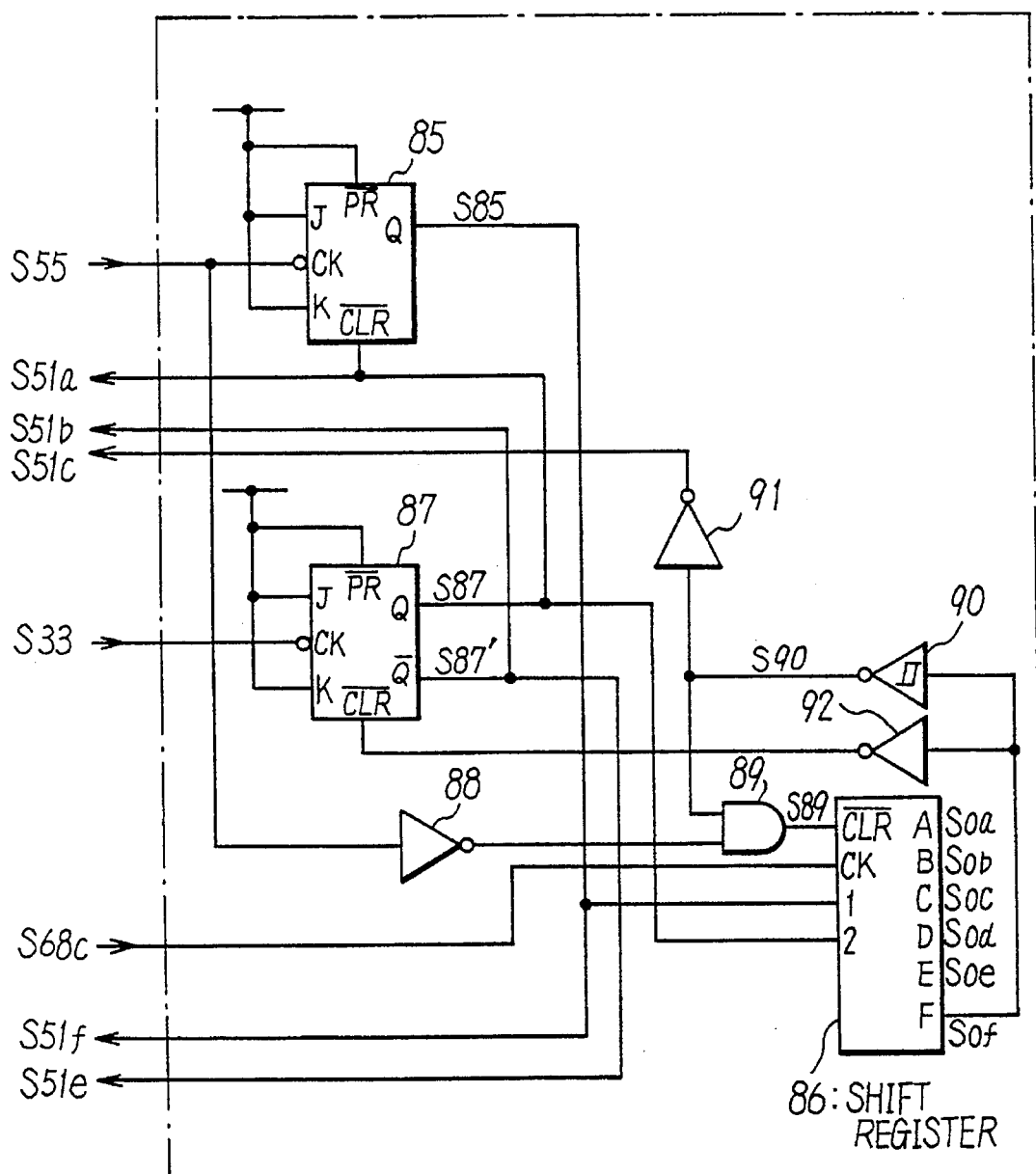
FIG. 11 is a wiring diagram showing the arrangement of a self-timer controller.

FIG. 11 shows the arrangement of the self-timer controller 51 in detail. As shown in the figure, the output signal of the AND circuit 55 is inverted and applied to the clock terminal CK of a J-K flip-flop 85. The flip-flop 85 is supplied with a high-level "H" signal at each of the J and K terminals thereof, and thus is set to perform a flip-flop action. A high-level "H" signal is also supplied to the preset terminal (PR bar) of the flip-flop 85. A signal S85 appearing at the noninverting output terminal Q of the flip-flop 85 is output as the signal S51f and also supplied to an input terminal i of a shift register 86.

When a low-level "L" signal is supplied to the clear terminal (CLR bar) or input terminal 2 of the shift register 86, the shift register 86 is cleared. When a high-level "H" signal is supplied to both the clear terminal (CLR bar) and input terminal 2 of the shift register 86, the signal supplied to the input terminal 1 is shifted successively to output terminals A–F and output in synchronism with the clock pulse.

The signal S33 obtained at the node P3 between the standby switch 33 and the resistor 39 is inverted and applied to the clock terminal CK of a J-K flip-flop 87. The flip-flop 87 is supplied with a high-level "H" signal at each of the J and K terminals thereof, and thus is set to perform a flip-flop action. A high-level "H" signal is also supplied to the preset terminal (PR bar) of the flip-flop 87.

A signal S87 appearing at the noninverting output terminal Q of the flip-flop 87 is output as the signal S51a and also supplied to the clear terminal (CLR bar) of the flip-flop 85 and the input terminal 2 of the shift register 86. A signal S87' appearing at the inverting output terminal (Q bar) of the flip-flop 87 is output as the signals S51b and S51e.

The output signal S55 of the AND circuit 55 is supplied to one input terminal of an AND circuit 89 through an inverter 88, and the output signal S89 of the AND circuit 89 is supplied to the clear terminal (CLR bar) of the shift register 86. A signal Sof output from the output terminal F of the shift register 86 is supplied to the clear terminal (CLR bar) of the flip-flop 87 through an inverter 92. Further, the output signal Sof is supplied to the other input terminal of the AND circuit 89 through an inverter 90 having a hysteresis characteristic, and is also output as the signal S51c through a series circuit composed of the inverters 90 and 91.

The signal S68c output from the frequency divider 68 is supplied to the clock terminal CK of the shift register 86.

The shutter operation carried out by the self-timer will be now described in detail with reference to FIGS. 12 and 13.

Figure 12:
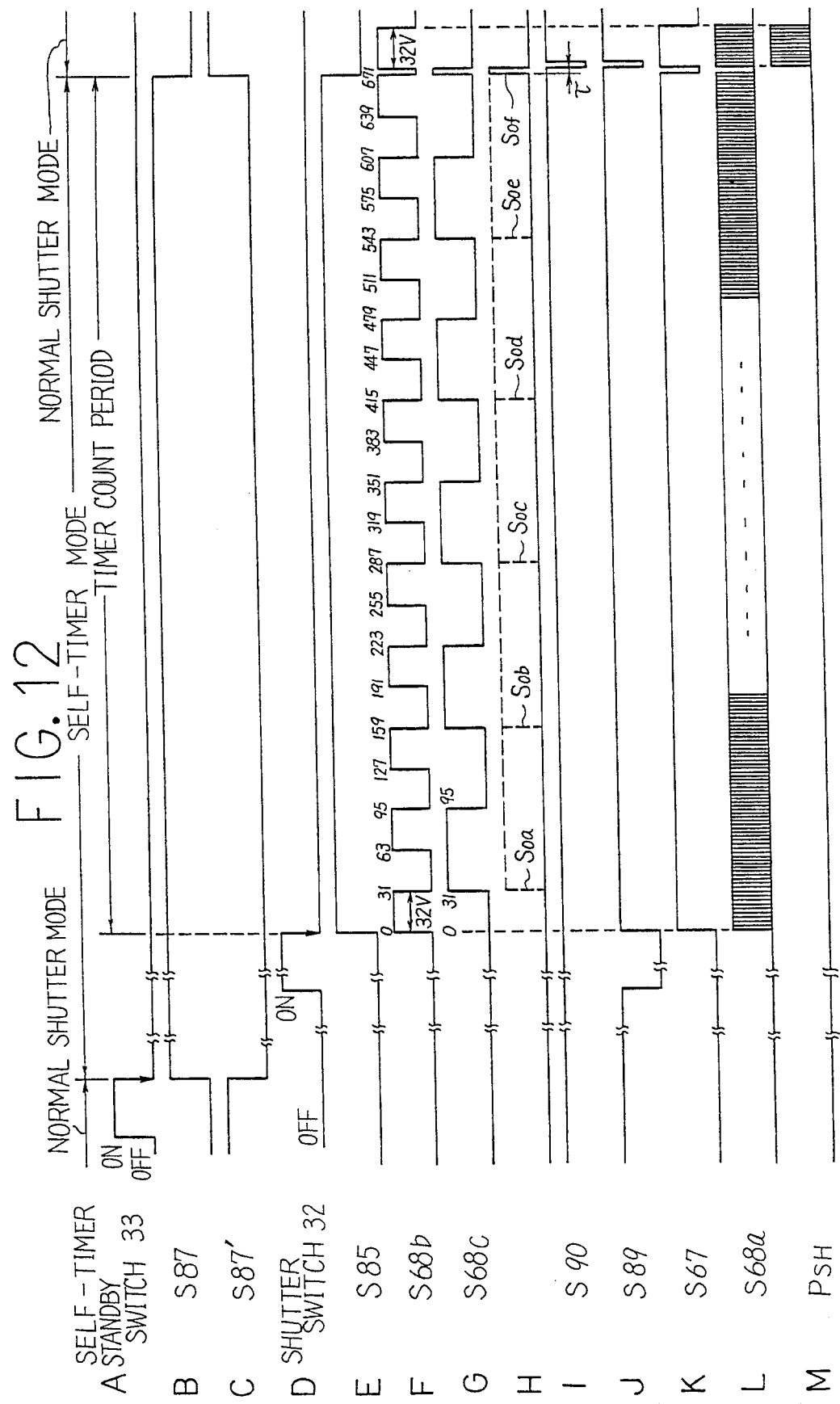
FIG. 12 is a timing chart showing a shutter operation by a self-timer.

When the standby switch 33 is released (turned off) after it is depressed (turned on) (see FIG. 12A), the signal S87 output from the noninverting output terminal Q of the flip-flop 87 changes from low "L" to high level "H," and at the same time, the signal S87' output from the inverting output terminal (Q bar) of the same flip-flop changes from high "H" to low level "L" (indicated at B and C in FIG. 12). Consequently, the mode is switched from the normal shutter mode to the self-timer mode.

While in the self-timer mode, if the shutter switch 32 is once depressed (turned on) and thereafter released (turned off) (see FIG. 12D), the output signal S85 from the noninverting output terminal Q of the flip-flop 85 changes from low level "L" to high level "H" (see FIG. 12E), whereby the timer count period starts.

Upon start of the timer count period, the output signal S67 of the OR circuit 67 turns to high level "H" (shown in FIG. 12K), and therefore, the frequency divider 68 starts the frequency division. Consequently, the frequency-divided signals S68a to S68c are output from the frequency divider 68 (indicated at L, F and G in FIG. 12).

During the timer count period, a high-level "H" signal is supplied from the noninverting output terminal Q of the flip-flop 87 to the input terminal 2 of the shift register 86, a high-level "H" signal is supplied from the AND circuit 89 to the clear terminal (CLR bar) of the shift register 86, and a high-level "H" signal is supplied from the noninverting output terminal Q of the flip-flop 85 to the input terminal 1 of the shift register. FIG. 12J shows the output signal S89 of the AND circuit 89. Accordingly, during the timer count period, the shift register 86 shifts data successively to the output terminals A–F and outputs a high-level "H" signal in a manner timed with the rise of the signal S68c output from the frequency divider 68 (see FIG. 12G). Symbols Soa to Sof in FIG. 12H denote the signals output from the terminals A–F, respectively.

In the timer count period, the zeroth to 671st vertical synchronizing signals VD are supplied, and when the 672nd vertical synchronizing signal VD is supplied, the output signal Sof changes from low "L" to high level "H" (see FIG. 12H), and a low-level "L" signal is supplied from the inverter 92 to the clear terminal (CLR bar) of the flip-flop 87. Consequently, the signal S87 output from the noninverting output terminal Q of the flip-flop 87 changes from high "H" to low level "L" and at the same time the signal S87' output from the inverting output terminal (Q bar) of the same flip-flop changes from low "L" to high level "H" (indicated at B and C in FIG. 12), whereby the self-timer mode is ended.

At this time, since a low-level "L" signal is supplied from the noninverting output terminal Q of the flip-flop 87 to the input terminal 2 of the shift register 86, the shift register 86 is cleared and the signals Soa to Sol at the output terminals A to F become low-level "L" (shown in FIG. 12H).

Furthermore, a low-level "L" signal is supplied from the noninverting output terminal Q of the flip-flop 87 to the clear terminal (CLR bar) of the flip-flop 85, and thus the signal S85 output from the noninverting output terminal Q of the flip-flop 85 changes from high "H" to low level "L" (see FIG. 12E). Accordingly, the output signal S67 of the OR circuit 67, which is supplied to the frequency divider 68, becomes low-level "L" (shown in FIG. 12K), whereby the frequency division by the frequency divider 68 is stopped and a low-level "L" signal appears at each of the frequency-divided signal output terminals (indicated at L, F and G in FIG. 12).

Since the inverter 90 has a hysteresis characteristic as mentioned above, the output signal S90 thereof changes from high "H" to low level "L" (FIG. 12I) upon lapse of a predetermined period τ after the signal Sof output from the output terminal F of the shift register 86 has changed from low "L" to high level "H." Consequently, the output signal of the AND circuit 54 becomes high-level "H" and the output signal 67 of the OR circuit 67, which is supplied to the frequency divider 68, becomes high-level "H" (shown in FIG. 12K), whereby the frequency divider 68 restarts the frequency division.

During a period in which the zeroth to 31st vertical synchronizing signals VD are supplied after the restart of the frequency division by the frequency divider 68, the output signal S68b of the frequency divider 68 remains high-level "H" (shown in FIG. 12F) and the output signal S67 of the OR circuit 67 also remains high level "H," whereby the frequency division is continued (see FIG. 12K). However, when the 32nd vertical synchronizing signal VD is supplied, the output signal S68b of the frequency divider 68 changes from high "H" to low level "L" (see FIG. 12F). Accordingly, the output signal S67 of the OR circuit 67 changes from high "H" to low level "L" (FIG. 12K), and the frequency division by the frequency divider 68 is stopped.

The frequency-divided signal S68a is output from the frequency divider 68 (see FIG. 12L) during the period in which the frequency division is carried out (i.e., the timer count period plus subsequent 32 vertical periods). Since the signal S87' output from the inverting output terminal (Q bar) of the flip-flop 87 turns high "H" at the end of the timer count period, the frequency-divided signal S68a output from the frequency divider 68 during the 32 vertical periods following the timer count period is output from the AND circuit 78 as the shutter pulse PSH (see FIG. 12M).

Figure 13:
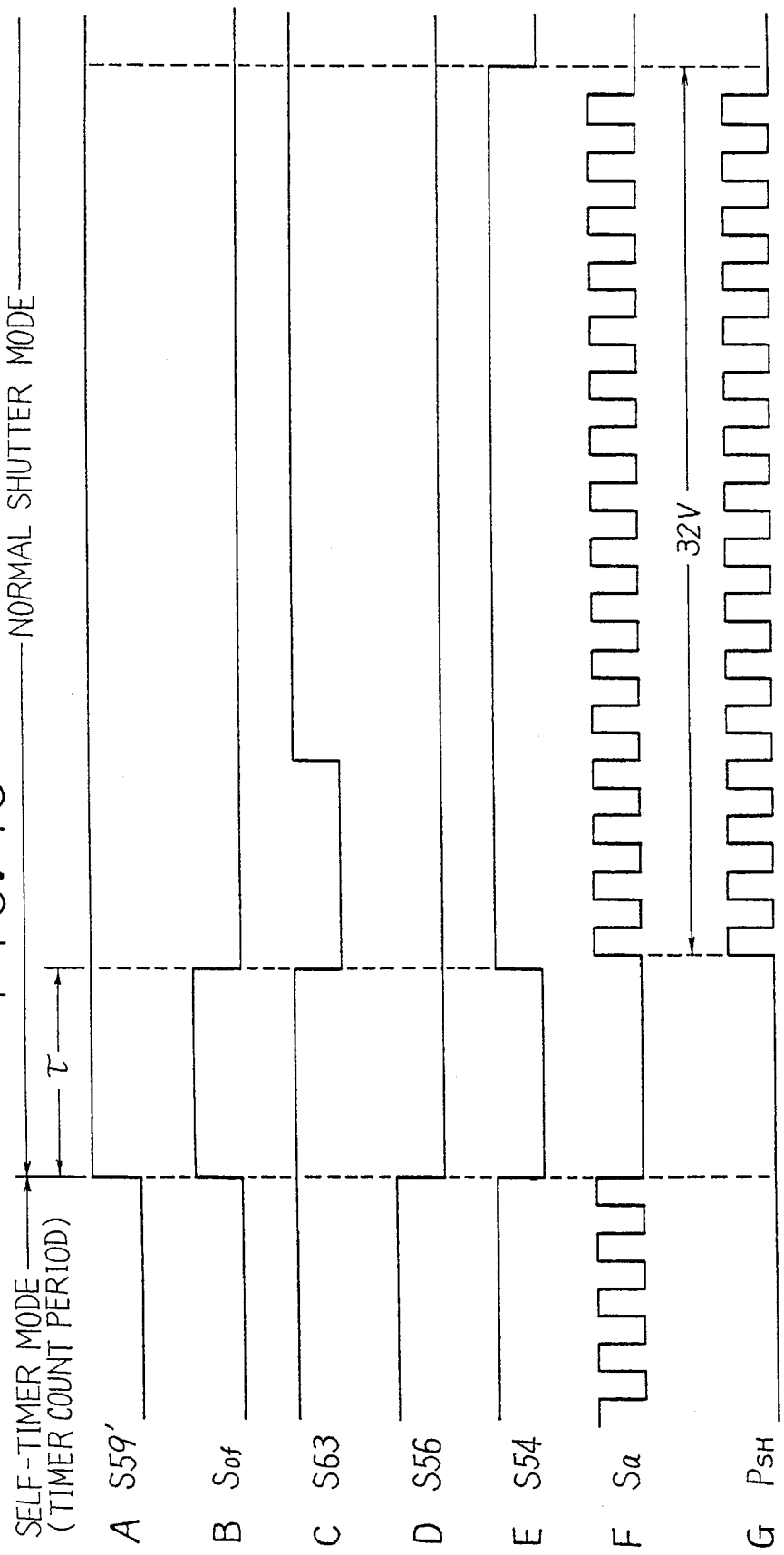
FIG. 13 is a timing chart also showing a shutter operation by the self-timer.

In FIG. 13, A through G illustrate states of principal ones of the signals shown in FIG. 12 before and after the end of the timer count period along an enlarged time base.

As mentioned above, when the shutter switch 32 is turned on and then turned off during the self-timer mode, the shutter pulse PSH is output after the end of the timer count period (about 672 vertical periods, nearly equal to 11.2 sec). When the timer count period ends, the self-timer mode is automatically canceled and the normal shutter mode is restored.

According to this embodiment, in the still mode, the shutter pulse PSH and the record pulse PREC are output in response to an operation of the shutter switch 32, and in the video mode, the record pulse PREC is output in response to an operation of the record switch 34 and the shutter pulse PSH is output in response to an operation of the shutter switch 32. Therefore, the shutter pulse PSH and the record pulse PREC can be output appropriately in both the still mode and the video mode.

Further, in this embodiment, in both the normal shutter mode and the self-timer mode, the shutter pulse PSH synchronized with the vertical synchronizing signal VD can be obtained from the output signal S68a of the frequency divider 68, by operating the shutter switch 32. Furthermore, during the timer count period in the self-timer mode, the shift register 86, and thus the timer, is driven by the output signal S68c of the frequency divider 68. Since the frequency divider 68 is thus used for different purposes, the circuitry of the shutter system can be simplified, compared with that in a conventional system.

Figure 14:
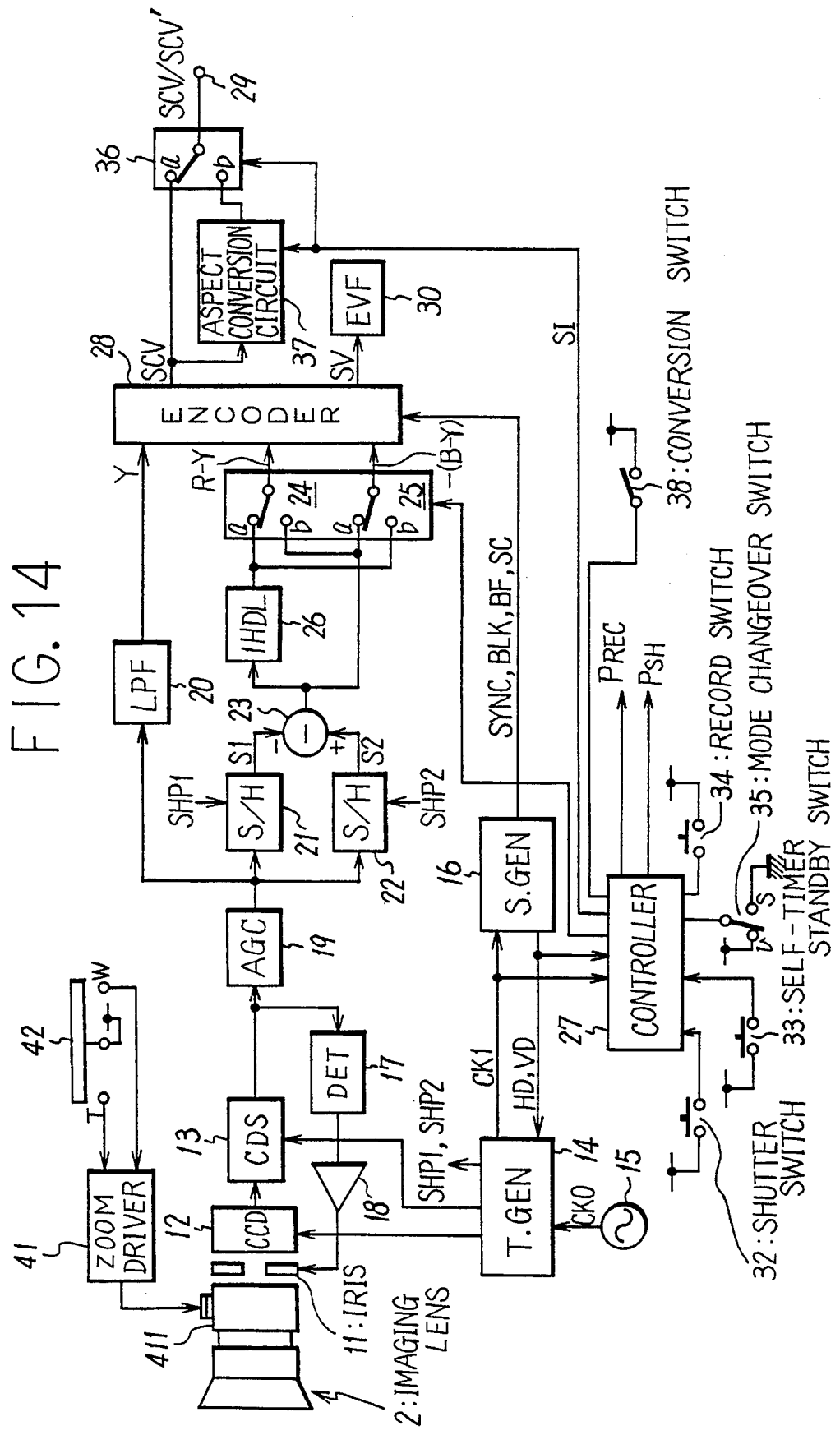
FIG. 14 is a block diagram showing the arrangement of a video camera section.

Another embodiment of the present invention will be described with reference to the drawings. FIG. 14 is a block diagram showing the arrangement of a video camera section according to this embodiment. In FIG. 14, like reference numerals are used to denote like parts appearing in FIG. 2, and a detailed description thereof is omitted.

In this embodiment, the color video signal SCV output from the encoder 28 is supplied directly to a fixed terminal a of a changeover switch 36, and also supplied to a fixed terminal b of the same changeover switch 36 via an aspect conversion circuit 37. The output signal of the changeover switch 36 is supplied to the output terminal 29.

The controller 27 supplies a control signal SI to the changeover switch 36 and the aspect conversion circuit 37 to control the switching operation of the changeover switch 36 and the operation of the aspect conversion circuit 37. Specifically, when a conversion setting switch 38, which is connected to the controller 27, is turned off, the changeover switch 36 is connected to the terminal a and the aspect conversion circuit 37 is rendered inoperative. On the other hand, when the setting switch 38 is turned on, the changeover switch 36 is connected to the terminal b and the aspect conversion circuit 37 is operated.

Accordingly, when the setting switch 38 is in an off state, the color video signal SCV from the encoder 28 is directly supplied to the output terminal 29, and when the setting switch 38 is in an on state, a color video signal SCV' from the aspect conversion circuit 37 by which the aspect or orientation of an image is converted is supplied to the output terminal 29.

Now, the aspect conversion circuit 37 will be described in more detail. The aspect conversion circuit 37 converts an image as shown in FIG. 15A to an image as shown in FIG. 15B. In this case, the converted image includes all of the image data contained before the conversion.

To achieve such a conversion, the following process is carried out.

As shown in FIG. 16, an effective screen 100 is subdivided corresponding to 480 clock pulses in a horizontal direction and into 240 lines in a vertical direction. Namely, 480×240 pixel signals a11, a12, . . . , anm, . . . , a240,480 forming the effective screen 100 are successively sampled on the basis of 1-field video signal and written in memory.

Where the effective screen ratio is 83.3%, the number of write clock pluses in one horizontal period is 480/0.833, nearly equal to 576. In FIG. 16, T represents the clock period.

To carry out the aspect conversion, since the effective screen 100 includes 240 lines in the vertical direction, 240 lines must be set using the 480 clock pluses in the horizontal direction. Here, a square block of 6 clock pulses by 4 lines, of which the width and height are equal on the screen, is assumed (see FIG. 17A). During the aspect conversion, the pixel signals of the first to fourth lines corresponding to the first, second and third clock pulses, i.e., [a41 to a11], [a43 to a13], and. [a45 to a15], are read from the memory and used as the signals for the first, second and third lines, respectively, to thereby form a square block of 4 clock pulses by 3 lines (FIG. 17B).

In this case, the horizontal time corresponding to the three lines is 6T×¾=9T/2, and accordingly, to form the square block, the period of the read clock pulses RCLK is set to 9T/8.

The effective screen 100 includes 80×60 square blocks each consisting of 6 clock pulses and 4 lines (FIG. 17A), and each block is converted to a square block of 4 clock pulses by 3 lines (FIG. 17B) in the aforementioned manner, to form an aspect-converted image (shown in FIG. 18).

Since the period of the read clock pulses RCLK is 9T/8, the number of pixels in the horizontal direction of the effective screen 100 after the conversion is 480T/(9T/8), nearly equal to 426, and the number of read clock pulses RCLK in one horizontal period is 576/(9T/8)=512.

Figure 19:
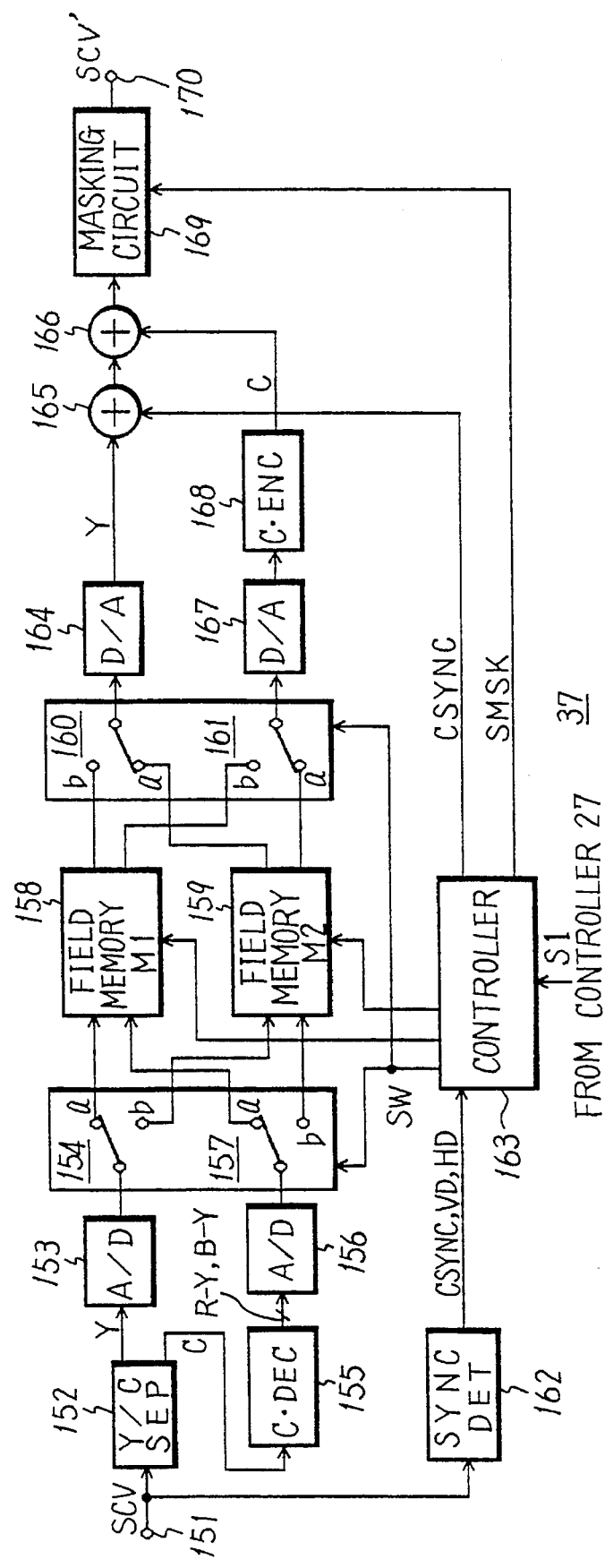
FIG. 19 is a block diagram showing the arrangement of an aspect conversion circuit in detail.

FIG. 19 shows the arrangement of the aspect conversion circuit 37 in detail.

As shown in the figure, the video signal SCV (shown in FIG. 20A) is supplied to an input terminal 151 and then to a luminance signal/chrominance signal separation circuit 152. The luminance signal Y separated by the separation circuit 152 is converted into a digital signal by an A/D converter 153, and then supplied to a movable terminal of a changeover switch 154. Although not illustrated, the A/D converter 153 is supplied with the write clock pulses WCLK (576 clock pulses in one horizontal period), and the luminance signal Y is sampled using the clock pulses WCLK.

The chrominance signal C separated by the separation circuit 152 is supplied to a chrominance demodulator 155 for demodulation, and a red differential signal R–Y and a blue differential signal B–Y are extracted. The color differential signals R–Y and B–Y are converted into digital signals by an A/D converter 156 and then supplied to a movable terminal of a changeover switch 157. Although not illustrated, the A/D converter 156 is supplied with the write clock pulses WCLK, and the color differential signals R–Y and B–Y are alternately sampled using the clock pulses WCLK.

Signals obtained at fixed terminals a of the changeover switches 154 and 157 are supplied to a field memory (M1) 158 as write signals, and signals obtained at fixed terminals b of the same switches are supplied to a field memory (M2) 159 as write signals.

The luminance signal Y and the color differential signals R–Y and B–Y read from the field memory 158 are supplied to a fixed terminal b of each of changeover switches 160 and 161, and the luminance signal Y and the color differential signals R–Y and B–Y read from the field memory 159 are supplied to a fixed terminal a of each of the changeover switches 160 and 161.

The video signal SCV delivered to the input terminal 151 is also supplied to a synchronous detection circuit 162. The synchronous detection circuit 162 outputs a composite synchronizing signal CSYNC (FIG. 20B), a vertical synchronizing signal VD (FIG. 20C) and a horizontal synchronizing signal HD (FIG. 20D) to a controller 163.

The controller 163 controls the switching operation of the aforementioned changeover switches 154, 157, 160 and 161. Namely, the changeover switches 154, 157, 160 and 161 are supplied with a control signal SW (shown in FIG. 20E) and controlled such that they connect to the respective terminals b in the odd-numbered field and to the respective terminals a in the even-numbered field.

Further, the controller 163 controls the write and read operations of the field memories 158 and 159. In the case of the field memory 158, data corresponding to 240 lines from 19H to 258H of the odd-numbered field is read (FIG. 20G), and data corresponding to 240 lines from 281H to 520H of the even-numbered field is written (FIG. 20F). As for the field memory 159, data corresponding to 240 lines from 19H to 258H of the odd-numbered field is written (FIG. 20H), and data corresponding to 240 lines from 281H to 520H of the even-numbered field is read out (FIG. 20I).

In the write operation, the pixel signals at the first line, i.e., [a11, a12, . . . , a1,480], are written in addresses (1,1), (1,2), . . . , (1,480) of the field memories 158 and 159, the pixel signals at the second line [a21, a22, . . . , a2,480] are written in addresses (2,1), (2,2), . . . , (2,480) of the field memories 158 and 159, and the pixel signals at the third to 240th lines are written in a similar manner (see FIG. 16).

In the read operation, by contrast, the pixel signals [a240,1, . . . , a21, a11] are read from the addresses (240,1), . . . , (2,1), (1,1) of the field memories 158 and 159 as the first line, and the pixel signals [a240,3, . . . , a2,3, a1,3] are read from the addresses (240,3), . . . , (2,3), (1,3) of the field memories 158 and 159 as the second line, and a similar read operation is carried out for the third to 240th lines (see FIG. 18).

The following is a description of an address control for the field memories 158 and 159 with regard to the first to 240 lines.

Figure 21:
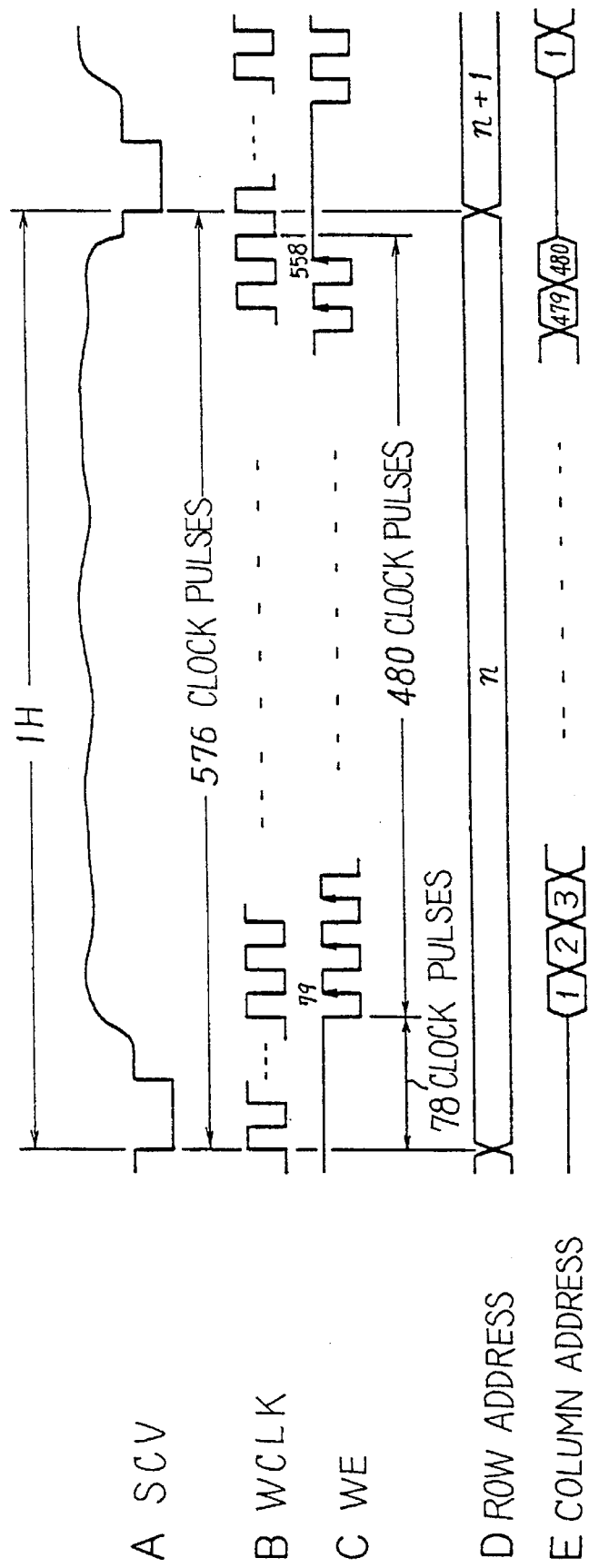
FIG. 21 is a timing chart showing a write operation in a horizontal direction.

First, the address control during the write operation will be described with reference to FIG. 21. In the figure, A denotes the video signal SCV and B denotes the write clock pulse WCLK. As seen from write enable signal WE shown in FIG. 21C, data write is carried out for 480 clock pulses from the 79th to 558th clock pulses. In this case, the row address n (FIG. 21D) is controlled to change from 1 to 240 in accordance with the first to 240th lines. The column address, on the other hand, is controlled to change from 1 to 480 in accordance with the 79th to 558th clock pulses in each line (FIG. 21E).

Figure 22:
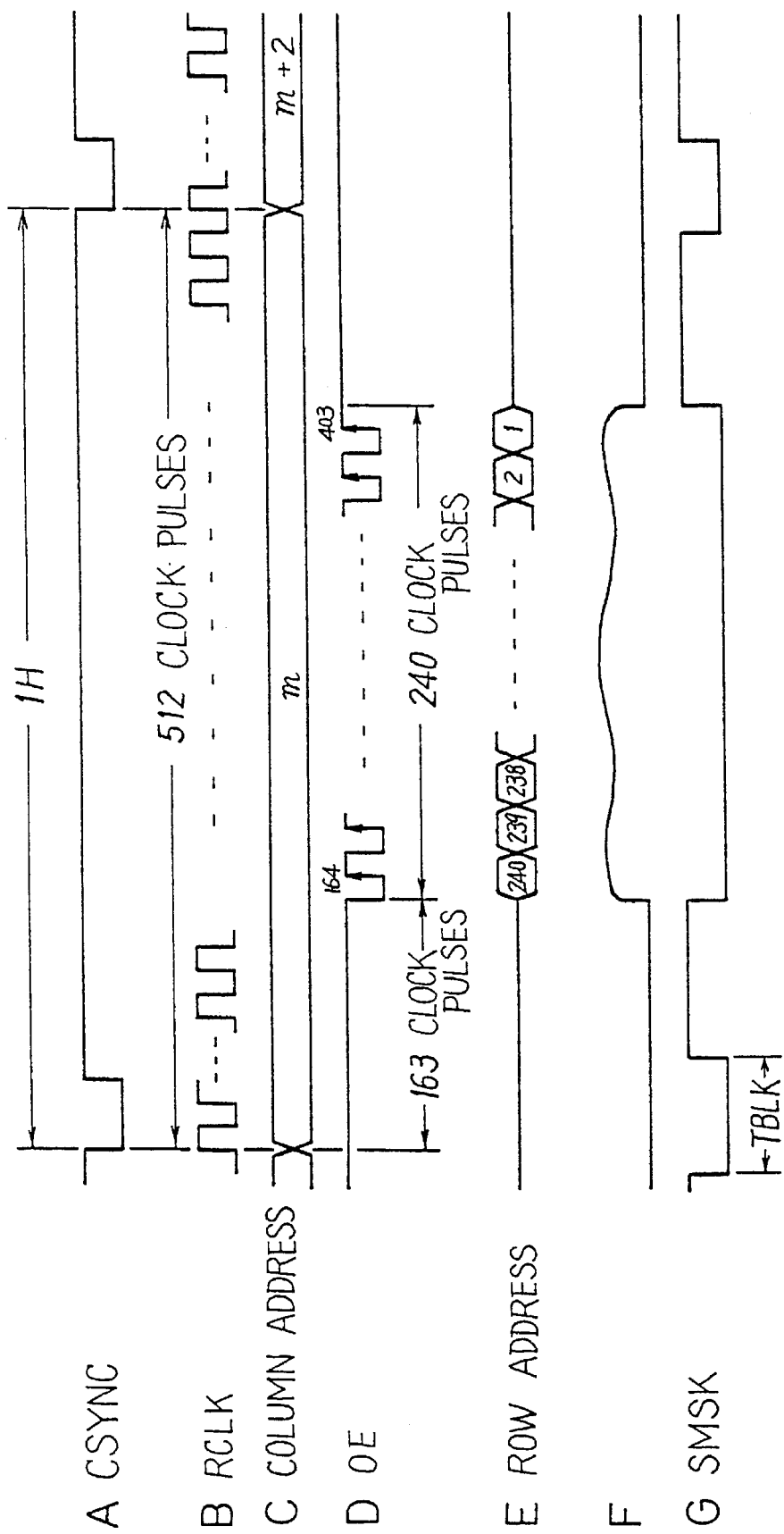
FIG. 22 is a timing chart showing a read operation in the horizontal direction.

The address control during the read operation will be described with reference to FIG. 22. In the figure, A denotes the composite synchronizing signal CSYNC and B denotes the read clock pulse RCLK. As seen from output enable signal OE shown in FIG. 22D, data read is carried out for 240 clock pulses from the 164th to 403rd clock pulses. In this case, the column address m (FIG. 22C) is controlled to change as 1, 3 . . . , 479 in accordance with the first to 240th lines. The row address, on the other hand, is controlled to change from 240 to 1 in accordance with the 164th to 403rd clock pulses in each line (FIG. 22E).

The write and read operations with respect to the field memories 158 and 159 are carried out in the above-described manner, whereby the luminance signal Y and color differential signals R–Y and B–Y are subjected to the aspect conversion and are output alternately from the field memories 158 and 159.

The luminance signal Y output from the changeover switch 160 is converted into an analog signal by a D/A converter 164, then combined with the composite synchronizing signal CSYNC at an adder 165, and supplied to an adder 166. The color differential signals R–Y and B–Y output from the changeover switch 161 are converted into analog signals by a D/A converter 167, and subjected to a quadrature two-phase modulation, known in the art, at a chrominance modulator 168 to form a chrominance signal C.

The chrominance signal C output from the chrominance modulator 168 is added to the luminance signal Y at the adder 166 to form a color video signal. The color video signal is supplied to a masking circuit 169 and subjected to a masking process thereat such that the signal level is set to a pedestal level during the period (see hatched region in FIG. 18) in which no signal related to the effective screen 100 is read from the field memories 158 and 159. In this case, a mask signal SMSK (shown in FIG. 22G), which is high-level during a period other than the read time and blanking period, is supplied from the controller 163 to the masking circuit 169, and the signal level is set to the pedestal level during the period in which the mask signal SMSK is high-level. In FIG. 22, F represents the read signal for the field memories 158 and 159.

Due to the above-described operation, a color video signal SCV', to which the masking process has been subjected for a region in which no video signal exists and in which the aspect or orientation of the image has been converted, as shown in FIG. 15, is output from the masking circuit 169 to an output terminal 170 (see FIG. 20J).

Although not mentioned in the above, the control signal SI is supplied from the controller 27 (FIG. 14) to the controller 163 to control the aspect conversion process described above. Namely, only when the conversion setting switch 38. (FIG. 14) is turned on, the above conversion is carried out and the color video signal SCV' appears at the output terminal 170.

As described above, in this embodiment, when the conversion setting switch 38 is turned on, the aspect conversion circuit 37 carries out the aspect conversion, and since the changeover switch 36 is connected to the terminal b, a color video signal SCV' with which the aspect of the image is converted is obtained at the output terminal 29. Accordingly, even when an image is recorded with the screen oriented vertically, the image displayed at a television monitor can be made to be in the right orientation, not laid with the top thereof oriented in the horizontal direction (see FIG. 15B).

In the above embodiment, the write and read timing with respect to the aspect conversion circuit 37 and the frequencies of the clock pulses are mentioned simply by way of example, and may of course be changed. Further, in the write operation, the effective screen 100 is subdivided corresponding to 480 clock pulses in the horizontal direction. Alternatively, other integer multiple of 240 can be used for the purpose, in which case the read operation is simplified because a reduction to an integer submultiple suffices.

Furthermore, the frequencies of the write clock pulses WCLK and read clock pulses RCLK applied to the field memories 158 and 159 are set to values such that the image may not be distorted, and therefore, the image is free from distortion even if it is subjected to the aspect conversion.

Further, in the above embodiment, the column address is changed as m, m+2 . . . , for a reduction at the time of read operation, but such a reduction process may be effected at the time of write operation.

Alternatively, an image conversion from an image shown in FIG. 23A to the one shown in FIG. 23B, different from the conversion of the above-described embodiment, may be carried out. In this case, the aspect-converted image includes part of the image before the conversion.

To achieve such conversion, the following process is carried out.

To subject a hatched region (FIG. 24A) of the effective screen 100 to the aspect conversion and then display the aspect-converted image over the entire effective screen (FIG. 24B) without distortion, the horizontal period for the hatched region must be set to (¾)·(¾)·h=9h/16, where h is the horizontal period of the effective screen.

Further, to set the vertical length or height of the aspect-converted image to 240 lines as shown in FIG. 24B, the frequency of the write clock pulses WCLK must be set such that sampling can be effected 240 times during the period 9h/16. Namely, the number of write clock pulses WCLK during the horizontal period h of the effective screen 100 is 240×16/9, nearly equal to 426, and where the effective screen ratio is 83.34, the number of write clock pulses WCLK in one horizontal period is 426/0.833, nearly equal to 512.

In this example, a region of the effective screen 100 corresponding to 9h/16 in the horizontal direction is subdivided corresponding to 240 clock pulses in the horizontal direction and into 240 lines in the vertical direction, as shown in FIG. 25. Namely, 240×240 pixel signals a11, a12, . . . , anm, . . . , a240,240 corresponding to the horizontal period 9h/16 are sequentially sampled on the basis of 1-field video signal and written in the memory.

To achieve the aspect conversion, [a240,1, . . . , a21, a11] have only to be read out from the memory during the horizontal period h of the effective screen 100 as the pixel signals for the first line. As the pixel signals for the second line, [a240,2, . . . , a22, a12] are read out from the memory during the horizontal period h of the effective screen 100. A similar read operation is carried out for the third to 240th lines. In the case wherein the effective screen ratio is 83.34, the number of read clock pulses RCLK in one horizontal period is 240/0.833, nearly equal to 288.

Also in the case of carrying out the aspect conversion shown in FIG. 23B, the aspect conversion circuit 37 may be constructed as shown in FIG. 19, but in this case, the masking circuit 169 is unnecessary.

Figure 20:
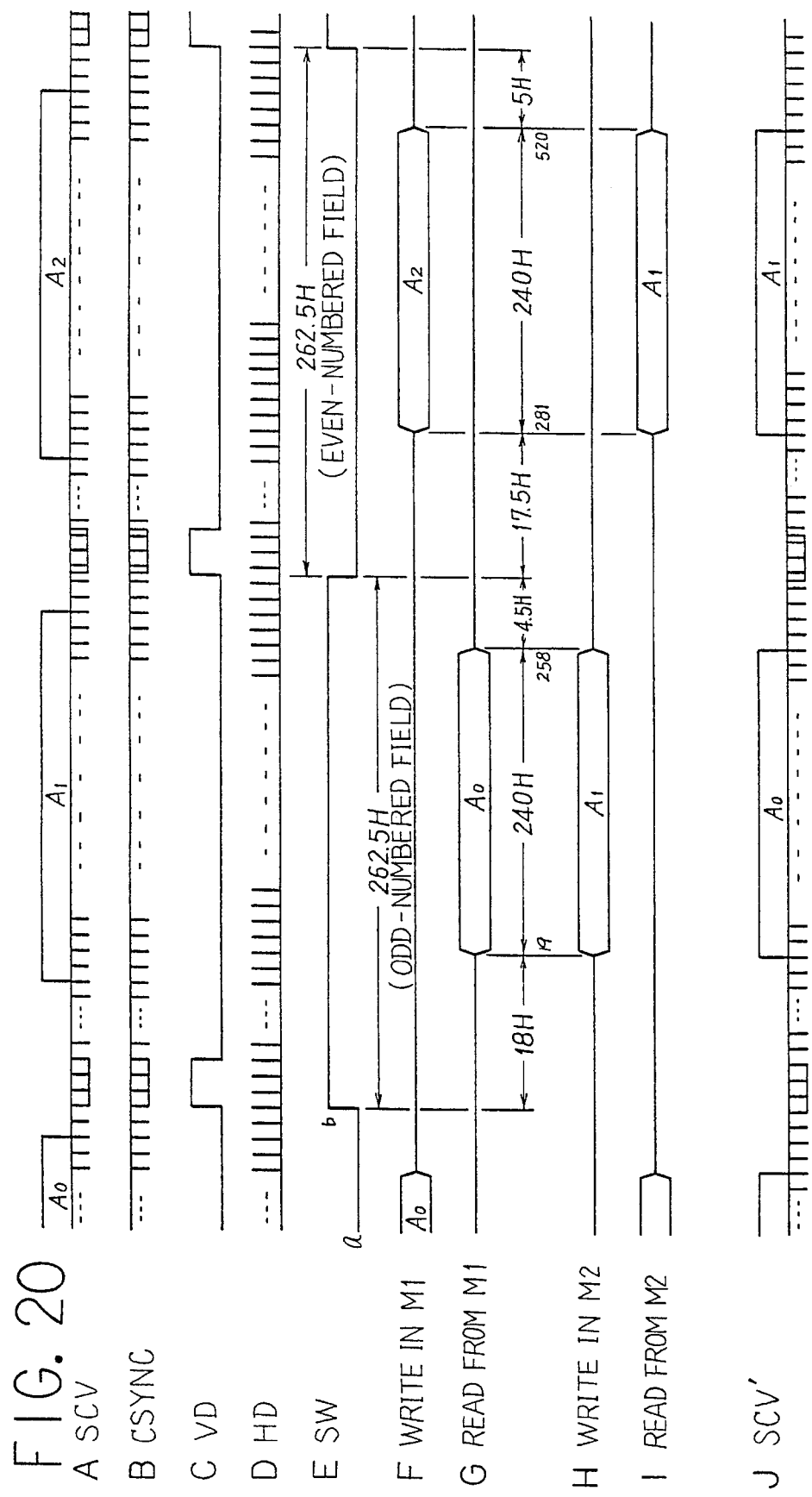
FIG. 20 is a timing chart based on a vertical direction.

The write and read timing in the vertical direction is the same as that described with reference to the above embodiment (see the timing chart of FIG. 20). In this case, however, the pixel signals [a11, a12, . . . , a1,240] are written in the addresses (1,1), (1,2), . . . , (1,240) of the field memories 158 and 159 as the first line, the pixel signals [a21, a22, . . . , a2,240] are written in the addresses (2,1), (2,2), . . . , (1,240) of the field memories 158 and 159 as the second line, and a similar write operation is carried out for the third to 240th lines (see FIG. 25).

In the read operation, the pixel signals [a240,1, . . . , a21, a11] are read from the addresses (240,1), . . . , (2,1), (1,1) of the field memories 158 and 159 as the first line, the pixel signals [a240,2, . . . , a2,2, . . . , a1,2] are read from the addresses (240,2), . . . , (2,2), (1,2) of the field memories 158 and 159 as the second line, and a similar read operation is carried out for the third to 240th lines (see FIG. 26).

Now, the address control of the field memories 158 and 159 for the first to 240 lines will be explained.

Figure 27:
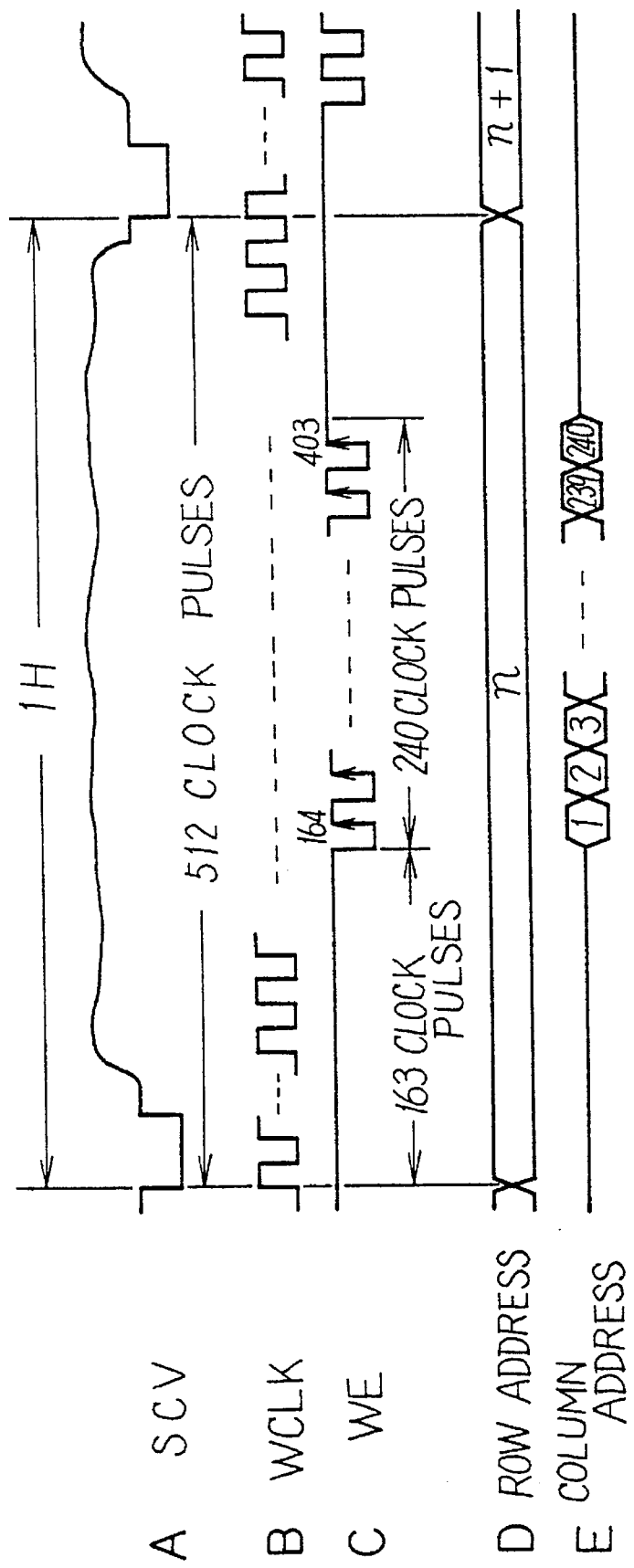
FIG. 27 is a timing chart showing a write operation in the horizontal direction.

First, the address control during the write operation will be described with reference to FIG. 27. In the figure, A denotes the video signal SCV and B denotes the write clock pulse WCLK. As seen from write enable signal WE shown in FIG. 27C, data write is carried out for 240 clock pulses from the 164th to 403rd clock pulses. In this case, the row address n (FIG. 27D) is controlled to change from 1 to 240 in accordance with the first to 240th lines. The column address, on the other hand, is controlled to change from 1 to 240 in accordance with the 164th to 403rd clock pulses in each line (FIG. 27E).

The address control during the read operation will be now described with reference to FIG. 28. In the figure, A represents the composite synchronizing signal CSYNC and B represents the read clock pulse RCLK. As seen from output enable signal OE shown in FIG. 28D, data read is carried out for 240 clock pulses from the 48th to 287th clock pulses. In this case, the column address m (FIG. 28C) is controlled to change from 1 to 240 in accordance with the first to 240th lines. The row address, on the other hand, is controlled to change from 240 to 1 in accordance with the 48th to 287th clock pulses in each line (FIG. 28E). In FIG. 28, F represents the read signal for the field memories 158 and 159.

The write and read operations with respect to the field memories 158 and 159 are carried out in the above-described manner, whereby, also in this example, the luminance signal Y and color differential signals R–Y and B–Y are subjected to the aspect conversion and are output alternately from the field memories 158 and 159, and the color video signal SCV' which has been subjected to the aspect conversion, as shown in FIG. 23, appears at the output terminal 170.

In the foregoing, the write and read timing with respect to the aspect conversion circuit 37 and the frequencies of the clock pulses are given simply by way of example, and may be changed as required. For example, the time for starting the write operation in the horizontal direction, shown in FIG. 27, may be changed so that the contents of pixel signals written in the memory, and thus the contents of the aspect-converted image, can be changed. In this case, if the start time for the write operation is successively shifted, the converted image can be scrolled, and the image before the conversion can be in its entirety retained after the conversion.

In the above embodiment, the aspect conversion circuit is arranged at the output side of the video camera section, but it may alternatively be arranged at the playback output side of a VTR, for example, whereby an image vertically oriented when acquired can be subjected to the aspect conversion when the video signal is reproduced and the aspect-converted image displayed at a television monitor.

Another example of the aspect conversion circuit 37 will be now described. In this example, an image conversion similar to that shown in FIGS. 15A and 15B is achieved by the process described below.

As shown in FIG. 29, the effective screen 100 is subdivided corresponding to 480 clock pulses in the horizontal direction and into 240 lines/field in the vertical direction.

Namely, 480×240 pixel signals a11, a12, ..., anm, ..., a240,480 forming the effective screen 100 are successively sampled from the video signal of the odd-numbered field, and 480×240 pixel signals b11, b12, bnm, ..., b240,480 forming the effective screen 100 are successively sampled from the video signal of the even-numbered field.

For the odd-numbered field, the pixel signals a11 to a240,480 are written in memory, and for the even-numbered field, the pixel signals b11 to b240,480 are written in memory.

Where the effective screen ratio is 83.3%, the number of write clock pluses WCLK in one horizontal period is 480/0.833, nearly equal to 576. In FIG. 29, T represents the clock period.

To carry out the aspect conversion, since the effective screen 100 includes 240 lines/field in the vertical direction, 240 lines must be set for each of the odd and even fields, using the 480 clock pluses in the horizontal direction. Here, a square block of 6 clock pulses by 4 lines/field, of which the width and height are equal on the screen, is assumed, as shown in FIG. 30A.

During the aspect conversion, when the video signal of the even-numbered field is output, the pixel signals which are at the first to fourth lines of the odd and even fields and which correspond to the first, third and fifth clock pulses, i.e., [a41, b41, ..., a11, b11], [a43, b43, ..., a13, b13], and [a45, b45, ..., a15, b15], are read and used as the signals for the first, second and third lines, respectively, and when the video signal of the odd-numbered field is output, the pixel signals which are at the first to fourth lines of the odd and even fields and which correspond to the second, fourth and sixth clock pulses, i.e., [a42, b42, ..., a12, b12], [a44, b44, ..., a14, b14], and [a46, b46, ..., a16, b16], are read and used as the signals for the first, second and third lines, respectively, whereby a square block of 8 clock pulses by 3 lines/field is formed (FIG. 30B).

In this case, the horizontal time corresponding to three lines/field is 6T×¾=9T/2, and accordingly, to form the square block, the period of the read clock pulses RCLK is set to 9T/8. This period corresponds to a period (9T/16×2) equivalent to two pixels.

Figure 31:
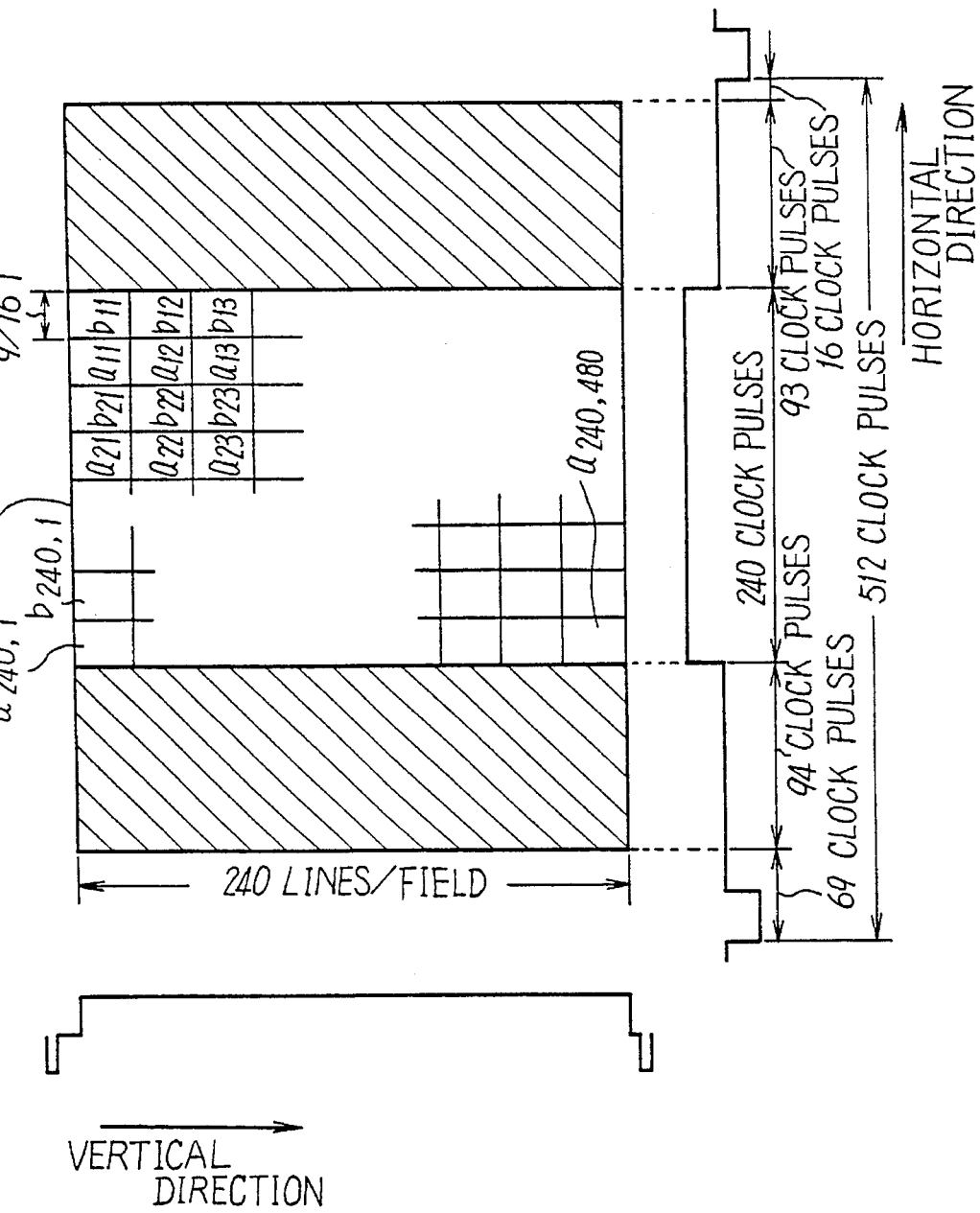
FIG. 31 is a diagram illustrating the aspect conversion process (read operation)

The effective screen 100 includes 80×60 square blocks each consisting of 6 clock pulses and 4 lines/field (FIG. 30A), and each block is converted to a square block of 8 clock pulses by 3 lines/field (FIG. 30B) in the aforementioned manner, to form an aspect-converted image (shown in FIG. 31).

Since the period of the read clock pulses RCLK is 9T/8, the number of clock pulses in the horizontal direction of the effective screen 100 after the conversion is 480T/(9T/8), nearly equal to 427, and the number of clock pulses in one horizontal period is 576T/(9T/8)=512.

Figure 32:
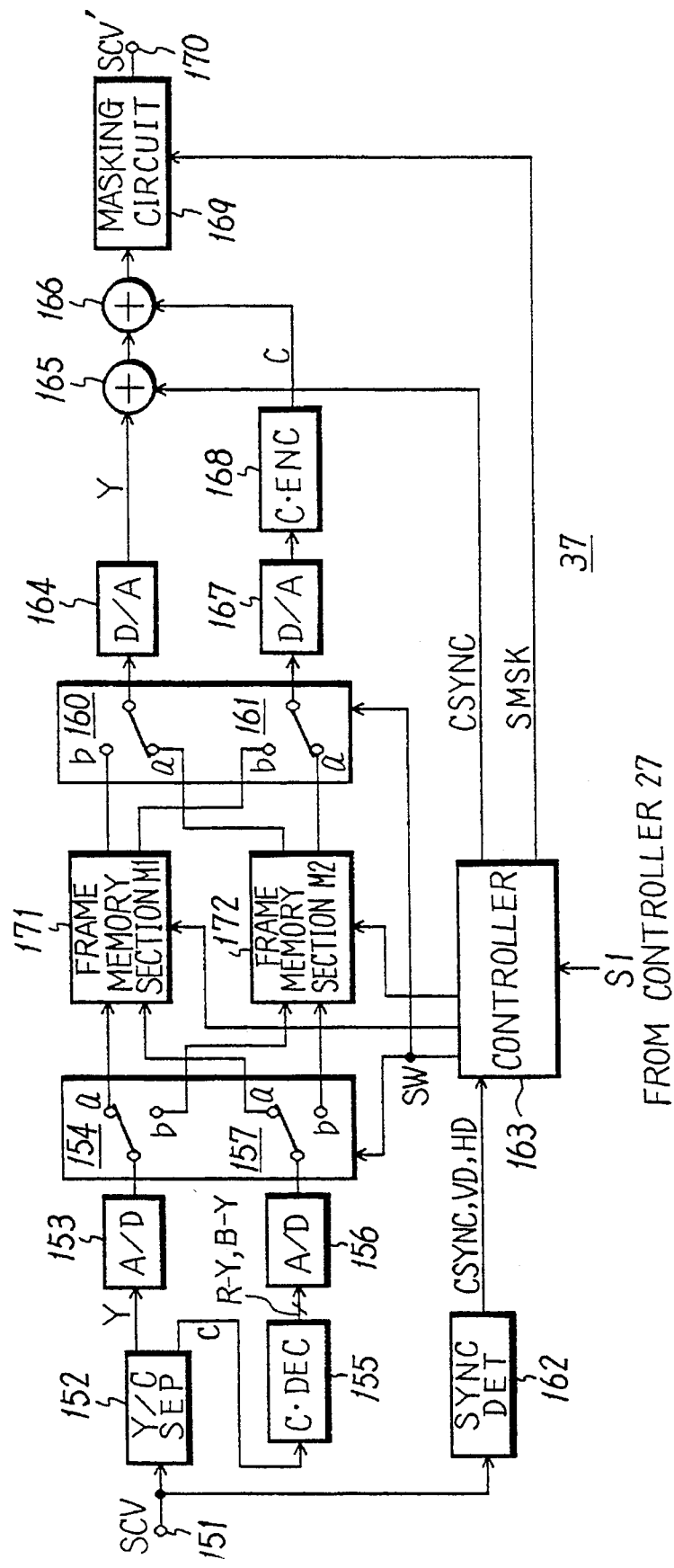
FIG. 32 is a block diagram showing the arrangement of an aspect conversion circuit in detail.

FIG. 32 shows the arrangement of the aspect conversion circuit 37 in detail. In FIG. 32, like reference numerals are used to represent like parts appearing in FIG. 19.

As shown in the figure, the video signal SCV (shown in FIGS. 33A and 34A) is supplied to an input terminal 151 and then to a luminance signal/chrominance signal separation circuit 152. The luminance signal Y separated by the separation circuit 152 is converted into a digital signal by an A/D converter 153, and then supplied to a movable terminal of a changeover switch 154. Although not illustrated, the A/D converter 153 is supplied with the write clock pulses WCLK (576 clock pulses in one horizontal period), and the luminance signal Y is sampled using the clock pulses WCLK.

The chrominance signal C separated by the separation circuit 152 is supplied to a chrominance demodulator 155 for demodulation, and a red differential signal R−Y and a blue differential signal B−Y are extracted. These color differential signals R−Y and B−Y are converted into digital signals by an A/D converter 156 and then supplied to a movable terminal of a changeover switch 157. Although not illustrated, the A/D converter 156 is supplied with the write clock pulses WCLK, and the color differential signals R−Y and B−Y are alternately sampled using the clock pulses WCLK.

Signals obtained at fixed terminals a of the changeover switches 154 and 157 are supplied to a frame memory section (M1) 171 as write signals, and signals obtained at fixed terminals b of the same switches are supplied to a frame memory section (M2) 172 as write signals.

The luminance signal Y and the color differential signals R−Y and B−Y output from the frame memory section 171 are supplied to a fixed terminal b of each of changeover switches 160 and 161, and the luminance signal Y and the color differential signals R−Y and B−Y output from the frame memory section 172 are supplied to a fixed terminal a of each of the changeover switches 160 and 161.

The video signal SCV delivered to the input terminal 151 is also supplied to a synchronous detection circuit 162. The synchronous detection circuit 162 outputs a composite synchronizing signal CSYNC (shown in FIGS. 33B and 34B), a vertical synchronizing signal VD (FIGS. 33C and 34C) and a horizontal synchronizing signal HD (FIGS. 33D and 34D) to a controller 163.

The controller 163 controls the switching operation of the aforesaid changeover switches 154, 157, 160 and 161. Namely, the changeover switches 154, 157, 160 and 161 are supplied with a switching control signal SW (shown in FIGS. 33E and 34E) and controlled such that they connect to the respective terminals b and a alternately in continuous first and second frames, respectively.

Further, the controller 163 controls the write and read operations of the frame memory sections 171 and 172.

Figure 35:
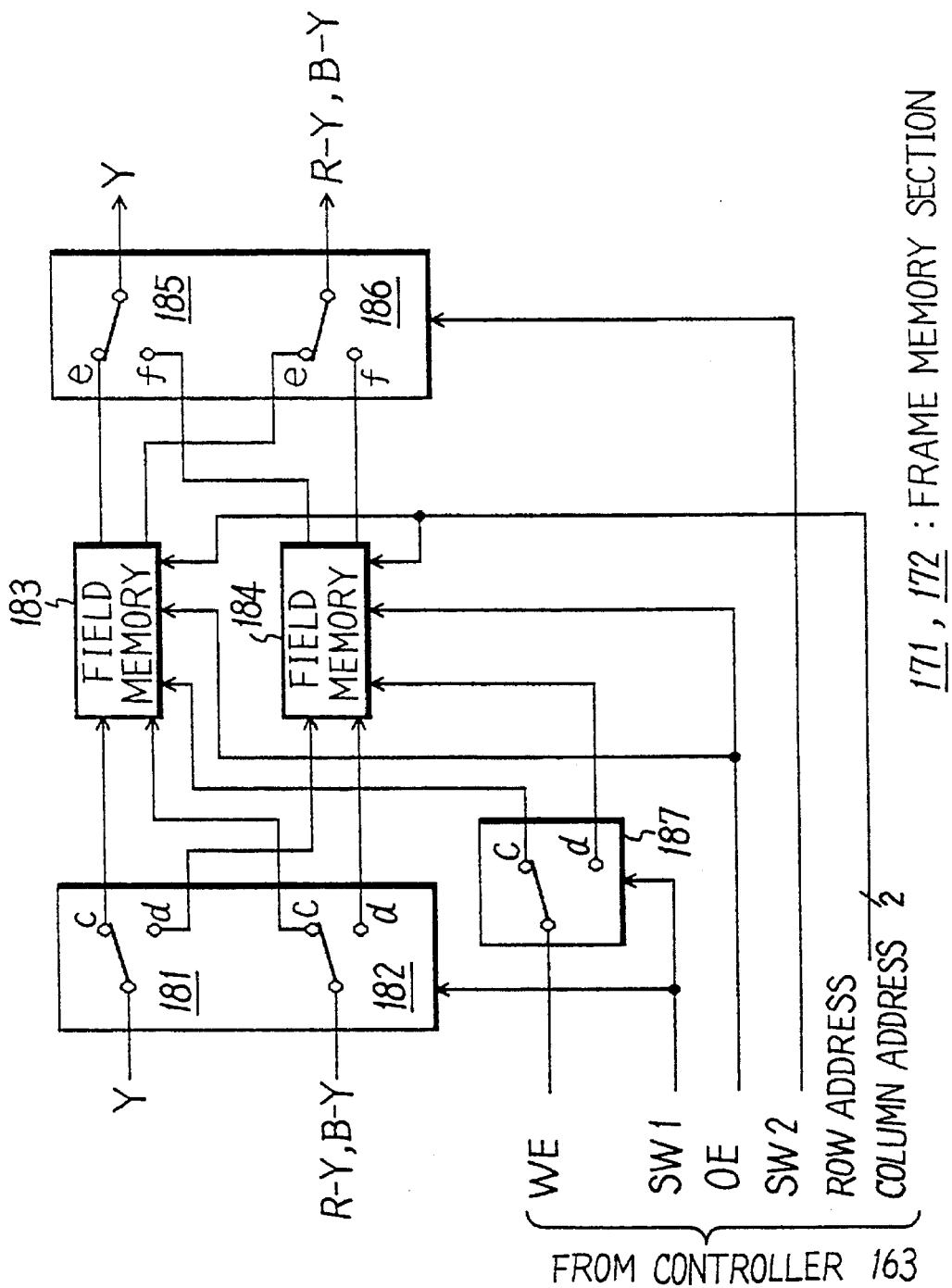
FIG. 35 is a wiring diagram showing the arrangement of a frame memory section.

In this example, the frame memory sections 171 and 172 are constructed as shown in FIG. 35. As shown in the figure, the luminance signal Y is supplied to a movable terminal of a changeover switch 181. The luminance signal Y obtained at a fixed terminal c of the changeover switch 181 is supplied to a field memory 183 as a write signal, whereas the luminance signal Y obtained at a fixed terminal d of the same switch is supplied to a field memory 184.

The color differential signals R−Y and B−Y are supplied to a movable terminal of a changeover switch 182. The color differential signals R−Y and B−Y obtained at a fixed terminal c of the changeover switch 182 are supplied to the field memory 183 as write signals, and the color differential signals R−Y and B−Y obtained at a fixed terminal d of the same switch are supplied to the field memory 184 as write signals. The field memories 183 and 184 each have a memory capacity large enough to store the luminance signals Y and color differential signals R−Y and B−Y corresponding to one field.

The luminance signal Y read from the field memory 183 is supplied to a fixed terminal e of a changeover switch 185, and the color differential signals R−Y and B−Y are supplied to a fixed terminal e of another changeover switch 186. The luminance signal Y read from the field memory 184 is supplied to a fixed terminal f of the changeover switch 185, and the color differential signals R−Y and B−Y are supplied to a fixed terminal f of the changeover switch 186.

A write enable signal WE (shown in FIG. 37C), which is output from the controller 163 during write operation, is supplied to a movable terminal of a changeover switch 187.

The write enable signal WE obtained at a fixed terminal c of the changeover switch 187 is supplied to the field memory 183, and the write enable signal WE obtained at a fixed terminal d of the same switch is supplied to the field memory 184.

The switching operation of the changeover switches 181, 182 and 187 is controlled in accordance with a switching control signal SW1 (FIGS. 33J and 34J) output from the controller 163. Specifically, the changeover switches 181, 182 and 187 are connected to the respective terminals c in the odd-numbered field, and to the respective terminals d in the even-numbered field.

Figure 36:
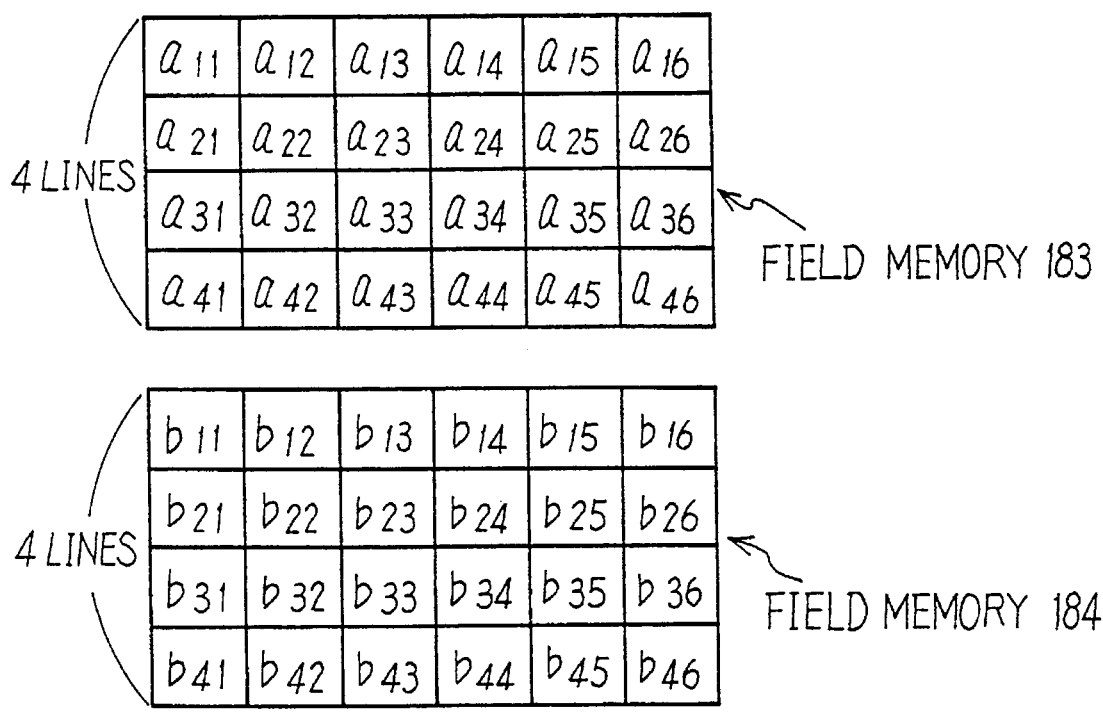
FIG. 36 is a diagram illustrating the frame memory section (composed of field memories)

Consequently, in the odd-numbered field, the luminance signal Y and the color differential signals R–Y and B–Y, along with the write enable signal WE, are supplied to the field memory 183. In the even-numbered field, on the other hand, the luminance signal Y and the color differential signals R–Y and B–Y, along with the write enable signal WE, are supplied to the field memory 184. Namely, in the write operation, the pixel signals of the odd-numbered field, [a11 to a240,480], are written in the field memory 183, and the pixel signals of the even-numbered field, [b11 to b240, 480], are written in the field memory 184 (see FIG. 29). FIG. 36 illustrates the pixel signals written in the field memories 183 and 184 in accordance with the square block shown in FIG. 30A.

Referring again to FIG. 35, during the write operation, the field memories 183 and 184 are supplied with a row address and a column address specifying a writing location, and during the read operation, the memories are supplied with a row address and a column address specifying a reading location.

Further, the field memories 183 and 184 are supplied with an output enable signal OE (shown in FIG. 38D) which is output from the controller 163 during read operation. The output enable signal OE is generated for 240 clock pulses in a manner synchronized with the read clock pulses RCLK.

The switching operation of the changeover switches 185 and 186 is controlled in accordance with a switching control signal SW2 (FIG. 38F) output from the controller 163. Specifically, the changeover switches 185 and 186 are actuated in accordance with the output period of the output enable signal OE: they are connected to the respective terminals e in the former half period (9T/16) of the read clock pulse RCLK and connected to the respective terminals f in the latter half period (9T/16) of same.

Therefore, during the read operation, the luminance signals Y read out alternately from the field memories 183 and 184 in a manner synchronized with the read clock pulses RCLK (period: 9T/8) are output from the changeover switch 185 at the period 9T/16, and the color differential signals R–Y and B–Y read out alternately from the field memories 183 and 184 in a manner synchronized with the read clock pulses RCLK are output from the changeover switch 186 at the period 9T/16.

Referring again to FIG. 32, since in the first frame, the changeover switches 154, 157, 160 and 161 are connected to the respective terminals b, the output enable signal OE is supplied to the frame memory section 171 to set it in a read state, while the write enable signal WE is supplied to the frame memory section 172 to set it in a write state.

As for the frame memory section 171, no write operation is carried out (shown in FIG. 33F), the pixel signals forming the odd-field video signal and corresponding to 240 lines are read from both the field memories 183 and 184 in the period 19H to 258H of the odd-numbered field, and further the pixel signals forming the even-field video signal and corresponding to 240 lines are read from both the field memories 183 and 184 in the period 281H to 520H of the even-numbered field (shown in FIG. 33G).

When reading the video signal constituting an odd-numbered field, the pixel signals [a240,2 to a12] and [b240,2 to b12] are read in parallel from addresses (240,2) to (1,2) of the field memories 183 and 184 as the first line, and the pixel signals [a240,4 to a14] and [b240,4 to b14] are read from addresses (240,4) to (1,4) of the field memories 183 and 184 as the second line. A similar read operation is performed for the third to 240th lines (see FIG. 31). When reading the video signal constituting an even-numbered field, the pixel signals [a240,1 to a11] and [b240,1 to b11] are read in parallel from addresses (240,1) to (1,1) of the field memories 183 and 184 as the first line, the pixel signals [a240,3 to a13] and [b240,3 to b13] are read from addresses (240,3) to (1,3) of the field memories 183 and 184 as the second line, and a similar read operation is carried out for the third to 240th lines (see FIG. 31).

As for the frame memory section 172, on the other hand, no read operation is carried out (FIG. 33I), the pixel signals forming the odd-field video signal and corresponding to 240 lines are written in the field memory 183 in the period 19H to 258H of the odd-numbered field, and further the pixel signals forming the even-field video signal and corresponding to 240 lines are written in the field memory 184 in the period 281H to 520H of the even-numbered field (FIG. 33H).

When writing the video signal constituting an odd-numbered field, the pixel signals [a11 to a1,480] are written in addresses (1,1) to (1,240) of the field memory 183 as the first line, the pixel signals [a21 to a2,480] are written in addresses (2,1) to (2,480) of the field memory 183 as the second line, and a similar write operation is performed for the third to 240th lines (see FIG. 29). When writing the video signal constituting an even-numbered field, the pixel signals [b11 to b1,480] are written in addresses (1,1) to (1,480) of the field memory 184 as the first line, the pixel signals [b21 to b2,480] are written in addresses (2,1) to (2,480) of the field memory 184 as the second line, and a similar write operation is carried out for the third to 240th lines (see FIG. 29).

In the second frame, the changeover switches 154, 157, 160 and 161 are connected to the respective terminals a, and accordingly, the output enable signal OE is supplied to the frame memory section 172 to set it in a read state, while the write enable signal WE is supplied to the frame memory section 171 to set it in a write state.

As for the frame memory section 172, no write operation is carried out (FIG. 34H), the pixel signals forming the odd-field video signal and corresponding to 240 lines are read from both the field memories 183 and 184 in the period 19H to 258H of the odd-numbered field, and further the pixel signals forming the even-field video signal and corresponding to 240 lines are read from both the field memories 183 and 184 in the period 281H to 520H of the even-numbered field (shown in FIG. 34I). The read operation carried out in this case is similar to that described above with reference to the first frame.

As for the frame memory section 171, on the other hand, no read operation is carried out (FIG. 34G), the pixel signals forming 240 lines of the odd-numbered field are written in the field memory 183 in the period 19H to 258H of the odd-numbered field, and further the pixel signals forming 240 lines of the even-numbered field are written in the field memory 184 in the period 281H to 520H of the even-numbered field (shown in FIG. 34F). The write operation carried out at this time is similar to that described above with reference to the first frame.

Next, the address control of the field memories 183 and 184 for the first to 240 lines will be explained.

Figure 37:
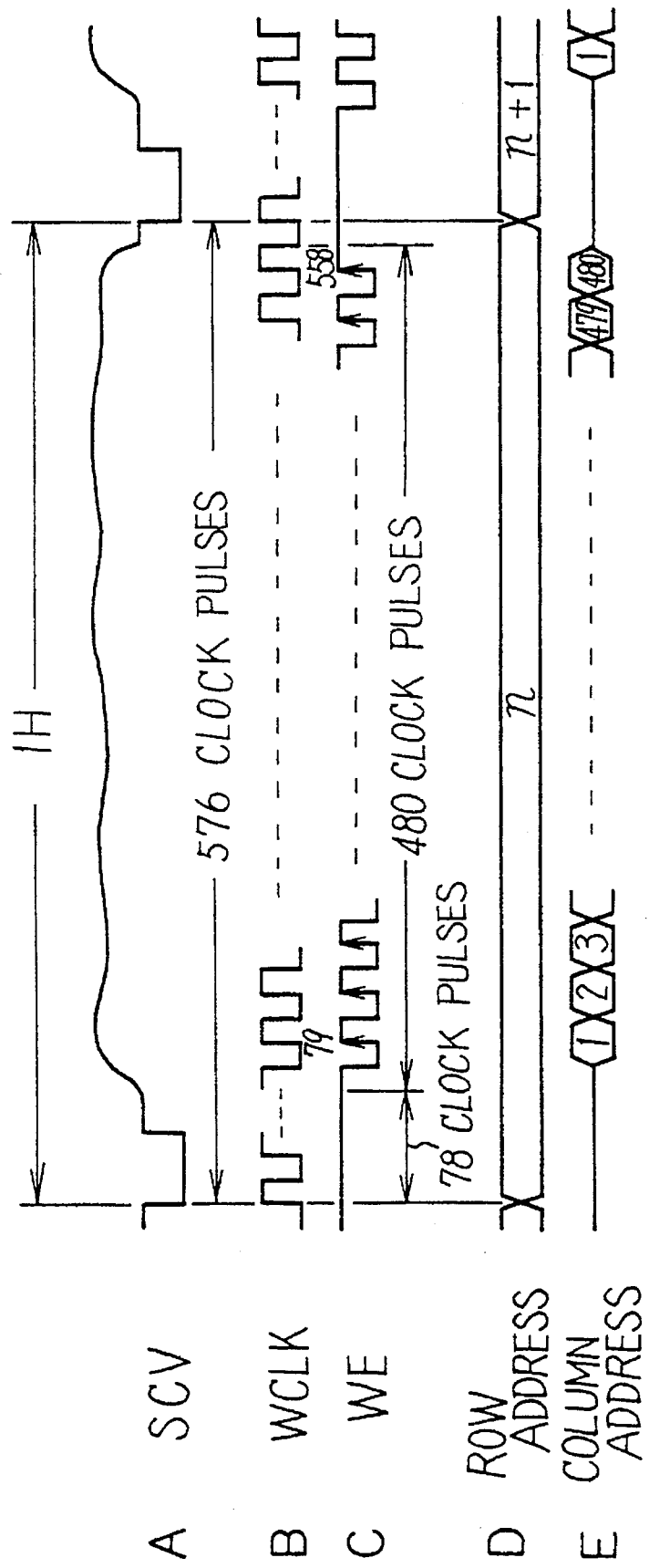
FIG. 37 is a timing chart showing a write operation in the horizontal direction.

First, the address control during the write operation will be described with reference to FIG. 37. In the figure, A denotes the video signal SCV and B denotes the write clock pulse WCLK. As seen from write enable signal WE shown in FIG. 37C, data write is carried out for 480 clock pulses from the 79th to 558th clock pulses. In this case, the row address n (FIG. 37D) is controlled to change from 1 to 240 in accordance with the first to 240th lines, while the column address is controlled to change from 1 to 480 in accordance with the 79th to 558th clock pulses in each line (FIG. 37E).

Figure 38:
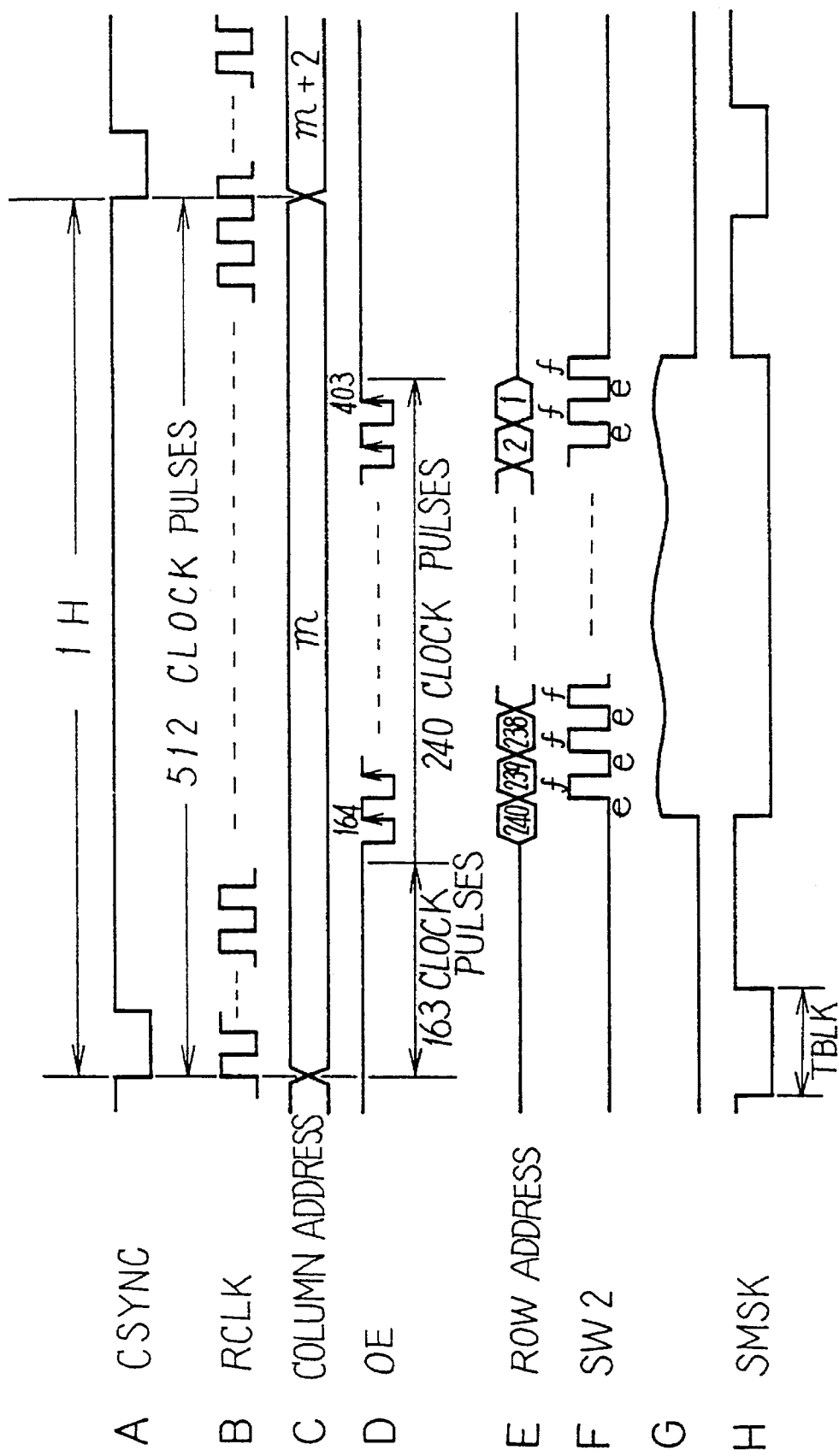
FIG. 38 is a timing chart showing a read operation in the horizontal direction.

The address control during the read operation will be now described with reference to FIG. 38. In the figure, A represents the composite synchronizing signal CSYNC and B represents the read clock pulse RCLK. As seen from output enable signal OE shown in FIG. 38D, data read is carried out for 240 clock pulses from the 164th to 403rd clock pulses. In this case, for the odd-numbered field, the column address m (FIG. 38C) is controlled to change as 2, 4, . . . , 480 in accordance with the first to 240th lines, and for the even-numbered field, the address m is controlled to change as 1, 3, . . . , 479 in accordance with the first to 240th lines. The row address, on the other hand, is controlled to change from 240 to 1 in accordance with the 164th to 403rd clock pulses in each line (FIG. 38E).

The write and read operations with respect to the frame memory sections 171 and 172 are carried out in the above-described manner, whereby the luminance signal Y and color differential signals R–Y and B–Y, which correspond to first and second frames, are subjected to the aspect conversion and are output from the frame memory sections 171 and 172.

Referring again to FIG. 32, the changeover switches 160 and 161 are connected to the respective terminals b in the first frame, and connected to the respective terminals a in the second frame, as mentioned above. Accordingly, the luminance signal Y which has been subjected to the aspect conversion is continuously output from the changeover switch 160, and the color differential signals R–Y and B–Y which have been subjected to the aspect conversion are continuously output from the changeover switch 161.

The luminance signal Y output from the Changeover switch 160 is converted into an analog signal by a D/A converter 164, then combined with the composite synchronizing signal CSYNC at an adder 165, and supplied to an adder 166. The color differential signals R–Y and B–Y output from the changeover switch 161 are converted into analog signals by a D/A converter 167, and subjected to a quadrature two-phase modulation, known in the art, at a chrominance modulator 168 to form a chrominance signal C.

The chrominance signal C output from the chrominance modulator 168 is added to the luminance signal Y at the adder 166 to form a color video signal. The color video signal is supplied to a masking circuit 169 and subjected to a masking process thereat such that the signal level is set to a pedestal level during the period (see hatched region in FIG. 31) in which no signal related to the effective screen 100 is read from the frame memory sections 171 and 172. In this case, a mask signal SMSK (shown in FIG. 38H), which is high-level during a period other than the read time and blanking period, is supplied from the controller 163 to the masking circuit 169, and the signal level is set to the pedestal level during the period in which the mask signal SMSK is high-level. In FIG. 38, G represents the read signal for the frame memory sections 171 and 172.

Due to the above-described operation, a color video signal SCV', to which the masking process has been subjected for a region in which no video signal exists and in which the aspect or orientation of the image has been converted, as shown in FIG. 15, is output from the masking circuit 169 to an output terminal 170 (see FIGS. 33K and 34K).

In the aspect conversion circuit 37 described above, not only the pixel signals of the odd-numbered field but also those of the even-numbered field are used to form pixel signals of the individual lines of the aspect-converted video signal (see FIGS. 30A and 31). Accordingly, the number of pixel signals in the individual lines of the converted video signal is almost twice that present in the case of using only the pixel signals of one of the odd- and even-numbered fields, and thus the converted image is improved in resolution. Specifically, in this example, the first line of the odd-numbered field after the conversion is composed of 480 pixel signals [a240,2 to b12], while in the case of using the pixel signals of one of the odd- and even-numbered fields, the first line is composed of 240 pixel signals, [a240,2 to a12] or [b240,2 to b12].

Further, in the above aspect conversion circuit 32, the pixel signals of the odd- and even-numbered fields are written in the frame memory sections 171 and 172 (see FIG. 29), and are read out while the column address is controlled, to thereby form video signals for the individual lines of the odd- and even-numbered fields. The positional relationship of the pixel signals forming the video signals after the conversion (see FIG. 30B) is identical with that of the pixel signals before the conversion (see FIG. 30A), and therefore, no image deviation is caused by the aspect conversion. Namely, even when the control for the write and read timing with respect to the individual fields does not include a complicated process, no image deviation is caused by the conversion.

Figure 39:
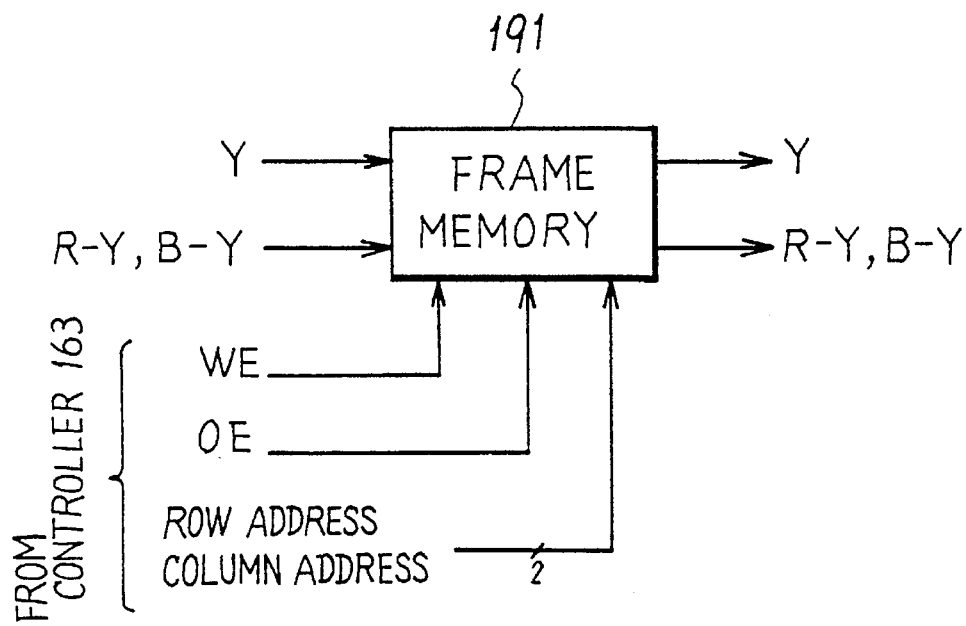
FIG. 39 is a wiring diagram showing the arrangement of another frame memory section.

Furthermore, the frame memory sections 171 and 172 of the aspect conversion circuit 32 each include two independent field memories 183 and 184 (shown in FIG. 35), but an orderly arranged frame memory 191 may alternatively be used as shown in FIG. 39.

In FIG. 39, the luminance signal Y and the color differential signals R–Y and B–Y are supplied to the frame memory 191 as write signals, and thereafter read therefrom. During the write operation, the frame memory 191 is supplied with a write enable signal WE from the controller 163, and during the read operation it is supplied with an output enable signal WE from the controller 163. The frame memory 191 is further supplied with row addresses and column addresses from the controller 163.

During the write operation, the pixel signals of the individual lines of the odd-numbered field are written in even-numbered row addresses of the frame memory 191, and the pixel signals of the individual lines of the even-numbered field are written in odd-numbered row addresses of the memory 191.

Specifically, when writing the video signal constituting an odd-numbered field, the pixel signals [a22 to a1,480] are written in addresses (2,1) to (2,480) of the frame memory 191 as the first line, the pixel signals [a21 to a2,480] are written in addresses (4,1) to (4,480) of the frame memory 191 as the second line, and a similar write operation is performed for the third to 240th lines (see FIG. 29).

Figure 40:
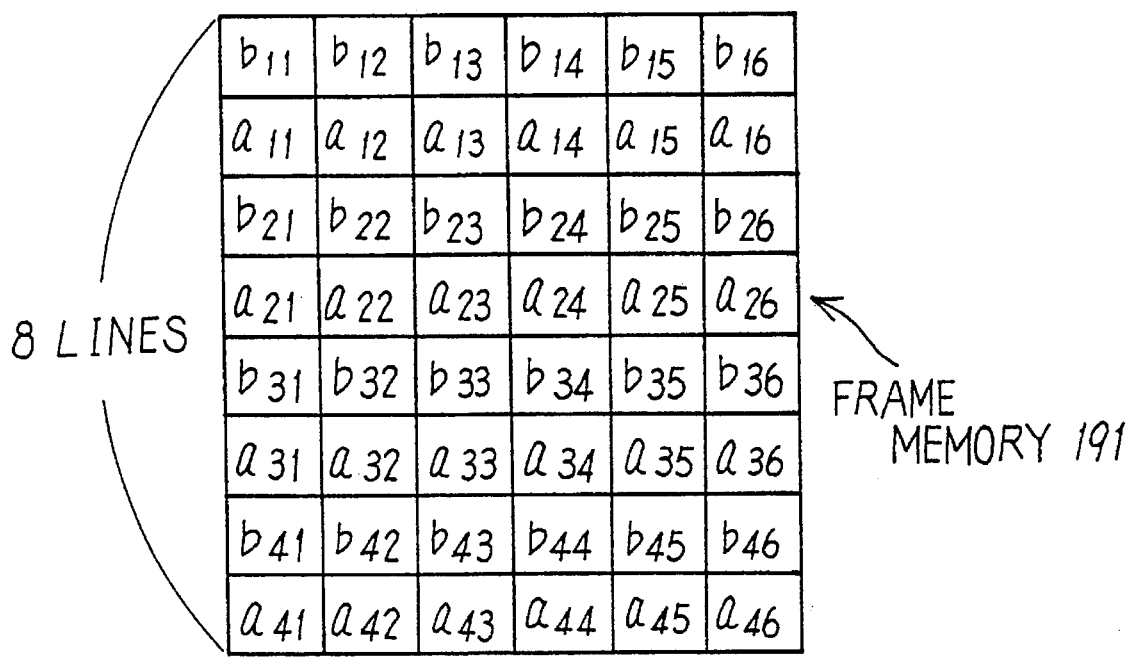
FIG. 40 is a diagram illustrating the frame memory section (composed of a frame memory)

When writing the video signal constituting an even-numbered field, the pixel signals [b11 to b1,480] are written in addresses (1,1) to (1,480) of the frame memory 191 as the first line, the pixel signals [b21 to b2,480] are written in addresses (3,1) to (3,480) of the frame memory 191 as the second line, and a similar write operation is carried out for the third to 240th lines (see FIG. 29). FIG. 40 illustrates the pixel signals written in the frame memory 191 in accordance with the square block shown in FIG. 30A.

In the read operation, the pixel signals of the individual lines constituting an odd-numbered field are read out from even-numbered row addresses of the frame memory 191, and the pixel signals of the individual lines constituting an even-numbered field are read out from odd-numbered row addresses of the memory 191.

When reading the video signal of an odd-numbered field, the pixel signals [a240,2, b240,2, . . . , a12, b12] are read from addresses (480,2) to (1,2) of the frame memory 191 as the first line, and the pixel signals [a240,4, b240,4, . . . , a14, b14] are read from addresses (480,4) to (1,4) of the frame memory 191 as the second line. A similar read operation is performed for the third to 240th lines (see FIG. 41).

Figure 41:
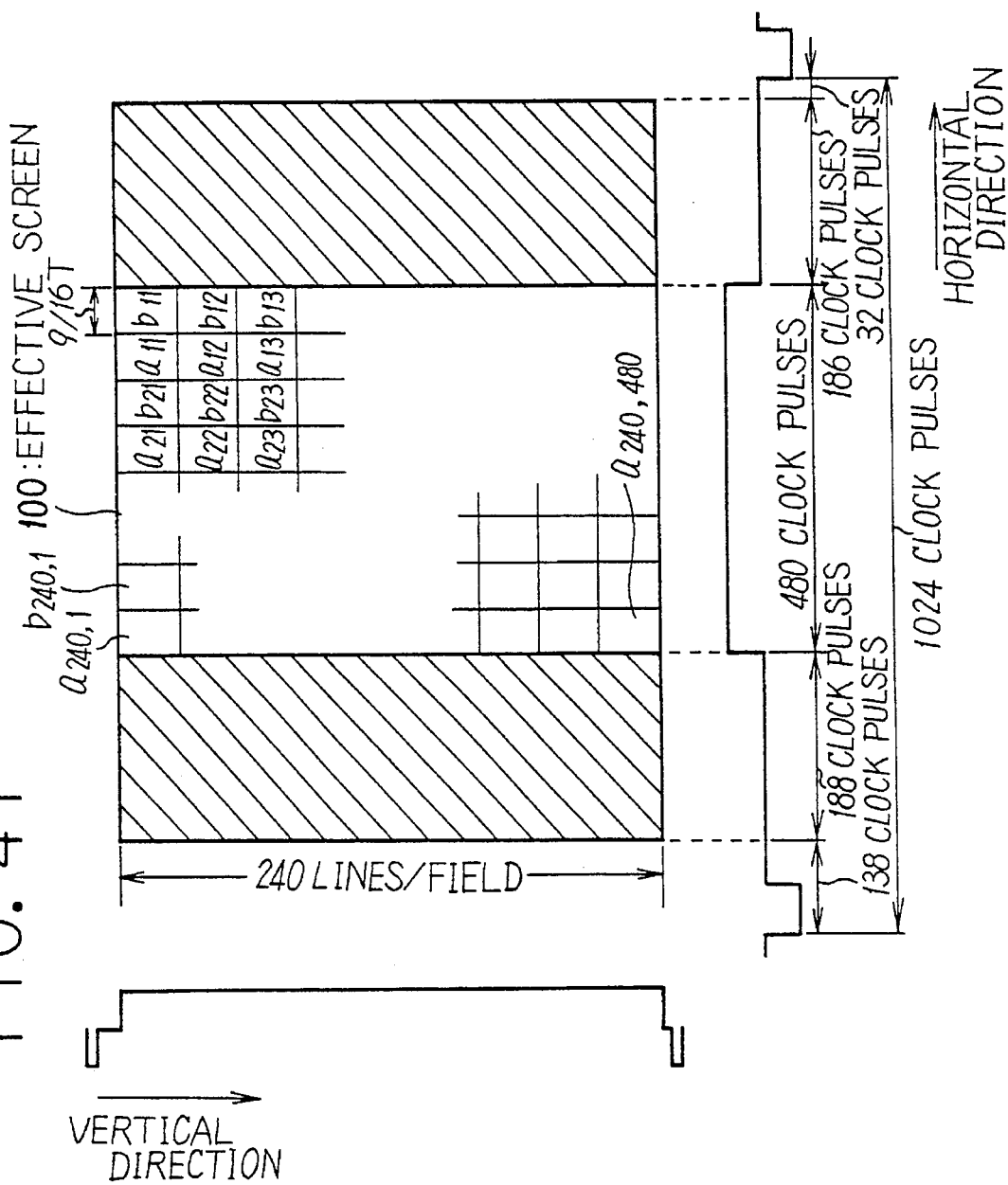
FIG. 41 is a diagram illustrating an aspect conversion process (read operation)

When reading the video signal of an even-numbered field, the pixel signals [a240,1, b240,1, . . . , a11, b11] are read from addresses (480,1) to (1,1) of the frame memory 191 as the first line, the pixel signals [a240,3, b240,3, . . . , a13, b13] are read from addresses (480,3) to (1,3) of the frame memory 191 as the second line, and a similar read operation is carried out for the third to 240th lines (see FIG. 41).

In the case of using the frame memory 191 for each of the frame memory sections 171 and 172 as shown in FIG. 39, the period of the read clock pulses RCLK is set to 9T/16, equivalent to the period of pixels. Since the period of the read clock pulses RCLK is 9T/18, the number of clock pluses in the horizontal direction of the effective screen 100 after the conversion is 480T/(9T/16), nearly equal to 854, and the number of clock pulses in one horizontal period is 576T/(9T/16)=1024.

Figure 33:
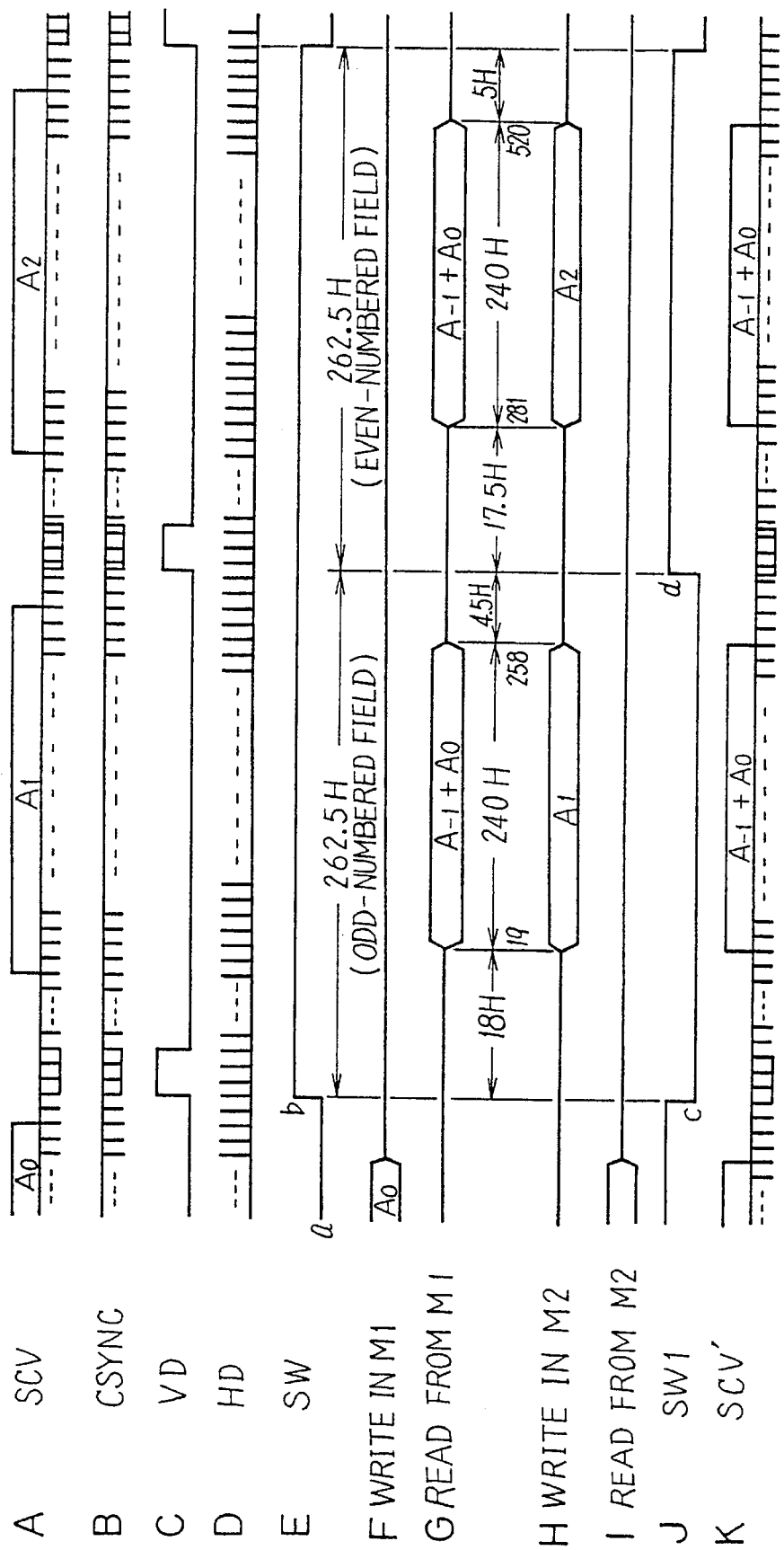
FIG. 33 is a timing chart based on the vertical direction (first frame)
Figure 34:
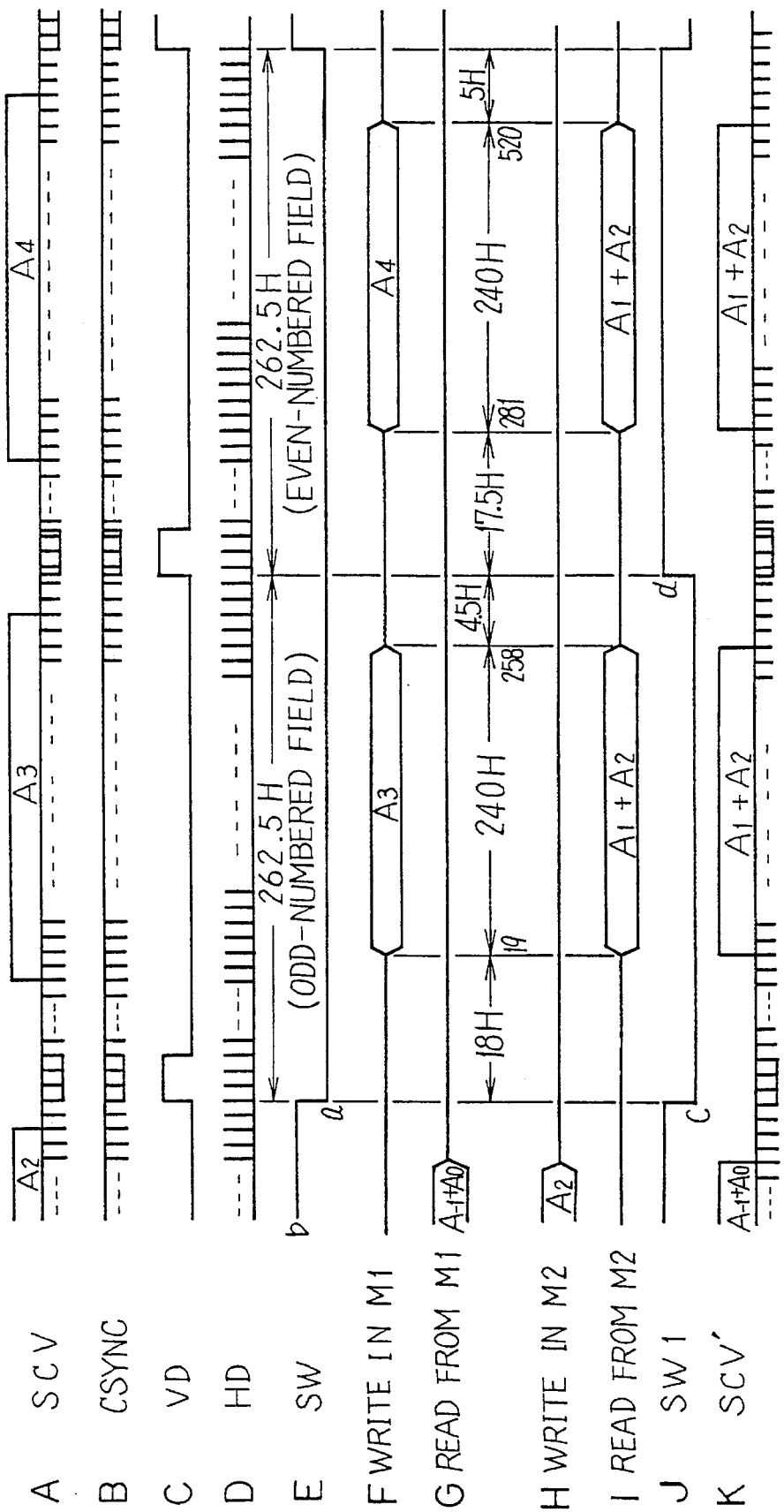
FIG. 34 is a timing chart based on the vertical direction (second frame)

Also in the case of constituting the frame memory sections 171 and 172 by the frame memory 191 as shown in FIG. 39, the entire operation of the frame memory sections 171 and 172 with respect to the first and second frames is the same as that described with reference to the above embodiment (see FIGS. 33 and 34).

The address control during the write and read operations is carried out differently in the following manner, due to the use of the frame memory 191.

Figure 42:
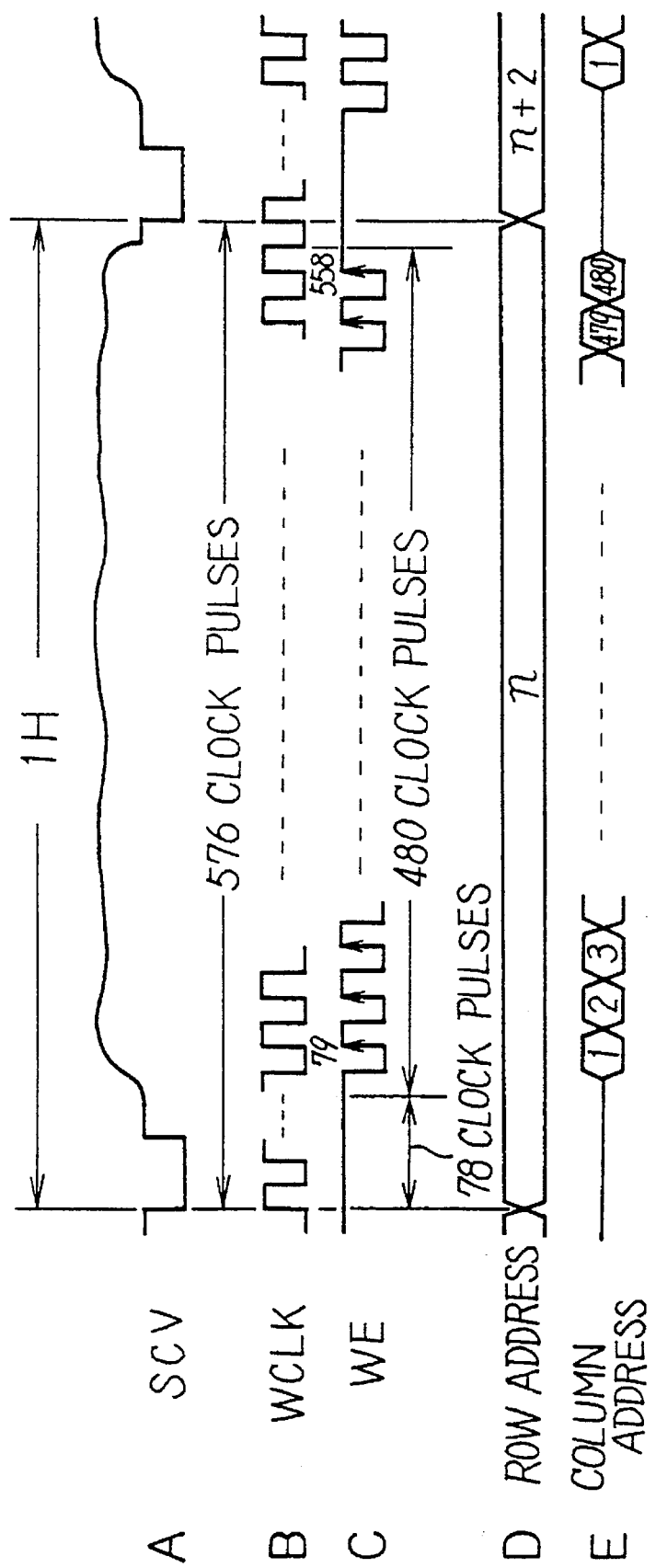
FIG. 42 is a timing chart showing a write operation in the horizontal direction.

First, the address control during the write operation will be described with reference to FIG. 42. In the figure, A denotes the video signal SCV and B denotes the write clock pulse WCLK. As seen from write enable signal WE shown in FIG. 42C, data write is carried out for 480 clock pulses from the 79th to 558th clock pulses. In this case, for the odd-numbered field, the row address n (FIG. 42D) is controlled to change as 2, 4, . . . , 480 in accordance with the first to 240th lines, and for the even-numbered field, the row address is controlled to change as 1, 3, . . . , 479 in accordance with the first to 240th lines. The column address is controlled to change from 1 to 480 in accordance with the 79th to 558th clock pulses in each line (FIG. 42E).

Figure 43:
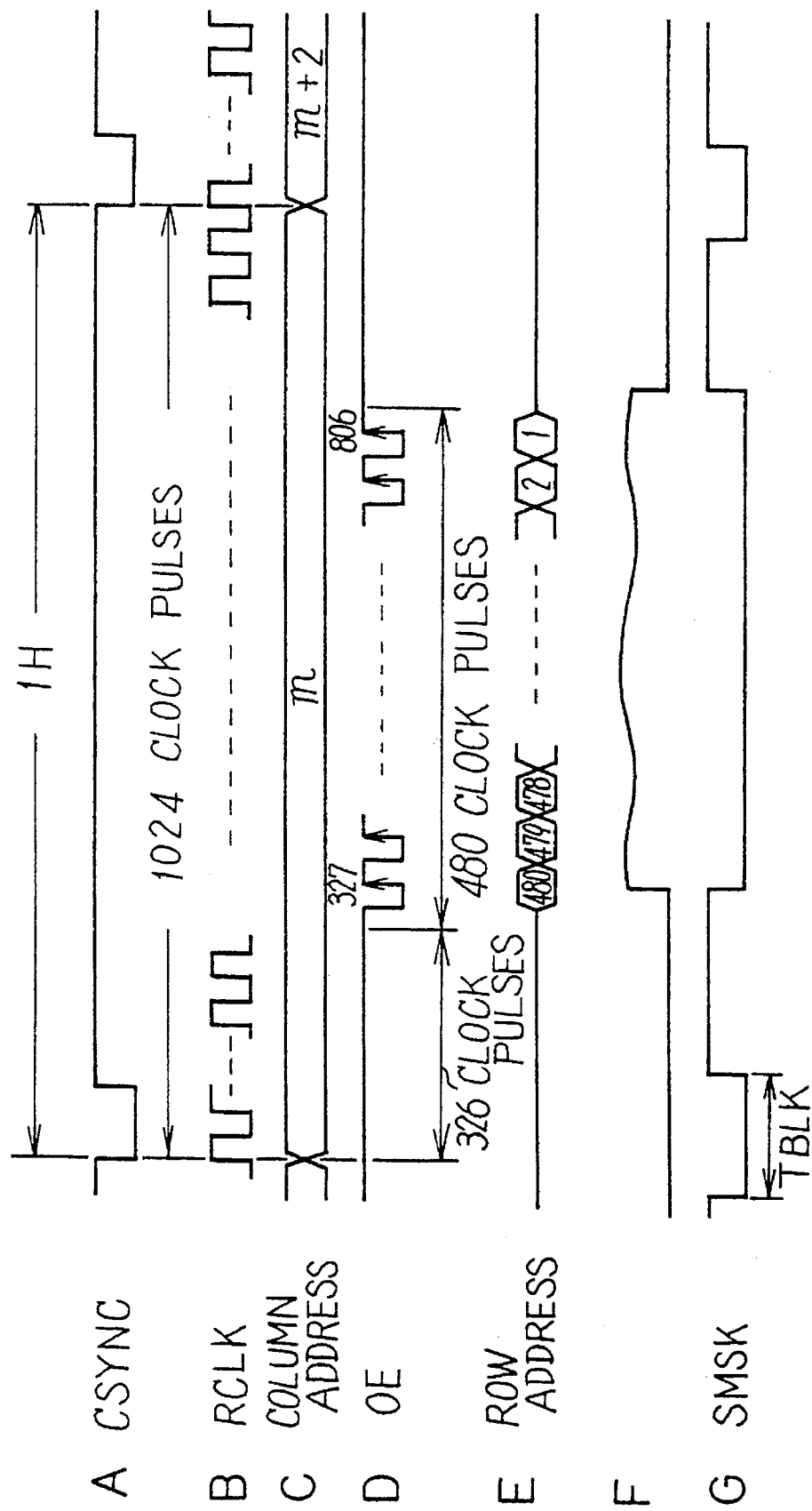
FIG. 43 is a timing chart showing a read operation in the horizontal direction.

The address control during the read operation will be described with reference to FIG. 43. In the figure, A denotes the composite synchronizing signal CSYNC and B denotes the read clock pulse RCLK. As seen from output enable signal OE shown in FIG. 43D, data read is carried out for 480 clock pulses from the 327th to 806th clock pulses. In this case, for the odd-numbered field, the column address m (FIG. 43C) is controlled to change as 2, 4, . . . , 480 in accordance with the first to 240th lines, and for the even-numbered field, the address m is controlled to change as 1, 3, . . . , 479 in accordance with the first to 240th lines. The row address, on the other hand, is controlled to change from 480 to 1 in accordance with the 327th to 806th clock pulses in each line (FIG. 43E).

The address control is carried out in the aforesaid manner, and therefore, even when the frame memory 191 is used for each of the frame memory sections 171 and 172, the luminance signal Y and color differential signals R–Y and B–Y are subjected to the aspect conversion and are output from the frame memory sections 171 and 172, as in the case of using two field memories 183 and 184 (see FIG. 35).

Since the frame memory 191 is used for the frame memory sections 171 and 172, it is unnecessary to switch memories between the odd- and even-numbered fields, and thus the arrangement can be simplified.

The aforementioned write and read timing with respect to the aspect conversion circuit 37 and frequencies of the clock pulses are given simply as an example and not limited to the values mentioned. Further, in the write operation, the horizontal length or width of the effective screen 100 is subdivided corresponding to 480 clock pulses, but may be divided in a different manner.

Another example of the aspect conversion circuit 37 will be now described. In this example, an image conversion similar to that shown in FIGS. 15A and 15B is achieved by the process described below.

Figure 44:
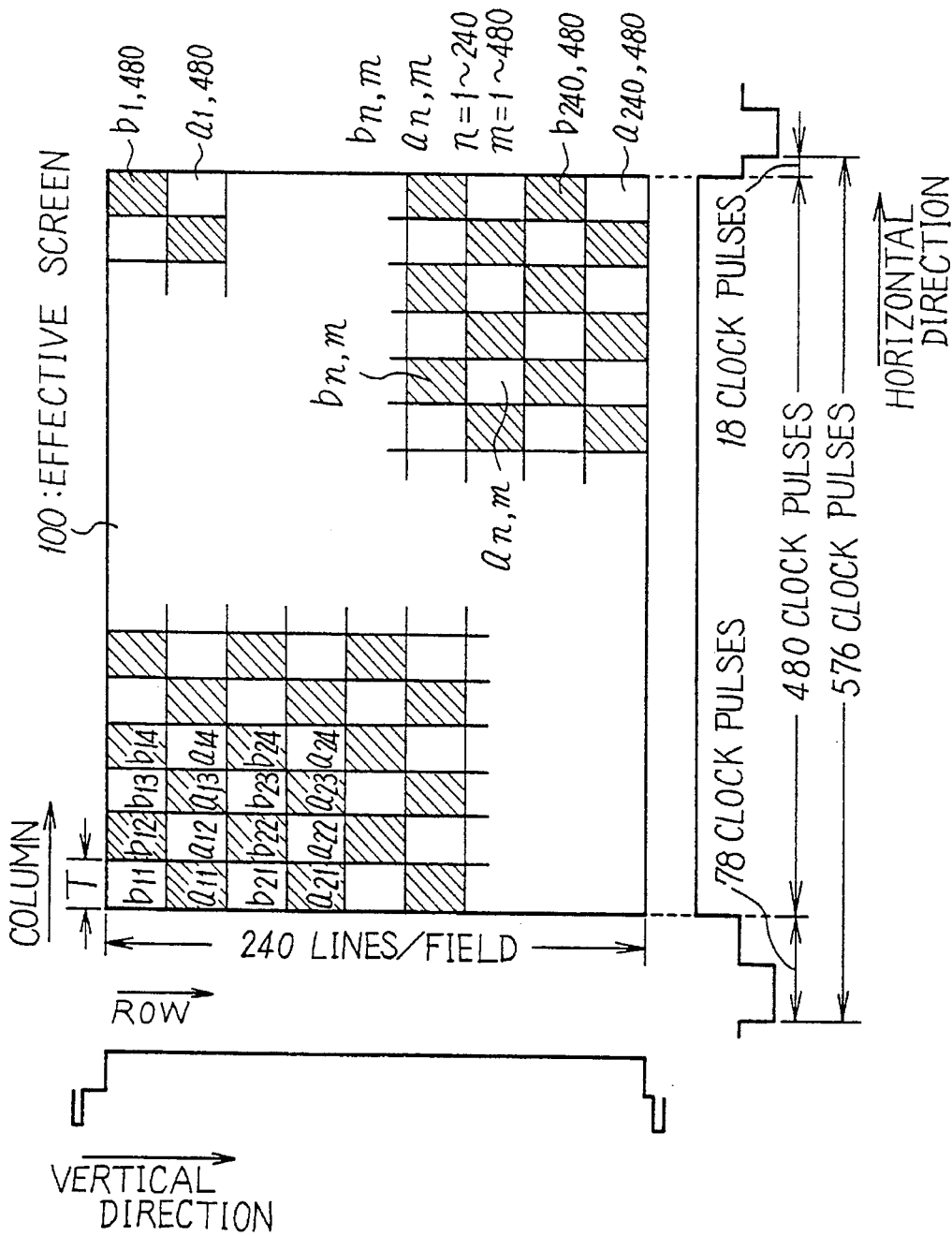
FIG. 44 is a diagram illustrating an aspect conversion process (write operation)

As shown in FIG. 44, the effective screen 100 is subdivided corresponding to 480 clock pulses in the horizontal direction and into 240 lines/field in the vertical direction. Namely, 480×240 pixel signals a11, a12, . . . , anm, . . . , a240,480 constituting the effective screen 100 are successively sampled from the video signal of the odd-numbered field, and 480×240 pixel signals b11, b12, . . . , bnm, . . . , b240,480 forming the effective screen 100 are successively sampled from the video signal of the even-numbered field.

For the odd-numbered field, the pixel signals a11, a13, . . . , a240,479 (hatched in FIG. 44) are written in memory, and for the even-numbered field, the pixel signals b12, b14, . . . , b240,480 (hatched in FIG. 44), which are in a line offset relationship with respect to the pixel signals of the odd-numbered field, are written in memory.

Where the effective screen ratio is 83.3%, the number of write clock pluses WCLK in one horizontal period is 480/0.833, nearly equal to 576. In FIG. 44, T represents the clock period.

Figure 45A:
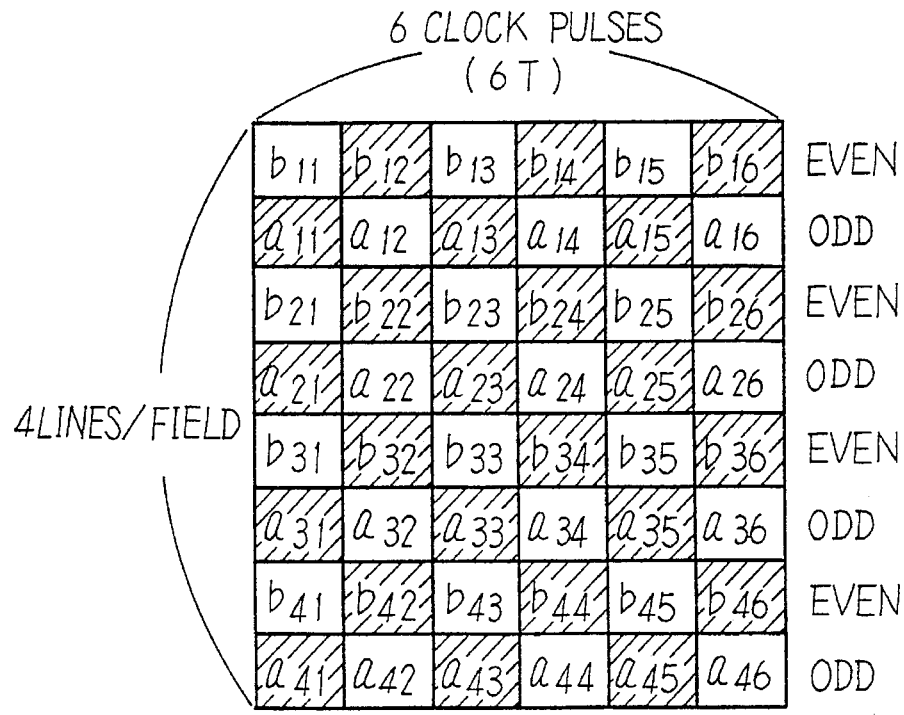
FIGS. 45A and 45B are diagrams illustrating an aspect conversion process.

To carry out the aspect conversion, since the effective screen 100 includes 240 lines/field in the vertical direction, 240 lines must be set using the 480 clock pluses in the horizontal direction. Here, a square block of 6 clock pulses by 4 lines/field, of which the width and height are equal on screen, is assumed, as shown in FIG. 45A. In the figure, the hatched regions represent the pixel signals which are written in the memory.

Figure 45B:
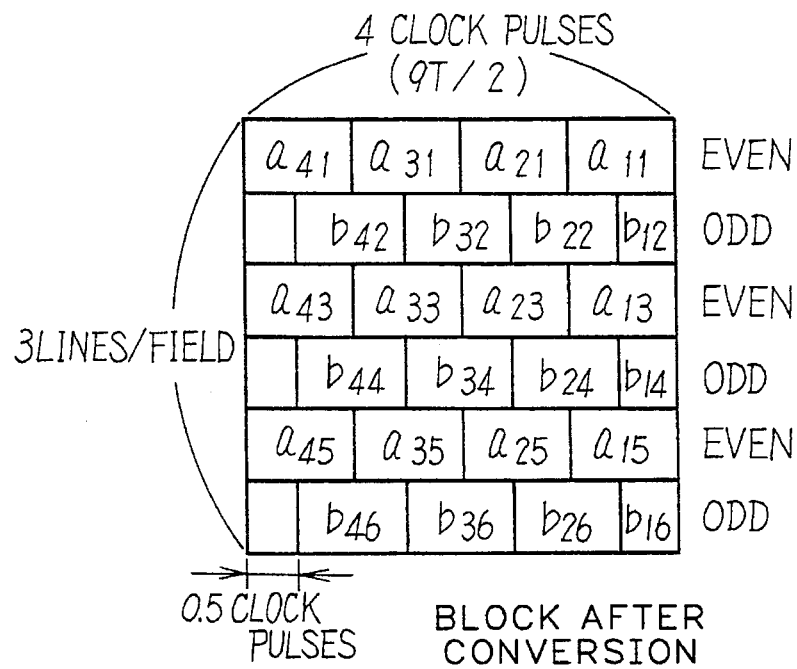

During the aspect conversion, when the video signal of the even-numbered field is output, the pixel signals at the first to fourth lines and corresponding to the first, third and fifth clock pulses, i.e., [a41 to a11], [a43 to a13], and [a45 to a15], are read and used as the signals for the first, second and third lines, respectively, and when the video signal of the odd-numbered field is output, the pixel signals at the first to fourth lines and corresponding to the second, fourth and sixth clock pulses, i.e., [b42 to b12], [b44 to b14], and [b46 to b16], are read and used as the signals for the first, second and third lines, respectively, whereby a square block of 4 clock pulses by 3 lines/field is formed (shown in FIG. 45B).

In this case, to make the positional relationship between the image of the odd-numbered field and the image of the even-numbered field after the conversion coincident with that before the conversion, the read timing for the pixel signals [b42 to b12], [b44 to b14] and [b46 to b16] is delayed by a period corresponding to 0.5 pulses with respect to the read timing for the pixel signals [a41 to a11], [a43 to a13] and [a45 to a15].

Here, the horizontal time corresponding to three lines/field is 6T×¾=9T/2, and accordingly, to form the square block, the period of the read clock pulses RCLK is set to 9T/8.

Figure 46:
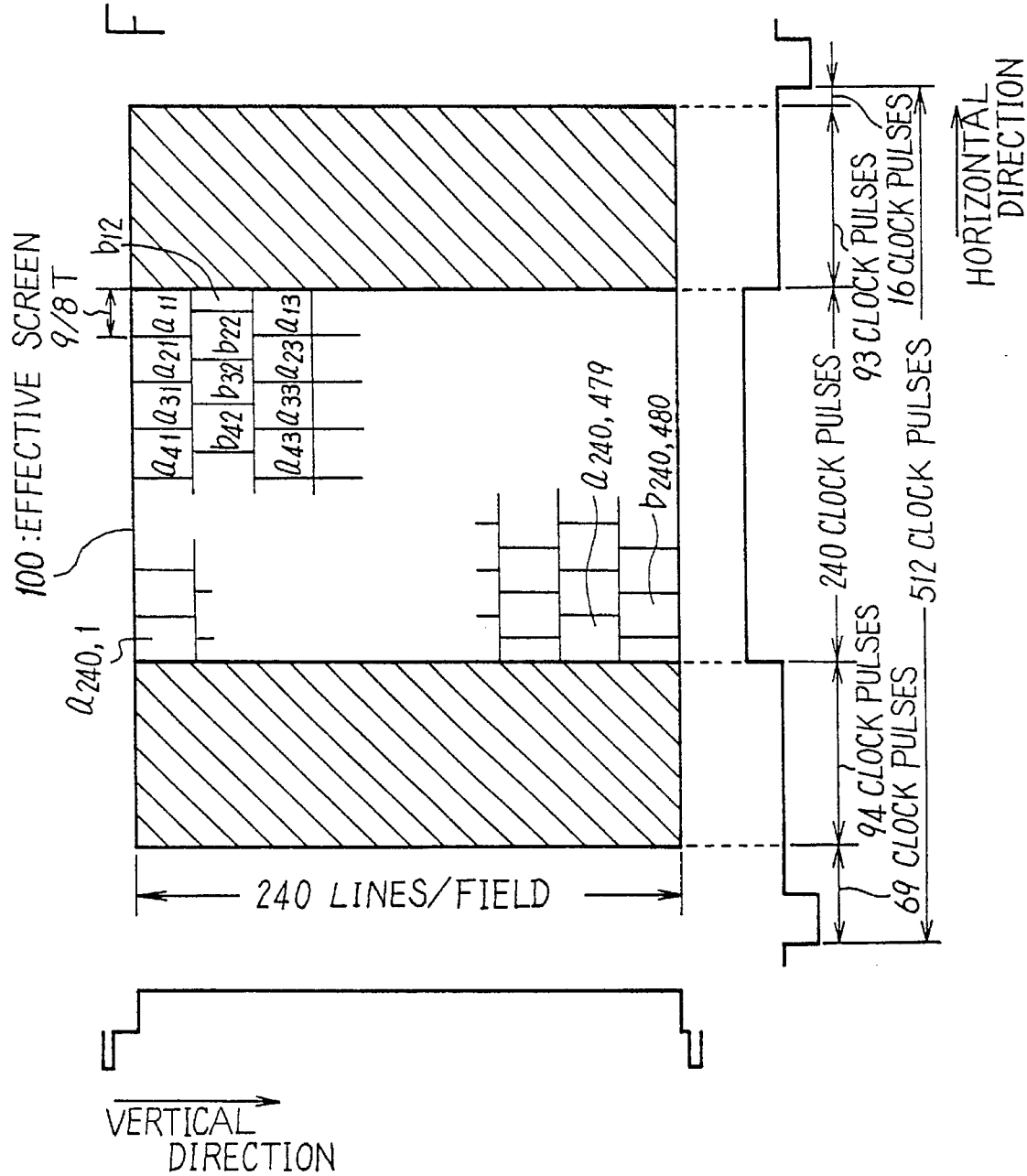
FIG. 46 is a diagram illustrating an aspect conversion process (read operation)

The effective screen 100 includes 80×60 square blocks each consisting of 6 clock pulses and 4 lines/field (FIG. 45A), and each block is converted to a square block of 4 clock pulses by 3 lines/field (FIG. 45B) in the aforesaid manner, to form an aspect-converted image (shown in FIG. 46).

Since the period of the read clock pulses RCLK is 9T/8, the number of pixels in the horizontal direction of the effective screen 100 after the conversion is 480T/(9T/8), nearly equal to 427, and the number of read clock pulses RCLK in one horizontal period is 576T/(9T/8)=512.

In this embodiment, the aspect conversion circuit 38 has an arrangement similar to that shown in FIG. 19.

As shown in the figure, the video signal SCV (shown in FIG. 21A) is supplied to an input terminal 151 and then to a luminance signal/chrominance signal separation circuit 152. The luminance signal Y separated by the separation circuit 152 is converted into a digital signal by an A/D converter 153, and then supplied to a movable terminal of a changeover switch 154. Although not illustrated, the A/D converter 153 is supplied with the write clock pulses WCLK (576 clock pulses in one horizontal period), and the luminance signal Y is sampled using the clock pulses WCLK.

The chrominance signal C separated by the separation circuit 152 is supplied to a chrominance demodulator 155 for demodulation, and a red differential signal R–Y and a blue differential signal B–Y are extracted. These color differential signals R–Y and B–Y are converted into digital signals by an A/D converter 156 and then supplied to a movable terminal of a changeover switch 157. Although not illustrated, the A/D converter 156 is supplied with the write clock pulses WCLK, and the color differential signals R–Y and B–Y are alternately sampled using the clock pulses WCLK.

Signals obtained at fixed terminals a of the changeover switches 154 and 157 are supplied to a field memory (M1) 158 as write signals, and signals obtained at fixed terminals b of the same switches are supplied to a field memory (M2) 159 as write signals.

The luminance signal Y and color differential signals R–Y and B–Y read from the field memory 158 are supplied to a fixed terminal b of each of changeover switches 160 and 161, and the luminance signal Y and color differential signals R–Y and B–Y read from the field memory 159 are supplied to a fixed terminal a of each of the changeover switches 160 and 161.

The video signal SCV delivered to the input terminal 151 is also supplied to a synchronous detection circuit 162. The synchronous detection circuit 162 outputs a composite synchronizing signal CSYNC (shown in FIG. 21B), a vertical synchronizing signal VD (FIG. 21C) and a horizontal synchronizing signal HD (FIG. 21D) to a controller 163.

The controller 163 controls the switching operation of the aforesaid changeover switches 154, 157, 160 and 161. Namely, the changeover switches 154, 157, 160 and 161 are supplied with a switching control signal SW (shown in FIG. 21E) and controlled thereby such that they connect to the respective terminals b in the odd-numbered field and connected to the respective terminals a in the even-numbered field.

Further, the controller 163 controls the write and read operations of the field memories 158 and 159. As for the field memory 158, data corresponding to 240 lines from 19H to 258H of the odd-numbered field (FIG. 21G) is read out, and data corresponding to 240 lines from 281H to 520H of the even-numbered field (FIG. 21F) is written. For the field memory 159, data corresponding to 240 lines from 19H to 258H of the odd-numbered field (FIG. 21H) is written, and data corresponding to 240 lines from 281H to 520H of the even-numbered field (FIG. 21I) is read out.

In the write operation of the video signal of the odd-numbered field, the pixel signals [a11, a13, . . . a1,479] are written in addresses (1,1), (1,2), . . . , (1,240) of the field memory 159 as the first line, the pixel signals [a21, a23, . . . , a2,479] are written in addresses (2,1), (2,2), . . . , (2,240) of the field memory 159 as the second line, and a similar write operation is carried out with respect to the third to 240th lines (see FIG. 44). In the write operation of the video signal of the even-numbered field, the pixel signals [b12, b14, . . . , b1,480] are written in addresses (1,1), (1,2), . . . , (1,240) of the field memory 158 as the first line, the pixel signals [b22, b24, . . . , b2,480] are written in addresses (2,1), (2,2), . . . , (2,240) of the field memory 158 as the second line, and a similar write operation is carried out with respect to the third to 240th lines (see FIG. 44).

In the read operation of the video signal of the odd-numbered field, by contrast, the pixel signals [b240,2, . . . , b22,a12] are read from the addresses (240,1), . . . , (2,1), (1,1) of the field memory 158 as the first line, the pixel signals [b240,4, . . . , b24, b14] are read from the addresses (240,2), . . . , (2,2), (1,2) of the field memory 158 as the second line , and a similar read operation is carried out with respect to the third to 240th lines (see FIG. 46). In the read operation of the video signal of the even-numbered field, the pixel signals [a240,1, . . . , a21, a11] are read from the addresses (240,1), . . . , (2,1), (1,1) of the field memory 159 as the first line, the pixel signals [a240,3, . . . , a23, a13] are read from the addresses (240,2), . . . , (2,2), (1,2) of the field memory 159 as the second line, and a similar read operation is carried out with respect to the third to 240th lines (see FIG. 46).

In this case, to make the positional relationship between the image of the odd-numbered field and the image of the even-numbered field after the conversion coincident with that before the conversion, the read timing for the pixel signals at the individual lines of the odd-numbered field is delayed by a period corresponding to 0.5 pulses with respect to the read timing for the pixel signals at the individual lines of the even-numbered field.

The following is a description of the address control for the field memories 158 and 159 with regard to the first to 240 lines.

Figure 47:
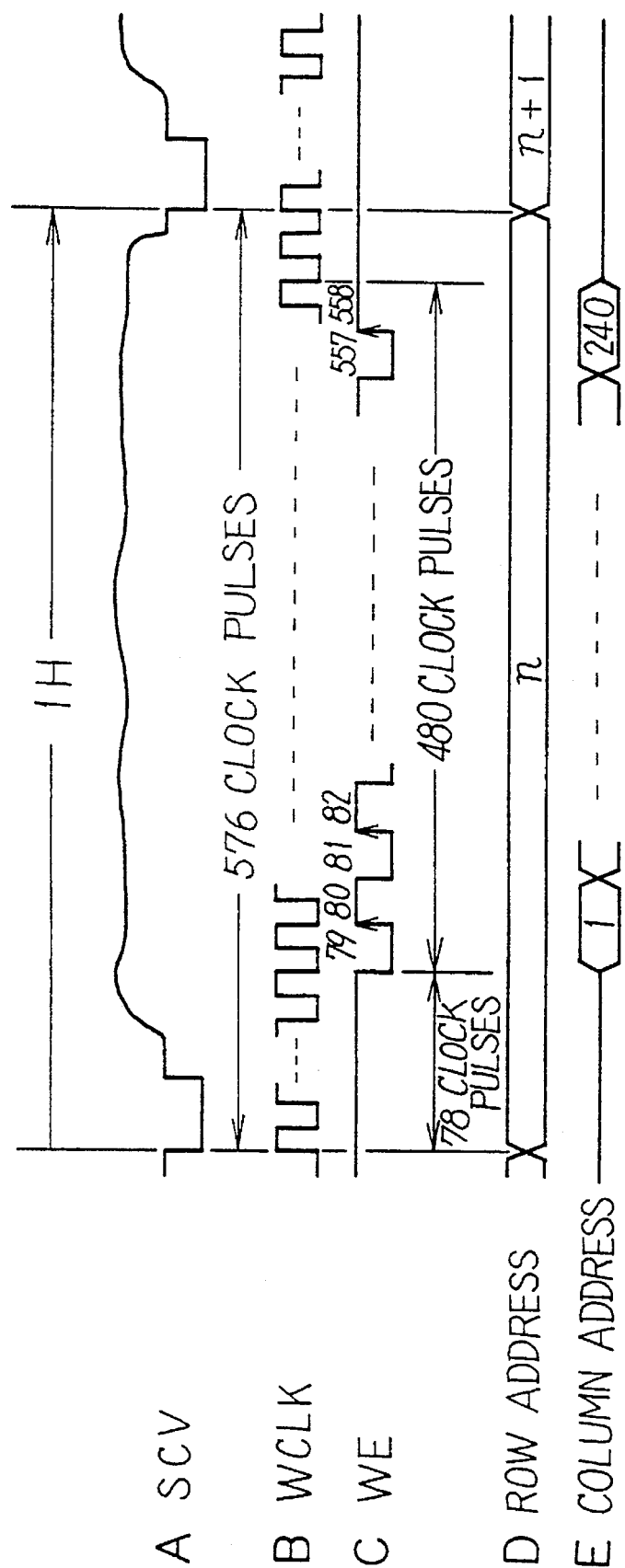
FIG. 47 is a timing chart showing a write operation of an odd-numbered field in the horizontal direction.

First, the address control during the write operation of the video signal of the odd-numbered field will be described with reference to FIG. 47. In the figure, A denotes the video signal SCV and B denotes the write clock pulse WCLK. As seen from write enable signal WE shown in FIG. 47C, data write is carried out for 480 clock pulses from the 79th to 558th clock pulses.

In this case, the row address n (FIG. 47D) is controlled to change from 1 to 240 in accordance with the first to 240th lines. The column address, on the other hand, is controlled to change from 1 to 240 in accordance with the 79th to 558th clock pulses in each line (FIG. 47E) (the column address is changed by 1 per two clock pulses).

Figure 48:
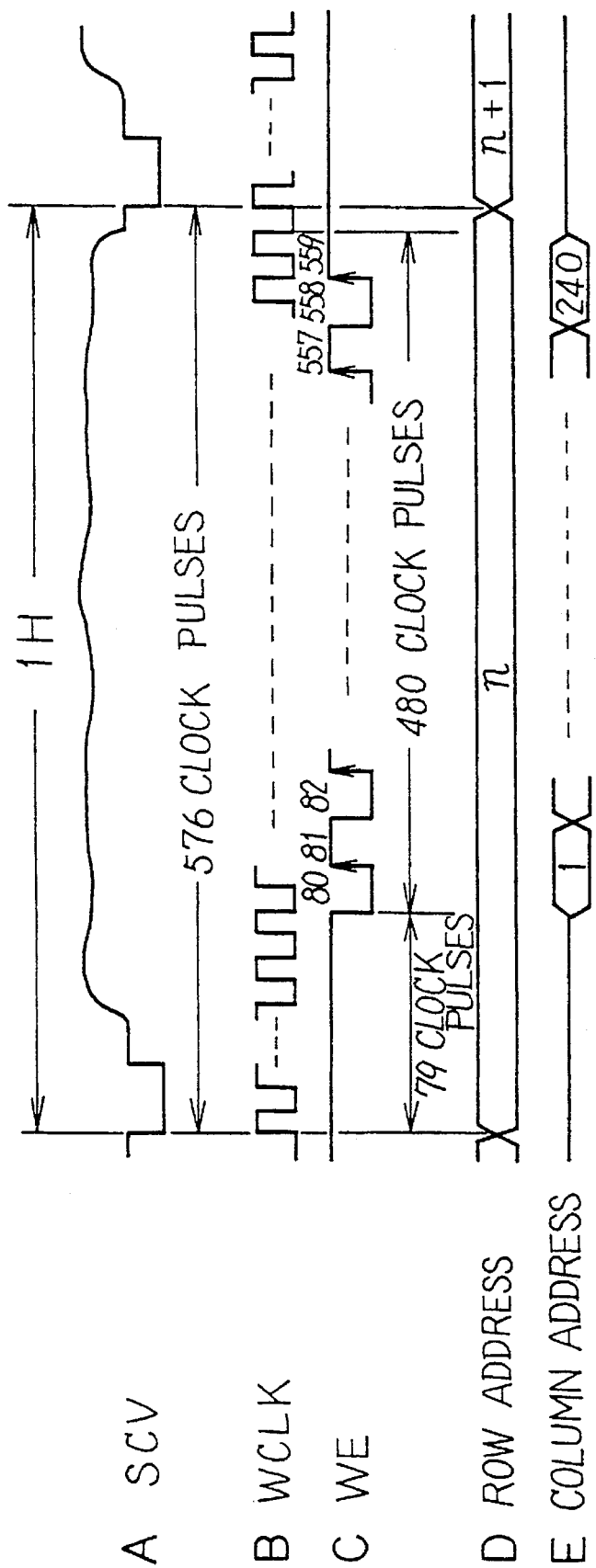
FIG. 48 is a timing chart showing a write operation of an even-numbered field in the horizontal direction.

The address control for the field memory 158 during the write operation of the video signal of the even-numbered field will be described with reference to FIG. 48. In the figure, A denotes the video signal SCV and B denotes the write clock pulse WCLK. As seen from write enable signal WE shown in FIG. 48C, data write is carried out for 240 clock pulses from the 80th to 559th clock pulses.

In this case, the row address n (FIG. 48D) is controlled to change from 1 to 240 in accordance with the first to 240th lines, and the column address is controlled to change from 1 to 240 in accordance with the 80th to 559th clock pulses in each line (FIG. 48E) (the column address is changed by 1 per two clock pulses).

The write enable signal WE shown in FIG. 48C is delayed in phase by one clock pulse with respect to the write enable signal WE of the odd-numbered field (shown in FIG. 47C). Accordingly, among the pixel signals of the individual lines of the odd- and even-numbered fields, those which are in an offset relationship are written in the memories 158 and 159.

Figure 49:
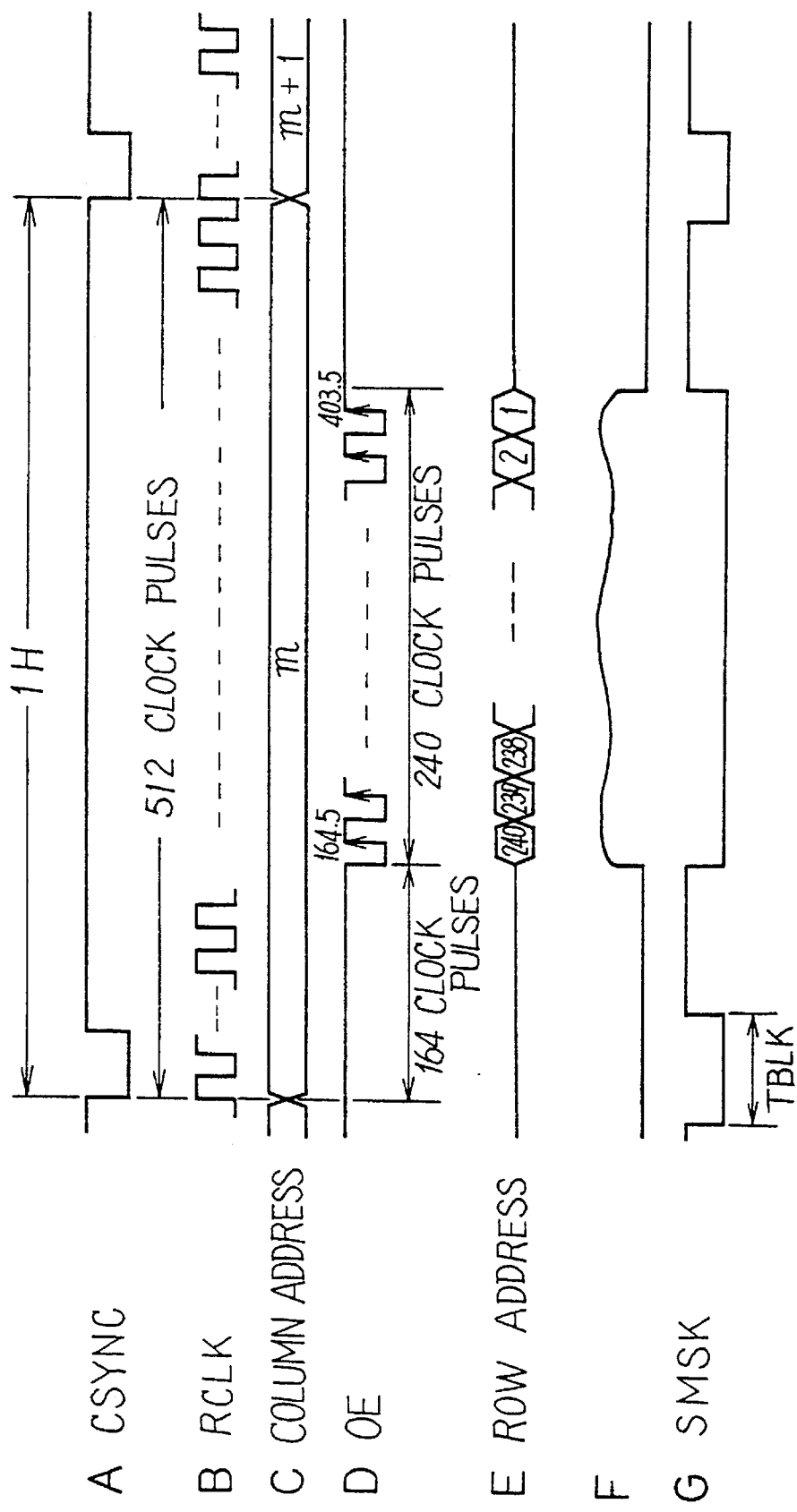
FIG. 49 is a timing chart showing a read operation of the odd-numbered field in the horizontal direction.

Next, the address control for the field memory 158 during the read operation of the video signal of the odd-numbered field will be described with reference to FIG. 49. In the figure, A denotes the composite synchronizing signal CSYNC and B denotes the read clock pulse RCLK. As seen from output enable signal OE shown in FIG. 49D, data read is carried out for 240 clock pulses from the 164.5th to 403.5th clock pulses. In this case, the column address m (FIG. 49C) is controlled to change from 1 to 240 in accordance with the first to 240th lines, while the row address is controlled to change from 240 to 1 in accordance with the 164.5th to 403.5th clock pulses in each line (FIG. 49E).

Figure 50:
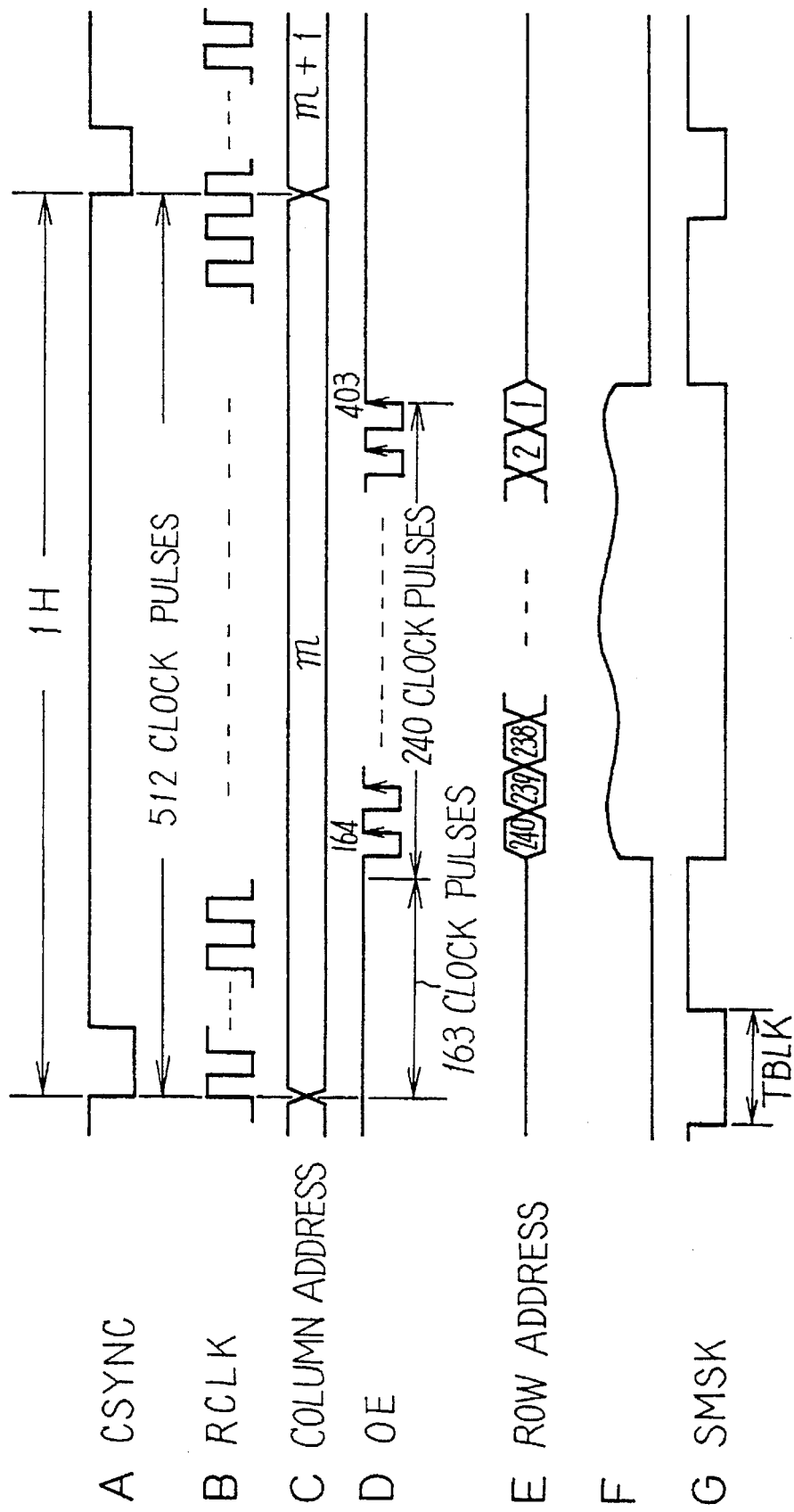
FIG. 50 is a timing chart showing a read operation of the even-numbered field in the horizontal direction.

The address control for the field memory 159 during the read operation of the video signal of the even-numbered field will be described with reference to FIG. 50. In the figure, A denotes the composite synchronizing signal CSYNC and B denotes the read clock pulse RCLK. As seen from output enable signal OE shown in FIG. 50D, data write is carried out for 240 clock pulses from the 164th to 403rd clock pulses. In this case, the column address m (FIG. 50C) is controlled to change from 1 to 240 in accordance with the first to 240th lines, and the row address is controlled to change from 240 to 1 in accordance with the 164th to 403rd clock pulses in each line (FIG. 50E).

The output enable signal OE shown in FIG. 50D is advanced in phase by 0.5 clock pulses with respect to the output enable signal OE of the odd-numbered field (shown in FIG. 49D). Accordingly, the positional relationship between the converted images of the odd- and even-numbered fields, formed by the video signals read from the memories 158 and 159, can be made coincident with that of the images of the odd- and even-numbered fields before the conversion (see FIG. 45B).

Referring again to FIG. 19, since the write and read operations of the field memories 158 and 159 are controlled in the aforementioned manner, the luminance signal Y and color differential signals R−Y and B−Y are subjected to the aspect conversion and are output alternately from the field memories 158 and 159.

The luminance signal Y output from the changeover switch 160 is converted into an analog signal by a D/A converter 164, then combined with the composite synchronizing signal CSYNC at an adder 165, and supplied to an adder 166. The color differential signals R−Y and B−Y output from the changeover switch 161 are converted into analog signals by a D/A converter 167, and subjected to a quadrature two-phase modulation, known in the art, at a chrominance modulator 168 to form a chrominance signal C.

The chrominance signal C output from the chrominance modulator 168 is added to the luminance signal Y at the adder 166 to form a color video signal. The color video signal is supplied to a masking circuit 169 and subjected to a masking process thereat such that the signal level is set to a pedestal level during the period (see hatched region in FIG. 46) in which no signal related to the effective screen 100 is read from the field memories 158 and 159. In this case, a mask signal SMSK (shown in FIGS. 49G and 50G), which is high-level during a period other than the read time and blanking period, is supplied from the controller 163 to the masking circuit 169, and the signal level is set to the pedestal level during the period in which the mask signal SMSK is high-level. In FIGS. 49 and 50, F represents the read signal for the field memories 158 and 159.

Due to the above-described operation, a color video signal SCV', to which the masking process has been subjected for a region in which no video signal exists and in which the aspect or orientation of the image has been converted, as shown in FIG. 15, is output from the masking circuit 169 to an output terminal 170 (see FIG. 21J).

In the aspect conversion circuit 37 described above, among the pixel signals of the individual lines of the odd- and even-numbered fields, those which are in the offset relationship are written in the memories 158 and 159, and the read timings for the pixel signals of the individual lines of the odd- and even-numbered fields from the memories 158 and 159 are shifted from each other by a period corresponding to 0.5 clock pulses. Accordingly, the positional relationship of the converted image formed based on the video signals of the odd- and even-numbered fields coincides with that before the conversion (see FIGS. 45A and 45B), and an image deviation between the odd- and even-numbered fields due to aspect conversion is prevented.

The aforementioned write and read timing with respect to the aspect conversion circuit 37 and frequency of the clock pulses are given simply by way of example, and may of course be changed. Further, in the write operation, the effective screen 100 is subdivided corresponding to 480 clock pulses in the horizontal direction. Alternatively, other integer multiple of 240 can be used for the purpose, in which case the write operation is simplified because a reduction to an integer submultiple suffices when data is written in the memories 158 and 159.

Further, in the above aspect conversion circuit 37, the period of the write enable signal WE is set to half (½) that of the clock pulses WCLK, to thereby reduce the number of pixel signals to be written. Alternatively, all of the pixel signals of the individual lines may be written, and the number of pixel signals may be reduced when the signals are read out. In this case, during the read operation, among the pixel signals of the individual signals of the odd- and even-numbered fields, those which are in the offset relationship are selectively read out to provide converted video signals.

Another example of the aspect conversion circuit 37 will be now described. In this example, an image conversion similar to that shown in FIGS. 15A and 15B is achieved by the process described below.

As shown in FIG. 29, the effective screen 100 is subdivided corresponding to 480 clock pulses in the horizontal direction and into 240 lines/field in the vertical direction. Namely, 480×240 pixel signals a11, a12, . . . , anm, . . . , a240,480 constituting the effective screen 100 are successively sampled from the video signal of the odd-numbered field, and 480×240 pixel signals b11, b12, . . . , bnm, . . . , b240,480 forming the effective screen 100 are successively sampled from the video signal of the even-numbered field.

For the odd-numbered field, the pixel signals a11 to a240,480 are written in memory, and for the even-numbered field, the pixel signals b11 to b240,480 are written in memory.

Where the effective screen ratio is 83.3%, the number of write clock pluses WCLK in one horizontal period is 480/0.833, nearly equal to 576. In FIG. 29, T represents the clock period.

To carry out the aspect conversion, since the effective screen 100 includes 240 lines/field in the vertical direction, 240 lines must be set for each of the odd- and even-numbered fields, using 480 clock pluses in the horizontal direction. Here, a square block of 6 clock pulses by 4 lines/field, of which the width and height are equal on screen, is assumed, as shown in FIG. 30A.

During the aspect conversion, when the video signal of the even-numbered field is output, the pixel signals which are at the first to fourth lines of the odd- and even-numbered fields and correspond to the first, third and fifth clock pulses, i.e., [a41, b41, ..., a11, b11], [a43, b43, ..., a13, b13], and [a45, b45, ..., a15, b15], are read and used as the signals for the first, second and third lines, respectively, and when the video signal of the odd-numbered field is output, the pixel signals which are at the first to fourth lines of the odd- and even-numbered fields and correspond to the second, fourth and sixth clock pulses, i.e., [a42, b42, ..., a12, b12], [a44, b44, ..., a14, b14], and [a46, b46, ..., a16, b16], are read and used as the signals for the first, second and third lines, respectively, whereby a square block of 8 clock pulses by 3 lines/field is formed (shown in FIG. 30B).

Here, the horizontal time corresponding to three lines/field is 6T×¾=9T/2, and accordingly, to form the square block, the period of the read clock pulses RCLK is set to 9T/16.

The effective screen 100 includes 80×60 square blocks each consisting of 6 clock pulses and 4 lines/field (FIG. 30A), and each block is converted to a square block of 8 clock pulses by 3 lines/field (FIG. 30B) in the aforesaid manner, to form an aspect-converted image (shown in FIG. 31).

Since the period of the read clock pulses RCLK is 9T/16, the number of clock pulses in the horizontal direction of the effective screen 100 after the conversion is 480T/(9T/16), nearly equal to 854, and the number of the clock pulses in one horizontal period is 576T/(9T/16)=1024.

Figure 51:
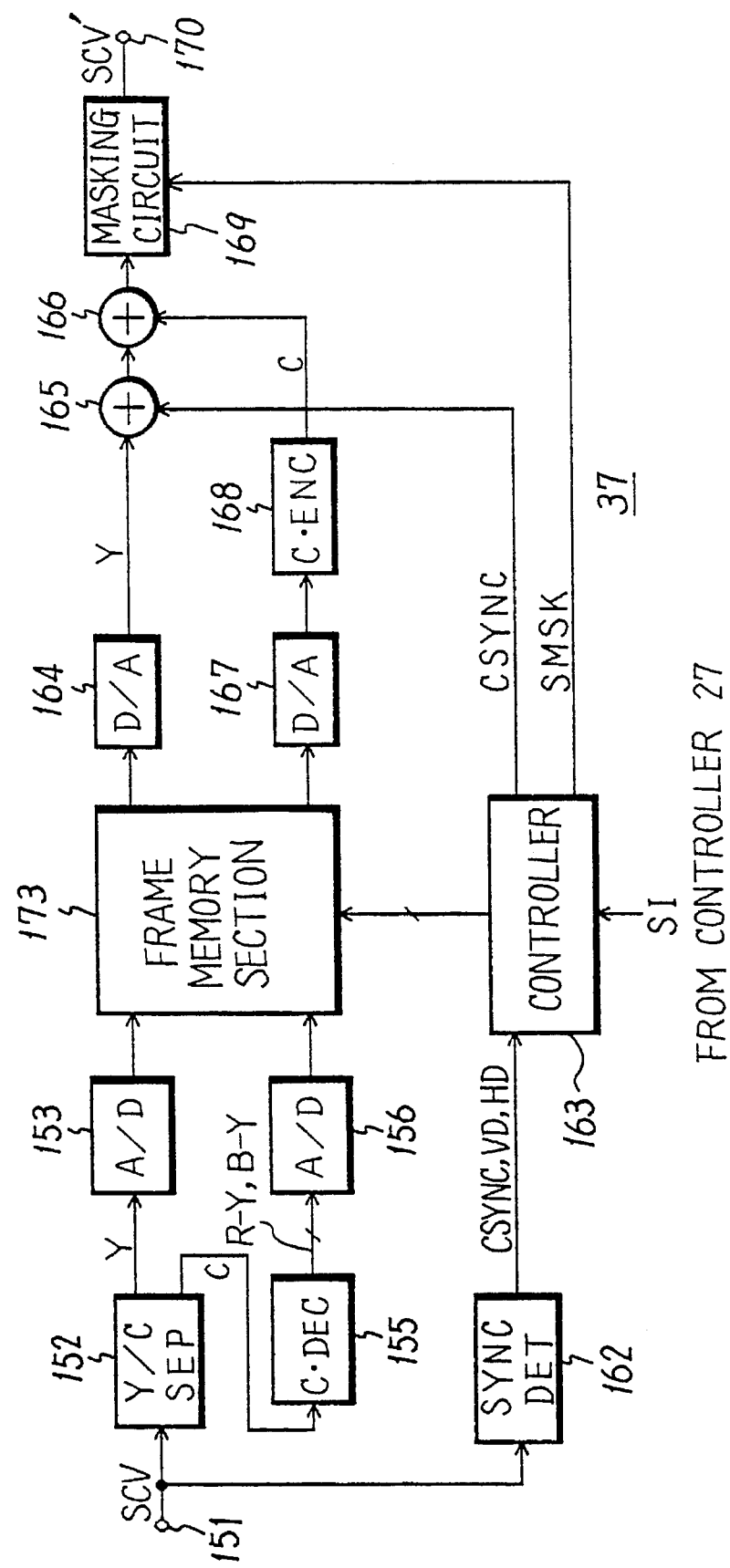
FIG. 51 is a block diagram showing the arrangement of an aspect conversion circuit in detail.

FIG. 51 shows the arrangement of the aspect conversion circuit 37 in detail. In the figure, like reference numerals are used to denote like parts shown in FIG. 19.

As shown in the figure, the video signal SCV (shown in FIG. 55A) is supplied to an input terminal 151 and then to a luminance signal/chrominance signal separation circuit 152. The luminance signal Y separated by the separation circuit 152 is converted into a digital signal by an A/D converter 153, and then supplied to a frame memory section 154. Although not illustrated, the A/D converter 153 is supplied with the write clock pulses WCLK (576 clock pulses in one horizontal period), and the luminance signal Y is sampled using the clock pulses WCLK.

The chrominance signal C separated by the separation circuit 152 is supplied to a chrominance demodulator 155 for demodulation, and a red differential signal R−Y and a blue differential signal B−Y are extracted. These color differential signals R−Y and B−Y are converted into digital signals by an A/D converter 156 and then supplied to a frame memory section 173. Although not illustrated, the A/D converter 156 is supplied with the write clock pulses WCLK, and the color differential signals R−Y and B−Y are alternately sampled using the clock pulses WCLK.

The video signal SCV delivered to the input terminal 151 is also supplied to a synchronous detection circuit 162. The synchronous detection circuit 162 outputs a composite synchronizing signal CSYNC (shown in FIG. 55B), a vertical synchronizing signal VD (FIG. 55C) and a horizontal synchronizing signal HD (FIG. 55D) to a controller 163.

The controller 163 controls the operation of the frame memory section 173. In this embodiment, the frame memory section 173 has an arrangement shown in FIG. 52.

As shown in the figure, the luminance signal Y is supplied to a movable terminal of a changeover switch 101, and the luminance signal Y obtained at a fixed terminal a of this changeover switch 101 is supplied to a movable terminal of a changeover switch 103. The luminance signal Y obtained at a fixed terminal a of the changeover switch 103 is supplied to a memory M1 as a write signal, whereas the luminance signal Y obtained at the other fixed terminal b of the switch 103 is supplied to a memory M2 as a write signal.

The luminance signal Y obtained at a fixed terminal b of the changeover switch 101 is supplied to a movable terminal of a changeover switch 105. The luminance signal Y appearing at a fixed terminal a of the changeover switch 105 is supplied to a memory M3 as a write signal, whereas the luminance signal Y appearing at the other fixed terminal b of the switch 105 is supplied to a memory M4 as a write signal.

The color differential signals R−Y and B−Y are supplied to a movable terminal of a changeover switch 102, and the color differential signals R−Y and B−Y obtained at a fixed terminal a of this changeover switch 102 are supplied to a movable terminal of a changeover switch 104. The color differential signals R−Y and B−Y obtained at a fixed terminal a of the changeover switch 104 are supplied to the memory M1 as write signals, whereas the color differential signals R−Y and B−Y obtained at the other fixed terminal b of the switch 104 are supplied to the memory M2 as write signals.

The color differential signals R−Y and B−Y obtained at a fixed terminal b of the changeover switch 102 are supplied to a movable terminal of a changeover switch 106. The color differential signals R−Y and B−Y appearing at a fixed terminal a of the changeover switch 106 are supplied to the memory M3 as write signals, whereas the color differential signals R−Y and B−Y appearing at the other fixed terminal b of the switch 106 are supplied to the memory M4 as write signals.

Figure 55:
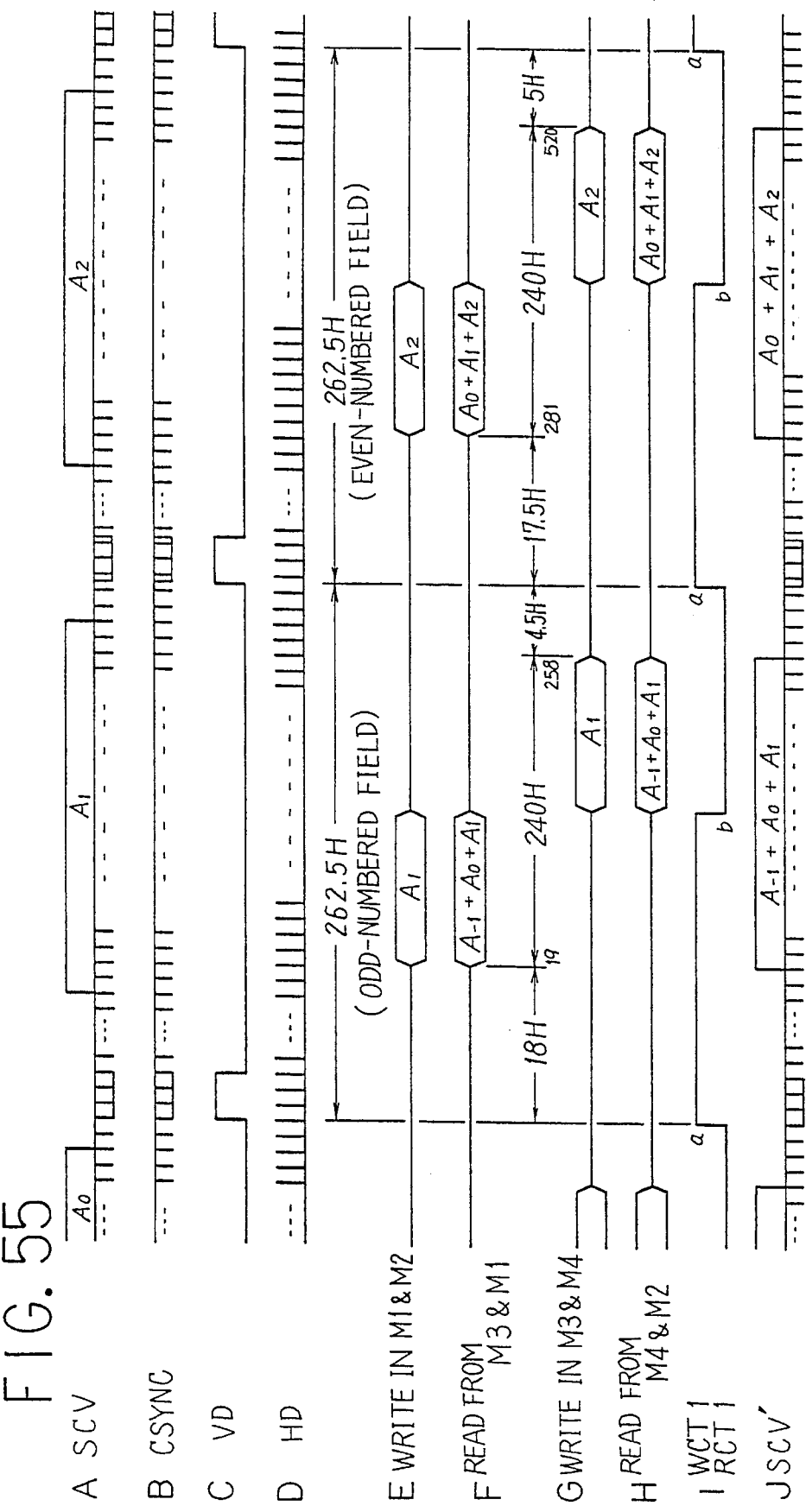
FIG. 55 is a timing chart based on the vertical direction.

The changeover switches 101 and 102 are supplied with a switching control signal WCT1 from a subcontroller 107 (see FIG. 55I). Specifically, the changeover switches 101 and 102 are connected to the respective terminals a in the former half period of each field (including the first to 120th lines constituting the effective screen) and connected to the respective terminals b in the latter half period of same (including the 121st to 240th lines constituting the effective screen).

The changeover switches 103 to 106 are supplied with a switching control signal WCT2 from the subcontroller 107 (see FIG. 56G). These changeover switches 103 to 106 are connected to the respective terminals a in the former half period of each line (including the first to 240th pixels forming the effective screen) and connected to the respective terminals b in the latter half period of same (including the 241st to 480th pixels forming the effective screen).

The memories M1 to M4 each have a storage capacity large enough to store the luminance signals Y and color differential signals R−Y and B−Y corresponding to a ¼ frame, and constitute a frame memory. Each of the memories M1 to M4 is supplied with a write enable signal, an output enable signal, a column address, and a row address from the subcontroller 107. The subcontroller 107 is supplied with the write clock pulse WCLK, read clock pulse RCLK, and synchronizing signals HD and VD from the controller 163.

The luminance signal Y read from the memory M1 is supplied to a fixed terminal a of a changeover switch 108, and the color differential signals R–Y and B–Y read from this memory M1 are supplied to a fixed terminal a of a changeover switch 110. The luminance signal Y read from the memory M2 is supplied to a fixed terminal a of a changeover switch 109, and the color differential signals R–Y and B–Y read from this memory M2 are supplied to a fixed terminal a of a changeover switch 111.

The luminance signal Y read from the memory M3 is supplied to a fixed terminal b of the changeover switch 108, and the color differential signals R–Y and B–Y read from this memory M3 are supplied to a fixed terminal b of the changeover switch 110. The luminance signal Y read from the memory M4 is supplied to a fixed terminal b of the changeover switch 109, and the color differential signals R–Y and B–Y read from this memory M4 are supplied to a fixed terminal b of the changeover switch 111.

The luminance signal Y output from the changeover switch 108 is supplied to a fixed terminal a of a changeover switch 112, and the luminance signal Y output from the changeover switch 109 is supplied to the other fixed terminal b of the changeover switch 112. The luminance signal Y output from the changeover switch 112 is used as the output of the frame memory section 173. The color differential signals R–Y and B–Y output from the changeover switch 110 are supplied to a fixed terminal a of a changeover switch 113, and the color differential signals R–Y and B–Y output from the changeover switch 111 are supplied to the other fixed terminal b of the changeover switch 113. The color differential signals R–Y and B–Y output from the changeover switch 113 are used as the output of the frame memory section 173.

The changeover switches 112 and 113 are supplied with a switching control signal RCT1 from the subcontroller 107 (see FIG. 55I). Specifically, the changeover switches 112 and 113 are connected to the respective terminals a in the former half period of each field (including the first to 120th lines forming the effective screen) and connected to the respective terminals b in the latter half period of same (including the 121st to 240th lines forming the effective screen).

The changeover switches 108 to 111 are supplied with a switching control signal RCT2 from the subcontroller 107 (see FIG. 57G). These changeover switches 108 to 111 are connected to the respective terminals a in the former half period of each line of the individual fields (including the first to 240th pixels forming the effective screen) and connected to the respective terminals b in the latter half period of same (including the 241st to 480th pixels forming the effective screen).

Figure 53:
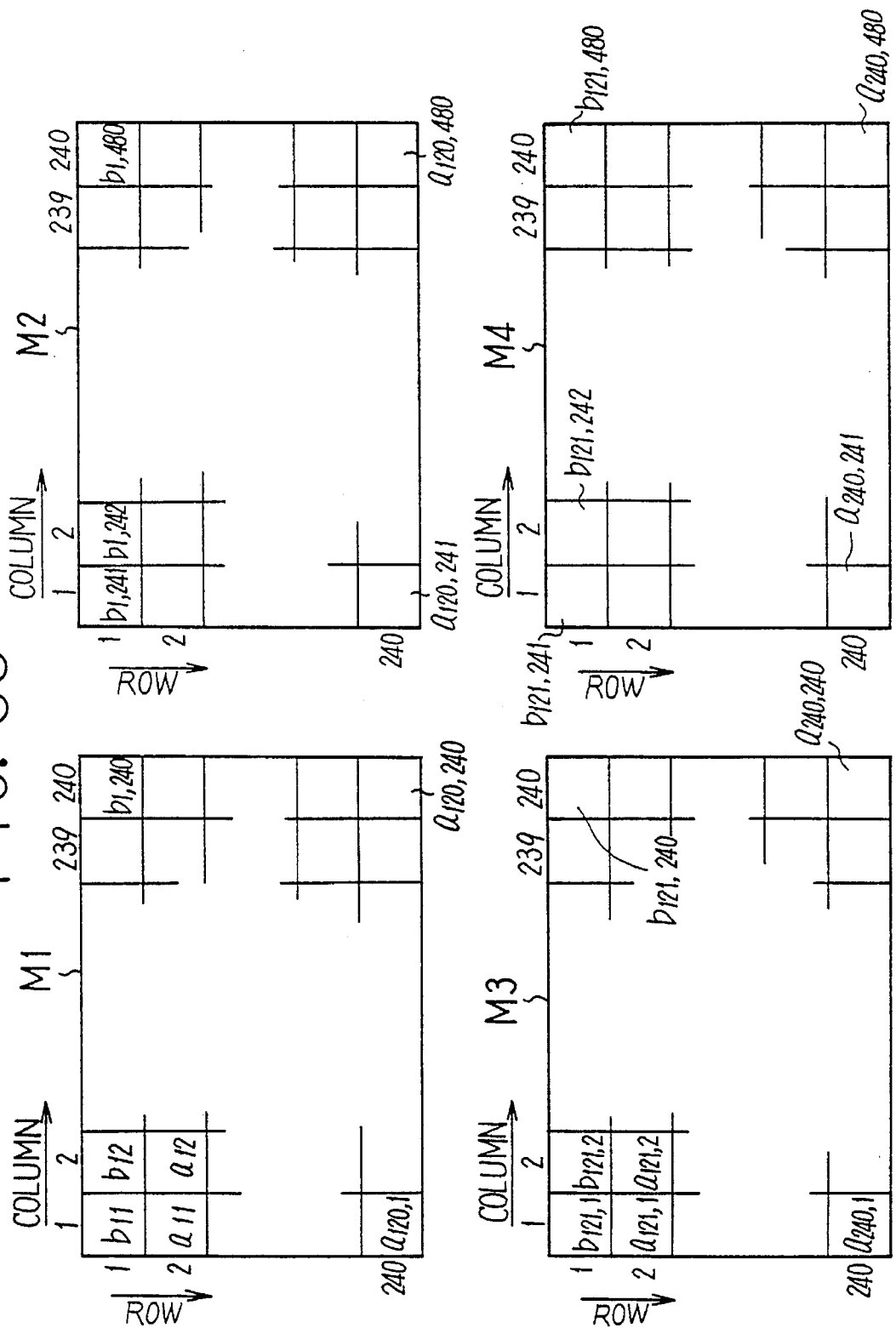
FIG. 53 is a diagram illustrating pixel signals written in individual memories.

FIG. 53 shows the pixel signals written in the respective memories M1 to M4. Since the changeover switches 101 and 102 are connected to the respective terminals a in the former half period of each field, pixel signals are written in the memories M1 and M2 (see FIG. 55E).

The changeover switches 103 to 106 are connected to the respective terminals a in the former half period of each line, and accordingly, in the memory M1 are written the former half of the pixel signals at the first to 120th lines of the odd-numbered field (i.e., a1,1 to a1,240, a21 to a2,240, ... , a120,1 to a120,240) and the former half of the pixel signals at the first to 120th lines of the even-numbered field (i.e., b11 to b1,240, b21 to b2,240, ... , b120,1 to b120,240).

On the other hand, the changeover switches 103 to 106 are connected to the respective terminals b in the latter half period of each line, and therefore, in the memory M2 are written the latter half of the pixel signals at the first to 120th lines of the odd-numbered field (i.e., a1,241 to a1,480, a2,241 to a2,480 ... , a120, 241 to a120,480) and the latter half of the pixel signals at the first to 120th lines of the even-numbered field (i.e., b1,241 to b1,480, b2,241 to b2,480, ... , b120,241 to b120,480).

Since the changeover switches 101 and 102 are connected to the respective terminals b in the latter half period of each field, pixel signals are written in the memories M3 and M4 (see FIG. 55G).

The changeover switches 103 to 106 are connected to the respective terminals a in the former half period of each line, and accordingly, in the memory M3 are written the former half of the pixel signals at the 121st to 240th lines of the odd-numbered field (i.e., a121,1 to a121,240, a122,1 to a122,240, ... , a240,1 to a240,240) and the former half of the pixel signals at the 121st to 240th lines of the even-numbered field (i.e., b121,1 to b121,240, b122,1 to b122, 240, ... , b240,1 to b240,240).

On the other hand, the changeover switches 103 to 106 are connected to the respective terminals b in the latter half period of each line, and therefore, in the memory M4 are written the latter half of the pixel signals at the 121st to 240th lines of the odd-numbered field (i.e., a121,241 to a121,480, a122,241 to a122,480, ... , a240,241 to a240,480) and the latter half of the pixel signals at the 121st to 240th lines of the even-numbered field (i.e., b121,241 to b121,480, b122,241 to b122,480, ... , b240,241 to b240,480).

Figure 56:
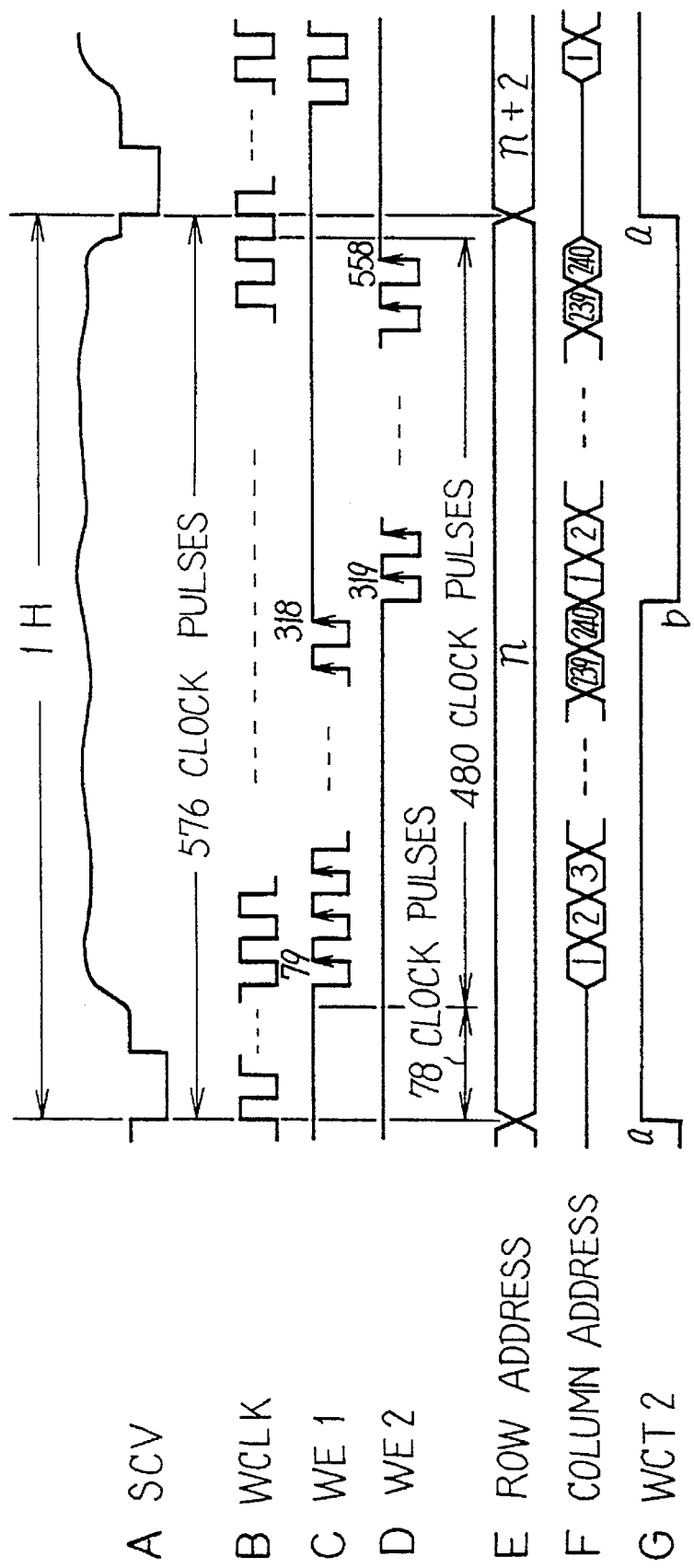
FIG. 56 is a timing chart showing a write operation in the horizontal direction.

Now, the address control for the memories M1 to M4 during the write operation will be described with reference to FIG. 56. In the figure, A denotes the video signal SCV and B denotes the write clock pulse WCLK. In the former half period of each field, a write enable signal WE1 shown in FIG. 56C is supplied to the memory M1, and a write enable signal WE2 shown in FIG. 56D is supplied to the memory M2. In the latter half period of each field, the write enable signal WE1 shown in FIG. 56C is supplied to the memory M3, and the write enable signal WE2 shown in FIG. 56D is supplied to the memory M4. Namely, due to the enable signal WE1, data corresponding to 240 clock pulses from the 79th to 318th clock pulses is written, and due to the enable signal WE2, data corresponding to 240 clock pulses from the 319th to 558th clock pulses is written.

In this case, in the odd-numbered field, the row address n (shown in FIG. 56E) is controlled to change as 2, 4, ... , 240 in accordance with the first to 120th lines and in accordance with the 121st to 240th lines, and in the even-numbered field, the row address is controlled to change as 1, 3, ... , 239 in accordance with the first to 120th lines and in accordance with the 121st to 240th lines.

The column address, on the other hand, is controlled to change from 1 to 240 in accordance with the 79th to 318th clock pulses and in accordance with the 319th to 558th clock pulses of each line (shown in FIG. 56F).

The pixel signals written in the memories M1 to M4 in the above-described manner are thereafter read out therefrom and subjected to the aspect conversion described below. Namely in the former half period of each field, the pixel signals are read from the memories M3 and M1 (FIG. 55F).

The pixel signals a240,2 to b121,2, a240,4 to b121,4, ... , a240,240 to b121,240 are read from the memory M3 as the former half of the pixel signals at the first to 120th lines of the odd-numbered field, and the pixel signals a240,1 to b121,2, a240,3 to b121,3, ... , a240,239 to b121,239 are read from the memory M3 as the former half of the pixel signals at the first to 120th lines of the even-numbered field.

The pixel signals $a_{120,2}$ to $b_{1,2}$, $a_{120,4}$ to $b_{1,4}$, ..., $a_{120,240}$ to $b_{1,240}$ are read from the memory M1 as the latter half of the pixel signals at the first to 120th lines of the odd-numbered field, and the pixel signals $a_{120,1}$ to $b_{1,1}$, $a_{120,3}$ to $b_{1,3}$, ..., $a_{120,239}$ to $b_{1,239}$ are read from the memory M1 as the latter half of the pixel signals at the first to 120th lines of the even-numbered field.

In the latter half period of each field, the pixel signals are read from the memories M4 and M2 (FIG. 55H).

The pixel signals $a_{240,242}$ to $b_{121,242}$, $a_{240,244}$ to $b_{121,2444}$, ..., $a_{240,480}$ to $b_{121,480}$ are read from the memory M4 as the former half of the pixel signals at the 121st to 240th lines of the odd-numbered field, and the pixel signals $a_{240,241}$ to $b_{121,241}$, $a_{240,243}$ to $b_{121,243}$, ..., $a_{240,479}$ to $b_{121,479}$ are read from the memory M4 as the former half of the pixel signals at the 121st to 240th lines of the even-numbered field.

On the other hand, the pixel signals $a_{120,242}$ to $b_{1,242}$, $a_{120,244}$ to $b_{1,244}$, ..., $a_{120,480}$ to $b_{1,480}$ are read from the memory M2 as the latter half of the pixel signals at the 121st to 240th lines of the odd-numbered field, and the pixel signals $a_{120,241}$ to $b_{1,241}$, $a_{120,243}$ to $b_{1,243}$, ..., $a_{120,479}$ to $b_{1,479}$ are read from the memory M2 as the latter half of the pixel signals at the 121st to 240th lines of the even-numbered field.

Figure 57:
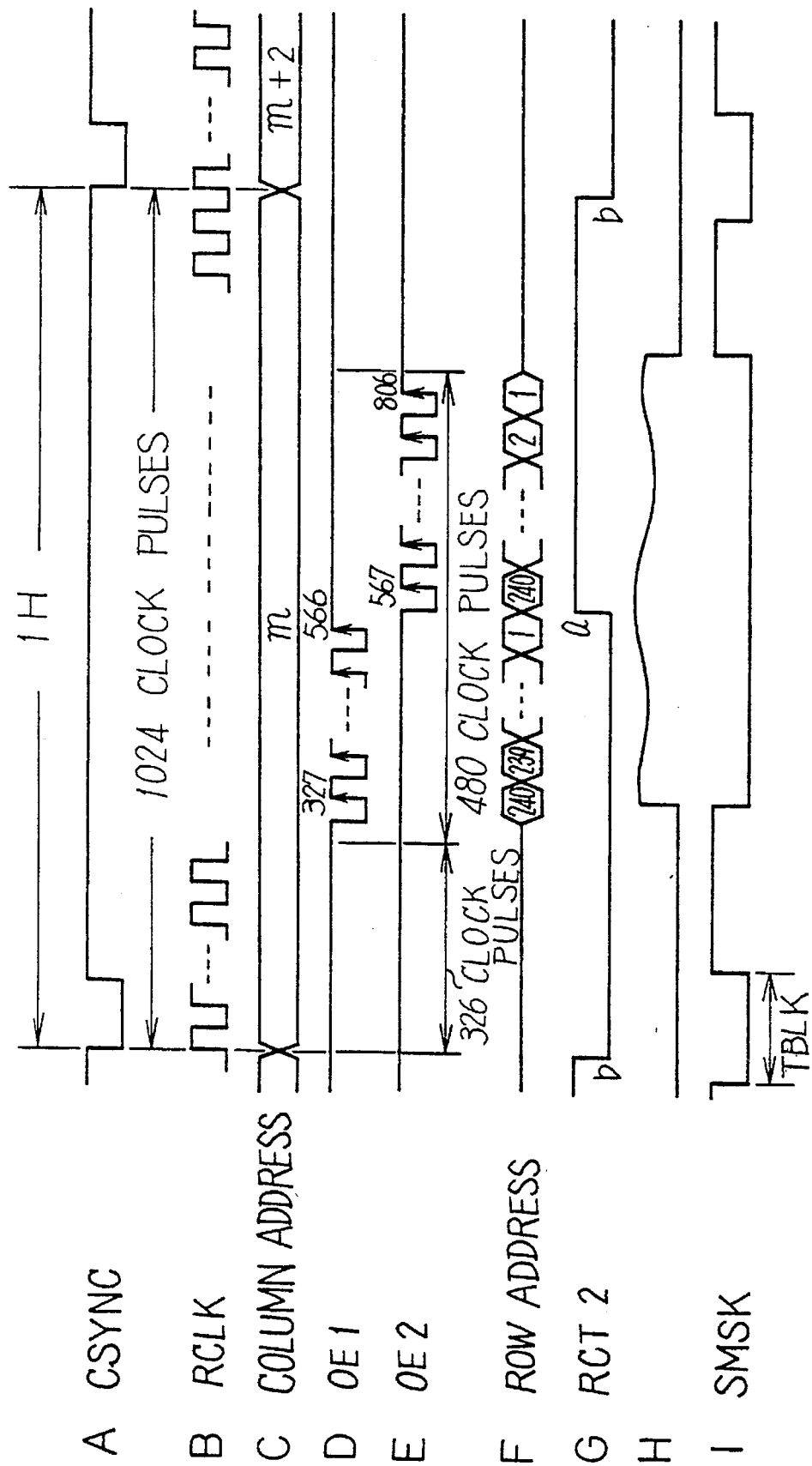
FIG. 57 is a timing chart showing a read operation in the horizontal direction.
Figure 59A:
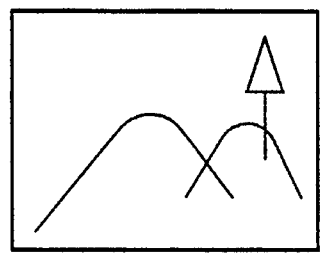
FIGS. 59A, 59B and 59C are diagrams illustrating a landscape-type image acquisition.
Figure 60A:
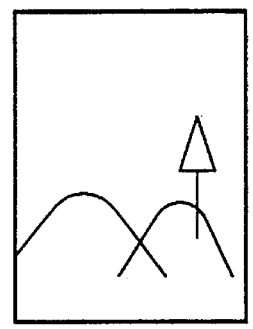
FIGS. 60A, 60B and 60C are diagrams illustrating a portrait-type image acquisition.
Figure 59B:
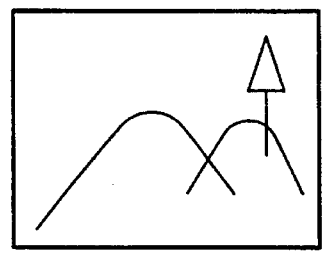
Figure 60B:
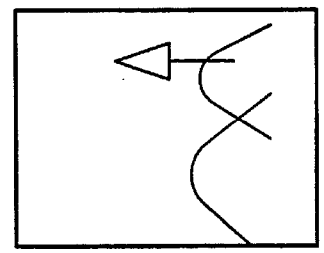
Figure 59C:
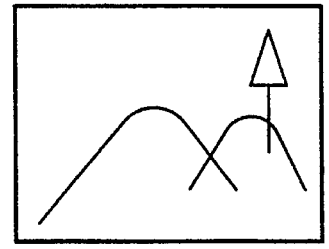
Figure 60C:
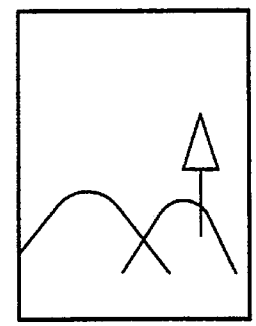

Now, the address control for the memories M1 to M4 during the read operation will be described with reference to FIG. 57. In the figure, A denotes the composite synchronizing signal CSYNC and B denotes the read clock pulse RCLK. In the former half period of each field, an output enable signal OE1 shown in FIG. 57D is supplied to the memory M3, and an output enable signal OE2 shown in FIG. 57E is supplied to the memory MI. In the latter half period of each field, the enable signal OE1 shown in FIG. 57D is supplied to the memory M4, and the enable signal OE2 shown in FIG. 57E is supplied to the memory M2. Namely, due to the enable signal OE1, data corresponding to 240 clock pulses from the 327th to 566th clock pulses is read out, and due to the enable signal OE2, data corresponding to 240 clock pulses from the 567th to 806th clock pulses is read out.

In this case, in the odd-numbered field, the column address m (shown in FIG. 57C) is controlled to change as 2, 4, ..., 240 in accordance with the first to 120th lines and in accordance with the 121st to 240th lines, and in the even-numbered field, the column address is controlled to change as 1, 3, ..., 239 in accordance with the first to 120th lines and in accordance with the 121st to 240th lines. The row address, on the other hand, is controlled to change from 240 to 1 in accordance with the 327th to 566th clock pulses and in accordance with the 567th to 806th clock pulses of each line (shown in FIG. 57F).

Figure 54:
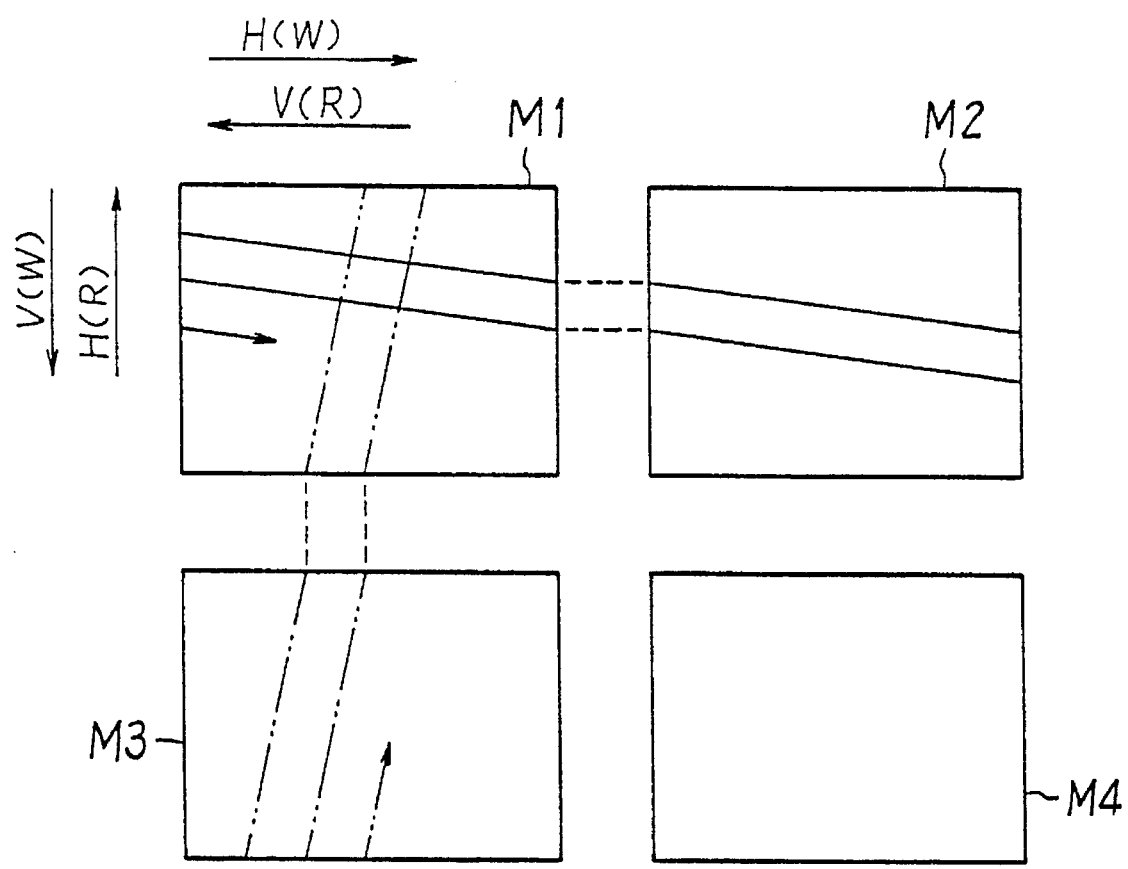
FIG. 54 is a diagram showing a read direction and a write direction with respect to the memories.

FIG. 54 illustrates the write direction (indicated by the solid lines) and read direction (indicated by the two-dot-chain lines) with respect to the aforementioned memories M1 to M4. As illustrated, the write direction and the read direction are controlled to be at a right angle to each other, whereby the aspect conversion can be carried out. In the figure, H(W) and V(W) denote the horizontal and vertical directions in the write operation, respectively, and H(R) and V(R) denote the horizontal and vertical directions in the read operation, respectively.

In this case, as described above, when the memory M1 is in a write state, the memory M3 is in a read state; when the memory M2 is in a write state, the memory M1 is in a read state; when the memory M3 is in a write state, the memory M4 is in a read state; and when the memory M4 is in a write state, the memory M2 is in a read state.

Figure 52:
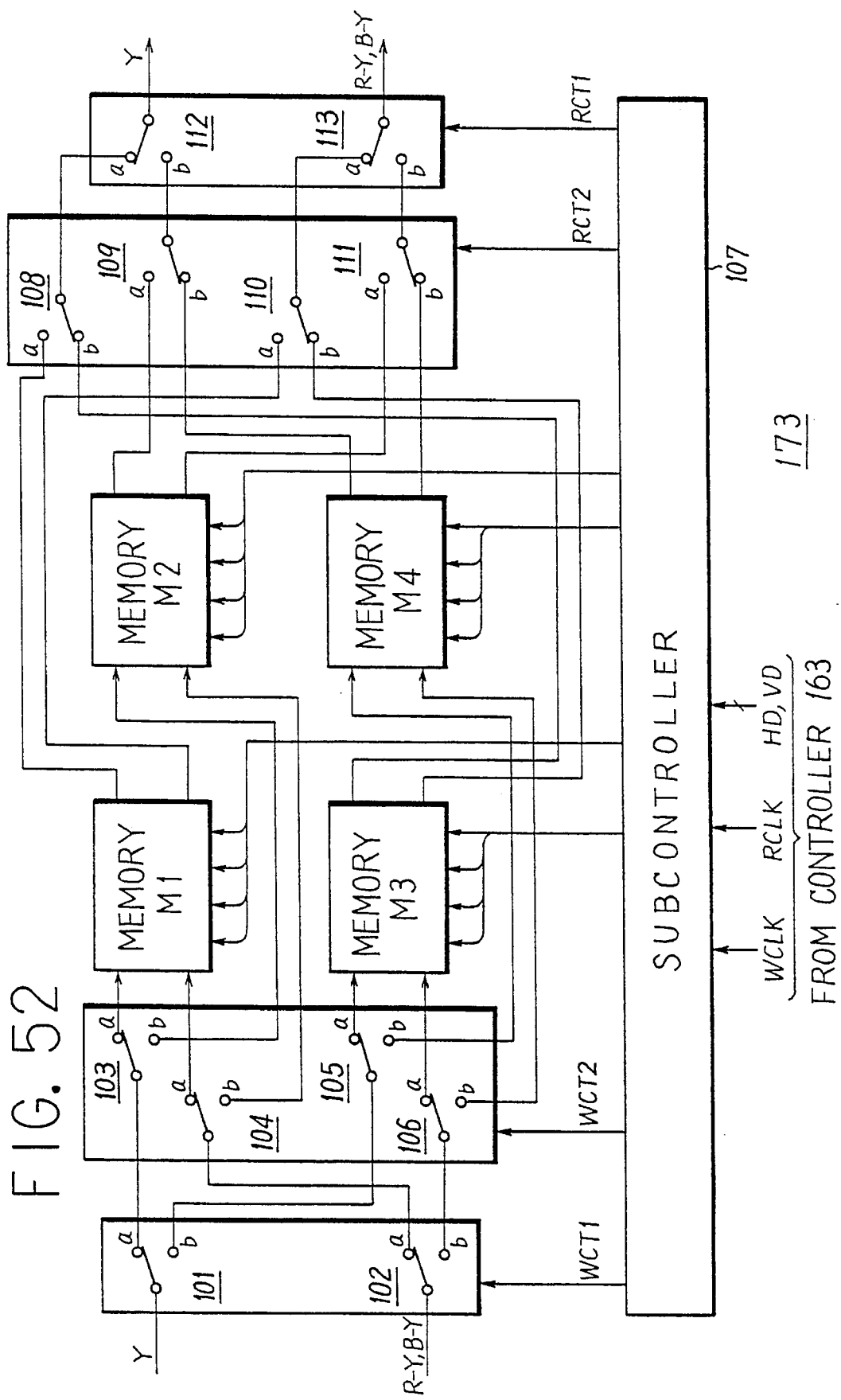
FIG. 52 is a wiring diagram showing the arrangement of a frame memory section in detail.

Referring to FIG. 52, the changeover switches 108 to 111 are connected to the respective terminals b in the former half period of each line, and connected to the respective terminals a in the latter half period of same. Since, in the former half period of each field, the changeover switches 112 and 113 are connected to the respective terminals a, the luminance signals Y and color differential signals R–Y and B–Y read from the memories M3 and M1 are output from these changeover switches 112 and 113. In the latter half period of each field, on the other hand, the changeover switches 112 and 113 are connected to the respective terminals b, and therefore, the luminance signals Y and color differential signals R–Y and B–Y read from the memories M4 and M2 are output from these changeover switches 112 and 113.

Referring again to FIG. 51, the luminance signal Y which is output from the frame memory section 173 and subjected to the aspect conversion process is converted into an analog signal by a D/A converter 164, then combined with the composite synchronizing signal CSYNC at an adder 165, and supplied to an adder 166. The color differential signals R–Y and B–Y which are output from the frame memory section 173 and subjected to the aspect conversion process are converted into analog signals by a D/A converter 167, and subjected to a quadrature two-phase modulation, known in the art, at a chrominance modulator 168 to form a chrominance signal C.

The chrominance signal C output from the chrominance modulator 168 is added to the luminance signal Y at the adder 166 to form a color video signal. The color video signal is supplied to a masking circuit 169 and subjected to a masking process thereat such that the signal level is set to a pedestal level during the period (see hatched region in FIG. 31) in which no signal related to the effective screen 100 is read from the frame memory section 173. In this case, a mask signal SMSK (shown in FIG. 57I), which is high-level during a period other than the read time and blanking period, is supplied from the controller 163 to the masking circuit 169, and the signal level is set to the pedestal level during the period in which the mask signal SMSK is high-level. In FIG. 57, H represents the read signal for the frame memory section 173.

Due to the above-described operation, a color video signal SCV', to which the masking process has been subjected for a region in which no video signal exists and by which the aspect or orientation of the image is converted, as shown in FIG. 15B, is output from the masking circuit 169 to an output terminal 170 (see FIG. 55J).

In the above aspect conversion circuit 37, the frame memory section 173 is composed of four memories M1 to M4 each having a storage capacity corresponding to ¼ frame. Accordingly, the capacity of each memory used is half that required in the case of using two frame memories which alternately read and write individual frames, and the cost of the circuit can be reduced.

Further, ½ of the contents (corresponding to one field) of all memories M1 to M4 constituting the frame memory section 173 is updated on a field-by-field basis. Therefore, the luminance signals Y and color differential signals R–Y and B–Y read from the memories M1 to M4 on a field-by-field basis contain field-based continuous information, whereby a naturally moving image can be obtained.

In the above aspect conversion circuit 37, the overall capacity of the memories M1 to M4 constituting the frame memory section 173 corresponds to one frame, and the pixel signals of the individual lines of the converted video signal are formed by using both the odd- and even-numbered fields (see FIGS. 30A and 31). Alternatively, the overall capacity of the memories M1 to M4 may be equivalent to one field so that the pixel signals of the individual lines of the converted video signal may be formed by using only one of the odd- and even-numbered fields. In this case, however, the number of pixel signals of the individual lines of the converted video signal is reduced, and therefore, the resolution is lowered. Furthermore, in the foregoing embodiment, the frame memory section 173 is composed of four memories M1 to M4, but a greater number of memories, e.g., a multiple of 4, may be used.

The aforementioned write and read timing with respect to the aspect conversion circuit 37 and clock frequencies are given simply by way of example, and may be changed as desired. Further, although in the above embodiment, the effective screen 100 is subdivided corresponding to 480 clock pulses in the horizontal direction, it may be subdivided differently.

It will be obvious to those having ordinary skill in the art that many changes may be made in the above-described details of the preferred embodiments of the present invention without departing from the spirit and scope of the present invention.

We claim:

1. A camera apparatus having a self-timer function, comprising:
   a video camera unit operable for capturing a dynamic image and providing a video signal;
   a still camera operable for capturing still images upon receiving a shutter pulse, the still camera being operable during operation of the video camera unit;
   frequency divider means for frequency dividing a vertical synchronizing component of said video signal; and
   timer means for providing a shutter pulse for actuating a shutter of said still camera, said shutter pulse having a timing duration corresponding to an output signal of the frequency divider means.

2. The camera apparatus according to claim 1, wherein the timer means comprises a shift register of sequential register cells, the output signal of the frequency divider means being coupled to said shift register as a shift clock pulse, and logic means receiving an output signal from a given cell of said sequential register cells for initiating said shutter pulse when said output signal provides an enabling logic state transition.

3. The camera apparatus according to claim 1, which further comprises a shutter switch and a self-timer standby switch, and wherein the self-timer standby switch is operated to change a mode from a normal shutter mode to a self-timer mode, and the timer means is loaded with a predetermined count period and enabled to provide said shutter pulse upon counting said predetermined count period as driven by the output signal of the frequency divider means when the shutter switch is operated in the self-timer mode.

4. The camera apparatus according to claim 3, wherein during the predetermined count period, the timer means associated with the timer function is driven by the output signal of the frequency divider, and the normal shutter mode restored upon lapse of the predetermined count period.

5. The camera apparatus according to claim 4, wherein the frequency divider is operated for a predetermined period after the normal shutter mode is restored, the camera apparatus further comprising logic means for gating the output signal of the frequency divider means to obtain said shutter pulse.

6. A camera apparatus comprising:
   a video camera unit operable for capturing a dynamic image and providing a video signal;
   a still camera operable for capturing still images upon receiving a shutter pulse, the still camera being operable during operation of the video camera unit; and
   a shutter controller for operating, upon receiving a shutter request, a shutter of said still camera in vertical synchronization with the video signal provided by said video camera unit in accordance with a self-timer mode, the shutter controller comprising:
   divider means for dividing a vertical synchronization signal component of the video signal;
   counter means for counting cycles of a first divided output signal of the divider means;
   gating means for providing, when enabled, a drive signal for operating the camera shutter in synchronization with the vertical synchronization signal; and
   logic means for enabling the gating means at a start time immediately following the shutter request when the self-timer mode is not invoked, or alternatively at a start time following the shutter request by a duration determined by a predetermined count of said counter means when the self-timer mode is invoked, and keeping the gating means enabled for an active duration determined by the active state of a second divided output signal of the divider means.

7. A camera apparatus according to claim 6 wherein the counter means comprises a shift register of sequential cells with a designated number of the sequential cells therein providing said predetermined count, the first divided output signal of the divider means being supplied to the shift register as a shift clock input signal and the output of the last cell of the designated number of sequential cells being coupled to the logic means for signaling said predetermined count.

8. A camera apparatus according to claim 6 wherein the gating means comprises first means for providing an enable signal to said video camera for recording a dynamic image and second means for enabling said still camera for recording a still image, each being driven in synchronization with a preassigned divided output signal of the divider means when enabled per the logic means.

9. A camera apparatus according to claim 6 wherein the gating means provides said drive signal for the camera shutter in synchronization with a third divided output signal of the divider means, the third, second and first divided output signals being produced by the divider means by dividing the vertical synchronization signal per progressively larger integer division ratios respectively.

10. A camera apparatus according to claim 9 wherein the logic means includes first logic means for enabling the divider means upon receiving the shutter request and keeping the divider means enabled during the active state of the second divided output signal of the divider means following the shutter request.

11. A camera apparatus according to claim 10 wherein the logic means also includes second logic means for enabling the counter means to begin counting upon receiving a shutter request with the self-timer mode invoked, the first logic means is further operative to keep the divider means enabled as the counter means counts to said predetermined count, and the counter means is further operative to stimulate a shutter request as though the self-timer mode is not invoked upon counting to said predetermined count.

12. A camera apparatus according to claim 6 further comprising a shutter switch selectively positioned for providing the shutter request and a self-timer standby switch selectively positioned for designating the self-timer mode.

* * * * *